United States Patent
Choi et al.

(10) Patent No.: US 12,309,363 B2
(45) Date of Patent: *May 20, 2025

(54) IMAGE DECODING METHOD AND DEVICE AND IMAGE ENCODING METHOD AND DEVICE IN IMAGE CODING SYSTEM

(71) Applicant: LG Electronics Inc., Seoul (KR)

(72) Inventors: Jangwon Choi, Seoul (KR); Jin Heo, Seoul (KR); Seunghwan Kim, Seoul (KR); Jaehyun Lim, Seoul (KR); Ling Li, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,760

(22) Filed: Mar. 13, 2024

(65) Prior Publication Data

US 2024/0348776 A1 Oct. 17, 2024

Related U.S. Application Data

(63) Continuation of application No. 17/442,046, filed as application No. PCT/KR2020/003678 on Mar. 18, 2020, now Pat. No. 11,973,940.

(60) Provisional application No. 62/822,735, filed on Mar. 22, 2019.

(51) Int. Cl.
*H04N 19/11* (2014.01)
*H04N 19/105* (2014.01)
*H04N 19/176* (2014.01)
*H04N 19/593* (2014.01)

(52) U.S. Cl.
CPC ........... *H04N 19/11* (2014.11); *H04N 19/105* (2014.11); *H04N 19/176* (2014.11); *H04N 19/593* (2014.11)

(58) Field of Classification Search
CPC .... H04N 19/11; H04N 19/105; H04N 19/176; H04N 19/593
See application file for complete search history.

(56) References Cited

U.S. PATENT DOCUMENTS

| | | | |
|---|---|---|---|
| 10,469,845 B1 * | 11/2019 | Zhao | H04N 19/105 |
| 11,172,216 B1 * | 11/2021 | Zhang | H04N 19/184 |
| 11,706,409 B2 * | 7/2023 | Zhang | H04N 19/105 |
| | | | 375/240.02 |
| 2017/0252724 A1 * | 9/2017 | Yoshikawa | B01J 35/397 |

(Continued)

FOREIGN PATENT DOCUMENTS

| | | |
|---|---|---|
| CN | 107743705 | 2/2018 |
| CN | 109076241 | 12/2018 |

(Continued)

OTHER PUBLICATIONS

Notice of Allowance in Chinese Appln. No. 202080028234.0, mailed on Jan. 11, 2024, 8 pages (with English Translation).

*Primary Examiner* — Zaihan Jiang
(74) *Attorney, Agent, or Firm* — Fish & Richardson P.C.

(57) ABSTRACT

According to embodiments of the present document, an intra-prediction mode candidate list of a current block can be constructed by means of a process of constructing a common intra-prediction mode list with respect to intra-prediction types. Therefore, the dependency of the intra-prediction types in the process of constructing the intra-prediction mode list is reduced, and thus the coding efficiency of an intra-prediction can be enhanced.

3 Claims, 38 Drawing Sheets

(56) References Cited

U.S. PATENT DOCUMENTS

| | | | |
|---|---|---|---|
| 2017/0332073 A1 | 11/2017 | Lin et al. | |
| 2018/0262763 A1* | 9/2018 | Seregin | H04N 19/463 |
| 2018/0367814 A1* | 12/2018 | Seregin | H04N 19/117 |
| 2019/0104304 A1* | 4/2019 | Lee | H04N 19/593 |
| 2020/0244956 A1* | 7/2020 | Lee | H04N 19/124 |
| 2020/0304780 A1* | 9/2020 | Li | H04N 19/176 |
| 2020/0366900 A1* | 11/2020 | Jun | H04N 19/11 |
| 2021/0092420 A1* | 3/2021 | Du | H04N 19/80 |
| 2022/0030226 A1* | 1/2022 | Lee | H04N 19/176 |
| 2022/0191478 A1* | 6/2022 | Choi | H04N 19/176 |

FOREIGN PATENT DOCUMENTS

| | | |
|---|---|---|
| CN | 109196867 | 1/2019 |
| CN | 109479129 | 3/2019 |
| JP | 2013-153496 | 8/2013 |

* cited by examiner

FIG. 26

| | |
|---|---|
| if( CuPredMode[ x0 ][ y0 ] = = MODE_INTRA ) { | |
|   if( pcm_enabled_flag &&<br>    cbWidth >= MinIpcmCbSizeY  &&  cbWidth <= MaxIpcmCbSizeY &&<br>    cbHeight >= MinIpcmCbSizeY  &&  cbHeight <= MaxIpcmCbSizeY ) | |
|     pcm_flag[ x0 ][ y0 ] | ae(v) |
|   if( pcm_flag[ x0 ][ y0 ] ) { | |
|     while( !byte_aligned( ) ) | |
|       pcm_alignment_zero_bit | f(1) |
|     pcm_sample( cbWidth, cbHeight, treeType) | |
|   } else { | |
|     if( treeType = = SINGLE_TREE  ||  treeType = = DUAL_TREE_LUMA ) { | |
|       if( ( y0 % CtbSizeY ) > 0 ) | |
|         intra_luma_ref_idx[ x0 ][ y0 ] | ae(v) |
|       if (intra_luma_ref_idx[ x0 ][ y0 ] = = 0 &&<br>        ( cbWidth <= MaxTbSizeY || cbHeight <= MaxTbSizeY ) &&<br>        ( cbWidth * cbHeight > MinTbSizeY * MinTbSizeY )) | |
|         intra_subpartitions_mode_flag[ x0 ][ y0 ] | ae(v) |
|       if( intra_subpartitions_mode_flag[ x0 ][ y0 ] = = 1 &&<br>        cbWidth <= MaxTbSizeY  &&  cbHeight <= MaxTbSizeY ) | |
|         intra_subpartitions_split_flag[ x0 ][ y0 ] | ae(v) |
|       if (intra_luma_ref_idx[ x0 ][ y0 ] = = 0 &&<br>        intra_subpartitions_mode_flag[ x0 ][ y0 ] = = 0 ) | |
|         intra_luma_mpm_flag[ x0 ][ y0 ] | ae(v) |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE  ||  treeType = = DUAL_TREE_CHROMA ) | |
|       intra_chroma_pred_mode[ x0 ][ y0 ] | ae(v) |
|   } | |
| } else if( treeType != DUAL_TREE_CHROMA ) { /* MODE_INTER */ | |

FIG. 27

```
Generalized MPM generation method example 1 (6 MPM)

mpm[0] = leftIntraDir;
    mpm[1] = (mpm[0] == PLANAR_IDX) ? DC_IDX : PLANAR_IDX;
    mpm[2] = VER_IDX;
    mpm[3] = HOR_IDX;
    mpm[4] = VER_IDX - 4;
    mpm[5] = VER_IDX + 4;

if (leftIntraDir == aboveIntraDir)
    {
      numCand = 1;
      if (leftIntraDir > DC_IDX)
      {
        mpm[0] = leftIntraDir;
        mpm[1] = PLANAR_IDX;
        mpm[2] = DC_IDX;
        mpm[3] = ((leftIntraDir + offset) % mod) + 2;
        mpm[4] = ((leftIntraDir - 1) % mod) + 2;
        mpm[5] = ((leftIntraDir + offset - 1) % mod) + 2;
      }
    }
    else //L!=A
    {
      numCand = 2;
      mpm[0] = leftIntraDir;
      mpm[1] = aboveIntraDir;
      bool maxCandModeIdx = mpm[0] > mpm[1] ? 0 : 1;

if ((leftIntraDir > DC_IDX) && (aboveIntraDir > DC_IDX))
      {
        mpm[2] = PLANAR_IDX;
        mpm[3] = DC_IDX;
        if ((mpm[maxCandModeIdx] - mpm[!maxCandModeIdx] < 63) && (mpm[maxCandModeIdx] -
mpm[!maxCandModeIdx] > 1))
        {
          mpm[4] = ((mpm[maxCandModeIdx] + offset) % mod) + 2;
          mpm[5] = ((mpm[maxCandModeIdx] - 1) % mod) + 2;
        }
        else
        {
          mpm[4] = ((mpm[maxCandModeIdx] + offset - 1) % mod) + 2;
          mpm[5] = ((mpm[maxCandModeIdx]) % mod) + 2;
        }
      }
      else if (leftIntraDir + aboveIntraDir >= 2)
      {
        mpm[2] = (mpm[!maxCandModeIdx] == PLANAR_IDX) ? DC_IDX : PLANAR_IDX;
        mpm[3] = ((mpm[maxCandModeIdx] + offset) % mod) + 2;
        mpm[4] = ((mpm[maxCandModeIdx] - 1) % mod) + 2;
        mpm[5] = ((mpm[maxCandModeIdx] + offset - 1) % mod) + 2;
      }
    }
```

FIG. 28

```
Generalized MPM generation method example 2 (6 MPM, same as JVET-M0783)

mpm[0] = leftIntraDir;
    mpm[1] = (mpm[0] == PLANAR_IDX) ? DC_IDX : PLANAR_IDX;
    mpm[2] = VER_IDX;
    mpm[3] = HOR_IDX;
    mpm[4] = VER_IDX - 4;
    mpm[5] = VER_IDX + 4;

if (leftIntraDir == aboveIntraDir)
    {
      numCand = 1;
      if (leftIntraDir > DC_IDX)
      {
        mpm[0] = leftIntraDir;
        mpm[1] = PLANAR_IDX;
        mpm[2] = ((leftIntraDir + offset) % mod) + 2;
        mpm[3] = ((leftIntraDir - 1) % mod) + 2;
        mpm[4] = DC_IDX;
        mpm[5] = ((leftIntraDir + offset - 1) % mod) + 2;       }
    }
    else //L!=A
    {
      numCand = 2;
      mpm[0] = leftIntraDir;
      mpm[1] = aboveIntraDir;
      int maxCandModeIdx = mpm[0] > mpm[1] ? 0 : 1;

if ((leftIntraDir > DC_IDX) && (aboveIntraDir > DC_IDX))
      {
        mpm[1] = PLANAR_IDX;
        mpm[2] = aboveIntraDir;
        maxCandModeIdx = mpm[0] > mpm[2] ? 0 : 2;
        int minCandModeIdx = mpm[0] > mpm[2] ? 2 : 0;
      mpm[3] = DC_IDX;
        if ((mpm[maxCandModeIdx] - mpm[minCandModeIdx] < 63) && (mpm[maxCandModeIdx] - mpm[minCandModeIdx] > 1))
        {
          mpm[4] = ((mpm[maxCandModeIdx] + offset) % mod) + 2;
          mpm[5] = ((mpm[maxCandModeIdx] - 1) % mod) + 2;
        }
        else
        {
          mpm[4] = ((mpm[maxCandModeIdx] + offset - 1) % mod) + 2;
          mpm[5] = ((mpm[maxCandModeIdx]) % mod) + 2;
        }
      }
      else if (leftIntraDir + aboveIntraDir >= 2)
      {
        if (leftIntraDir == PLANAR_IDX || aboveIntraDir == PLANAR_IDX)
        {
          mpm[0] = PLANAR_IDX;
          mpm[1] = (leftIntraDir < aboveIntraDir) ? aboveIntraDir : leftIntraDir;
          maxCandModeIdx = 1;
        }
        mpm[2] = (mpm[!maxCandModeIdx] == PLANAR_IDX) ? DC_IDX : PLANAR_IDX;
        mpm[3] = ((mpm[maxCandModeIdx] + offset) % mod) + 2;
        mpm[4] = ((mpm[maxCandModeIdx] - 1) % mod) + 2;
        mpm[5] = ((mpm[maxCandModeIdx] + offset - 1) % mod) + 2;
      }
    }
```

FIG. 29

```
Generalized MPM generation method example 3 (3 MPM, same as VTM1.0)
if( leftIntraDir == aboveIntraDir )
    {
      numCand = 1;

if( leftIntraDir > DC_IDX ) // angular modes
      {
        mpm[0] =   g_intraMode65to33AngMapping[leftIntraDir];
        mpm[1] = ((g_intraMode65to33AngMapping[leftIntraDir] + offset) % mod) + 2;
        mpm[2] = ((g_intraMode65to33AngMapping[leftIntraDir] - 1)      % mod) + 2;
      }
      else //non-angular
      {
        mpm[0] = g_intraMode65to33AngMapping[PLANAR_IDX];
        mpm[1] = g_intraMode65to33AngMapping[DC_IDX];
        mpm[2] = g_intraMode65to33AngMapping[VER_IDX];
      }
    }
    else
    {
      numCand = 2;

mpm[0] = g_intraMode65to33AngMapping[leftIntraDir];
      mpm[1] = g_intraMode65to33AngMapping[aboveIntraDir];

if( leftIntraDir && aboveIntraDir ) //both modes are non-planar
      {
        mpm[2] = g_intraMode65to33AngMapping[PLANAR_IDX];
      }
      else
      {
        mpm[2] = g_intraMode65to33AngMapping[(leftIntraDir + aboveIntraDir) < 2 ? VER_IDX : DC_IDX];
      }
    }
```

FIG. 30

```
Generalized MPM generation method 6 MPM)

leftIntraDir   : intra direction of left PU
aboveIntraDir : intra direction of above PU 1.      Default mode
            mpm[0] = PLANAR_IDX
            mpm[1] = DC_IDX
            mpm[2] = VER_IDX
            mpm[3] = HOR_IDX
            mpm[4] = VER_IDX-4
            mpm[5] = VER_IDX+4

1.      If two neighboring modes are same and two neighboring modes are greater than DC.
            mpm[0] = PLANAR_IDX
            mpm[1] = leftIntraDir
            mpm[2] = 2 + ( (leftIntraDir + 61) % 64)
            mpm[3] = 2 + ( (leftIntraDir – 1 ) % 64)
            mpm[4] = DC_IDX
            mpm[5] = 2 + ( (leftIntraDir + 60) % 64)

1.      If (leftIntraDir > DC_IDX) && (aboveIntraDir > DC_IDX)
            mpm[0] = PLANAR_IDX
            mpm[1] = leftIntraDir
            mpm[2] = aboveIntraDir
            mpm[3] = DC_IDX
            maxCandModeIdx = mpm[1] > mpm[2] ? 1 : 2;
            minCandModeidx = mpm[1] > mpm[2] ? 2 : 1;
              if ((mpm[maxCandModeIdx] - mpm[minCandModeidx] < 63) && (mpm[maxCandModeIdx] -
                                            mpm[minCandModeidx]>1))
              mpm[4] = 2 + ( (maxAB + 61) % 64)
              mpm[5] = 2 + ( (maxAB – 1 ) % 64)
            otherwise
              mpm[4] = 2 + ( (maxAB + 60) % 64)
              mpm[5] = 2 + ( maxAB % 64)

1.      If leftIntraDir + aboveIntraDir >= 2.
            mpm[0] = PLANAR_IDX
            mpm[1] = (leftIntraDir < aboveIntraDir) ? aboveIntraDir : leftIntraDir;
            mpm[2] = DC_IDX
            mpm[3] = 2 + ( (maxAB + 61) % 64)
            mpm[4] = 2 + ( (maxAB – 1 ) % 64)
            mpm[5] = 2 + ( (maxAB + 60) % 64)
```

FIG. 31

```
Generalized MPM generation method 1 (6 MPM) source code version const int numMPMs = NUM_MOST_PROBABLE_MODES;
int numCand     = -1;
int leftIntraDir = PLANAR_IDX, aboveIntraDir = PLANAR_IDX;

const CompArea &area = pu.block(getFirstComponentOfChannel(channelType));
const Position posRT = area.topRight();
const Position posLB = area.bottomLeft();

// Get intra direction of left PU
const PredictionUnit *puLeft = pu.cs->getPURestricted(posLB.offset(-1, 0), pu, channelType);
if (puLeft && CU::isIntra(*puLeft->cu))
{
   leftIntraDir = puLeft->intraDir[channelType];
}

// Get intra direction of above PU
const PredictionUnit *puAbove = pu.cs->getPURestricted(posRT.offset(0, -1), pu, channelType);
if (puAbove && CU::isIntra(*puAbove->cu) && CU::isSameCtu(*pu.cu, *puAbove->cu))
{
  aboveIntraDir = puAbove->intraDir[channelType];
} const int offset = (int)NUM_LUMA_MODE - 6;
const int mod = offset + 3;

mpm[0] = PLANAR_IDX;
mpm[1] = DC_IDX;
mpm[2] = VER_IDX;
mpm[3] = HOR_IDX;
mpm[4] = VER_IDX - 4;
mpm[5] = VER_IDX + 4;

if (leftIntraDir == aboveIntraDir)
{
   numCand = 1;
   if (leftIntraDir > DC_IDX)
   {
           mpm[0] = PLANAR_IDX;
        mpm[1] = leftIntraDir;
                mpm[2] = ((leftIntraDir + offset) % mod) + 2;
           mpm[3] = ((leftIntraDir - 1) % mod) + 2;
                mpm[4] = DC_IDX;
                mpm[5] = ((leftIntraDir + offset - 1) % mod) + 2;
   }
}
```

FIG. 32

```
else //L!=A
{
   numCand = 2;
     int  maxCandModeIdx = mpm[0] > mpm[1] ? 0 : 1;

if ((leftIntraDir > DC_IDX) && (aboveIntraDir > DC_IDX))
        {
            mpm[0] = PLANAR_IDX;
         mpm[1] = leftIntraDir;
         mpm[2] = aboveIntraDir;
         maxCandModeIdx = mpm[1] > mpm[2] ? 1 : 2;
            int     minCandModeidx     =     mpm[1]     >     mpm[2]    ?    2    :    1;
         mpm[3] = DC_IDX;
            if  ((mpm[maxCandModeIdx]  -  mpm[minCandModeIdx]  <  63)  &&  (mpm[maxCandModeIdx]  -
mpm[minCandModeidx] > 1))
            {
          mpm[4] = ((mpm[maxCandModeIdx] + offset) % mod) + 2;
          mpm[5] = ((mpm[maxCandModeIdx] - 1) % mod) + 2;
         }
         else
         {
          mpm[4] = ((mpm[maxCandModeIdx] + offset - 1) % mod) + 2;
          mpm[5] = ((mpm[maxCandModeIdx]) % mod) + 2;
         }
      }
      else if (leftIntraDir + aboveIntraDir >= 2)
        {
            mpm[0] = PLANAR_IDX;
                mpm[1] = (leftIntraDir < aboveIntraDir) ? aboveIntraDir : leftIntraDir;
                maxCandModeIdx = 1;
         mpm[2] = DC_IDX;
            mpm[3] = ((mpm[maxCandModeIdx] + offset) % mod) + 2;
      mpm[4] = ((mpm[maxCandModeIdx] - 1) % mod) + 2;
      mpm[5] = ((mpm[maxCandModeIdx] + offset - 1) % mod) + 2;
      }
     }
    }
```

Generalized MPM generation method 1 (6 MPM) spec version

8.4.2 of VVC spec

Derivation process for luma intra prediction mode

Input to this process are:

–     a luma location ( xCb , yCb ) specifying the top-left sample of the current luma coding block relative to the top-left luma sample of the current picture, –     a variable cbWidth specifying the width of the current coding block in luma samples, –     a variable cbHeight specifying the height of the current coding block in luma samples.

In this process, the luma intra prediction mode IntraPredModeY[ xCb ][ yCb ] is derived.

Table 8-1 specifies the value for the intra prediction mode IntraPredModeY[ xCb ][ yCb ] and the associated names.

Table 8-1 – Specification of intra prediction mode and associated names

| Intra prediction mode | Associated name |
|---|---|
| 0 | INTRA_PLANAR |
| 1 | INTRA_DC |
| 2..66 | INTRA_ANGULAR2..INTRA_ANGULAR66 |
| 81..83 | INTRA_LT_CCLM, INTRA_L_CCLM, INTRA_T_CCLM |

NOTE – : The intra prediction modes INTRA_LT_CCLM, INTRA_L_CCLM and INTRA_T_CCLM are only applicable to chroma components.

IntraPredModeY[ xCb ][ yCb ] is derived by the following ordered steps:

1.     The neighbouring locations ( xNbA, yNbA ) and ( xNbB, yNbB ) are set equal to ( xCb − 1, yCb + cbHeight − 1 ) and ( xCb + cbWidth − 1, yCb − 1 ), respectively.

2.     For X being replaced by either A or B, the variables candIntraPredModeX are derived as follows:

–     The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xNbX, yNbX ) as inputs, and the output is assigned to availableX.

–     The candidate intra prediction mode candIntraPredModeX is derived as follows:

–     If one or more of the following conditions are true, candIntraPredModeX is set equal to INTRA_PLANAR.

–     The variable availableX is equal to FALSE.

–     CuPredMode[ xNbX ][ yNbX ] is not equal to MODE_INTRA and ciip_flag[ xNbX ][ yNbX ] is not equal to 1.

–     pcm_flag[ xNbX ][ yNbX ] is equal to 1.

–     X is equal to B and yCb − 1 is less than ( ( yCb >> CtbLog2SizeY ) << CtbLog2SizeY ).

–     Otherwise, candIntraPredModeX is set equal to IntraPredModeY[ xNbX ][ yNbX ].

FIG. 34

| | |
|---|---|
| 3. | The candModeList[ x ] with x = 0..5 is derived as follows: |
| – | If candIntraPredModeB is equal to candIntraPredModeA and candIntraPredModeA is greater than INTRA_DC, candModeList[ x ] with x = 0..5 is derived as follows: | candModeList[ 0 ] = INTRA_PLANAR            (8-9)

candModeList[ 1 ] = candIntraPredModeA           (8-10)

candModeList[ 2 ] = 2 + ( ( candIntraPredModeA + 61 ) % 64 ) (8-12)

candModeList[ 3 ] = 2 + ( ( candIntraPredModeA − 1 ) % 64 )   (8-13)

candModeList[ 4 ] = INTRA_DC              (8-11)

candModeList[ 5 ] = 2 + ( ( candIntraPredModeA + 60 ) % 64 ) (8-14)

– Otherwise if candIntraPredModeB is not equal to candIntraPredModeA and candIntraPredModeA or candIntraPredModeB is greater than INTRA_DC, the following applies:

– The variables minAB and maxAB are derived as follows:

minAB = Min( candIntraPredModeA, candIntraPredModeB )(8-24)

maxAB = Max( candIntraPredModeA, candIntraPredModeB )(8-25)

– If candIntraPredModeA and candIntraPredModeB are both greater than INTRA_DC, candModeList[ x ] with x = 0..5 is derived as follows:

candModeList[ 0 ] = INTRA_PLANAR           (8-26)

candModeList[ 1 ] = candIntraPredModeA         (8-27)

candModeList[ 2 ] = candIntraPredModeB candModeList[ 3 ] = INTRA_DC             (8-29)

– If maxAB − minAB is in the range of 2 to 62, inclusive, the following applies:

candModeList[ 4 ] = 2 + ( ( maxAB + 61 ) % 64 )      (8-30)

candModeList[ 5 ] = 2 + ( ( maxAB − 1 ) % 64 )       (8-31)

– Otherwise, the following applies:

candModeList[ 4 ] = 2 + ( ( maxAB + 60 ) % 64 )      (8-32)

candModeList[ 5 ] = 2 + ( ( maxAB ) % 64 )          (8-33)

FIG. 35

| | – | Otherwise (candIntraPredModeA or candIntraPredModeB is greater than INTRA_DC), candModeList[ x ] with x = 0..5 is derived as follows: | |
|---|---|---|---|
| | | candModeList[ 0 ] = INTRA_PLANAR (8-64) | |
| | | candModeList[ 1 ] = maxAB | (8-65) |
| | | candModeList[ 2 ] = INTRA_DC (8-66) | |
| | | candModeList[ 3 ] = 2 + ( ( maxAB + 61 ) % 64 ) (8-66) | |
| | | candModeList[ 4 ] = 2 + ( ( maxAB − 1 ) % 64 ) (8-67) | |
| | | candModeList[ 5 ] = 2 + ( ( maxAB + 60 ) % 64 ) (8-68) | |
| – | Otherwise, the following applies: | | |
| | | candModeList[ 0 ] = INTRA_PLANAR (8-70) | |
| | | candModeList[ 1 ] = INTRA_DC (8-71) | |
| | | candModeList[ 2 ] = INTRA_ANGULAR50 (8-72) | |
| | | candModeList[ 3 ] = INTRA_ANGULAR18 (8-73) | |
| | | candModeList[ 4 ] = INTRA_ANGULAR46 (8-74) | |
| | | candModeList[ 5 ] = INTRA_ANGULAR54 (8-75) | |
| | | (8-81) | |
| | – | | |
| 4. | IntraPredModeY[ xCb ][ yCb ] is derived by applying the following procedure: | | |
| – | If intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ]. | | |
| – | Otherwise, IntraPredModeY[ xCb ][ yCb ] is derived by applying the following ordered steps: | | |
| 1. | When candModeList[ i ] is greater than candModeList[ j ] for i = 0..4 and for each i, j = ( i + 1 )..5, both values are swapped as follows: | | |
| | | ( candModeList[ i ], candModeList[ j ] ) = Swap( candModeList[ i ], candModeList[ j ] ) (8-94) | |
| 2. | IntraPredModeY[ xCb ][ yCb ] is derived by the following ordered steps: | | |
| i. | IntraPredModeY[ xCb ][ yCb ] is set equal to intra_luma_mpm_remainder[ xCb ][ yCb ]. | | |
| ii. | For i equal to 0 to 5, inclusive, when IntraPredModeY[ xCb ][ yCb ] is greater than or equal to candModeList[ i ], the value of IntraPredModeY[ xCb ][ yCb ] is incremented by one. | | |
| The variable IntraPredModeY[ x ][ y ] with  x = xCb..xCb + cbWidth − 1 and y = yCb..yCb + cbHeight − 1 is set to be equal to IntraPredModeY[ xCb ][ yCb ]. | | | |

8.4.4.2.1 of VVC spec

The intra sample prediction process according to predModeIntra applies as follows:

– If predModeIntra is equal to INTRA_PLANAR, the corresponding intra prediction mode process specified in clause 8.4.4.2.5 is invoked with the transform block width nTbW, and the transform block height nTbH, the intra prediction reference line index refIdx, and the reference sample array p as inputs, and the output is the predicted sample array predSamples.

– Otherwise, if predModeIntra is equal to INTRA_DC, the corresponding intra prediction mode process specified in clause 8.4.4.2.6 is invoked with the transform block width nTbW, the transform block height nTbH, the intra prediction reference line index refIdx, and the reference sample array p as inputs, and the output is the predicted sample array predSamples.

– Otherwise, if predModeIntra is equal to INTRA_LT_CCLM, INTRA_L_CCLM or INTRA_T_CCLM, the corresponding intra prediction mode process specified in clause 8.4.4.2.8 is invoked with the intra prediction mode predModeIntra, the sample location ( xTbC, yTbC ) set equal to ( xTbCmp, yTbCmp ), the transform block width nTbW and height nTbH, and the reference sample array p as inputs, and the output is the predicted sample array predSamples.

– Otherwise, the corresponding intra prediction mode process specified in clause 8.4.4.2.7 is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the colour component index cIdx, and the reference sample array p as inputs, and the modified intra prediction mode predModeIntra and the predicted sample array predSamples as outputs.

Specification of INTRA_PLANAR intra prediction mode

Inputs to this process are:

– a variable nTbW specifying the transform block width,

– a variable nTbH specifying the transform block height,

– a variable refIdx specifying the intra prediction reference line index,

– the neighbouring samples $p[\ x\ ][\ y\ ]$, with $x = -1-\text{refIdx}$, $y = -1-\text{refIdx}..\text{nTbH}$ and $x = -\text{refIdx}..\text{nTbW}$, $y = -1-\text{refIdx}$.

Outputs of this process are the predicted samples $predSamples[\ x\ ][\ y\ ]$, with $x = 0..nTbW - 1$, $y = 0..nTbH - 1$.

The variables nW and nH are derived as follows:

$\quad nW = \text{Max}(\ nTbW,\ 2\ )$ \hfill (8-116)

$\quad nH = \text{Max}(\ nTbH,\ 2\ )$ \hfill (8-117)

The values of the prediction samples $predSamples[\ x\ ][\ y\ ]$, with $x = 0..nTbW - 1$ and $y = 0..nTbH - 1$, are derived as follows: $predV[\ x\ ][\ y\ ] = ((\ nH - 1 - y\ ) * p[\ x\ ][\ -1\ -\text{refIdx}] + (\ y + 1\ ) * p[\ -1-\ \text{refIdx}][\ nTbH\ ]) \ll \text{Log2}(\ nW\ )$ (8-118)

$predH[\ x\ ][\ y\ ] = ((\ nW - 1 - x\ ) * p[\ -1-\ \text{refIdx}\ ][\ y\ ] + (\ x + 1\ ) * p[\ nTbW\ ][\ -1-\ \text{refIdx}\ ]) \ll \text{Log2}(\ nH\ )$ (8-119)

$predSamples[\ x\ ][\ y\ ] = (\ predV[\ x\ ][\ y\ ] + predH[\ x\ ][\ y\ ] + nW * nH\ ) \gg (\text{Log2}(\ nW\ ) + \text{Log2}(\ nH\ ) + 1)$ (8-120)

FIG. 38

| Specification of INTRA_DC intra prediction mode |
| --- |

Inputs to this process are:

–      a variable nTbW specifying the transform block width,

–      a variable nTbH specifying the transform block height,

–      a variable refIdx specifying the intra prediction reference line index,

–      the neighbouring samples p[ x ][ y ], with x = −1−refIdx, y = −1−refIdx..nTbH − 1 and x = −refIdx..nTbW − 1 , y = −1−refIdx.

Outputs of this process are the predicted samples predSamples[ x ][ y ], with x = 0..nTbW − 1, y = 0..nTbH − 1.

The values of the prediction samples predSamples[ x ][ y ], with x = 0..nTbW − 1, y = 0..nTbH − 1, are derived by the following ordered steps:

1.      A variable dcVal is derived as follows:

–      When nTbW is equal to nTbH:

$$dcVal = \left(\sum_{x'=0}^{nTbW-1} p[x'][-1 - refIdx] + \sum_{y'=0}^{nTbH-1} p[-1 - refIdx][y'] + nTbW\right) \gg (Log2(nTbW) + 1)$$

(8-121)

–      When nTbW is greater than nTbH:

$$dcVal = \left(\sum_{x'=0}^{nTbW-1} p[x'][-1 - refIdx] + (nTbW \gg 1)\right) \gg Log2(nTbW)$$

(8-122)

–      When nTbW is less than nTbH:

$$dcVal = \left(\sum_{y'=0}^{nTbH-1} p[-1 - refIdx][y'] + (nTbH \gg 1)\right) \gg Log2(nTbH)$$

(8-123)

1.      The prediction samples predSamples[x][y] are derived as follows:

predSamples[ x ][ y ] = dcVal, with x = 0.. nTbW − 1, y = 0.. nTbH − 1      (8-124)

FIG. 39

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? 1 : 0 | ( nTbH >= 4 && nTbH <= 16 ) ? 1 : 0 |
| INTRA_DC, INTRA_ANGULAR33, INTRA_ANGULAR35 | 0 | 0 |
| INTRA_ANGULAR2, INTRA_ANGULAR4,...,INTRA_ANGULAR28, INTRA_ANGULAR30, INTRA_ANGULAR39, INTRA_ANGULAR41,...,INTRA_ANGULAR63, INTRA_ANGULAR65 | ( nTbW >= 4 && nTbW <= 16 ) ? 1 : 0 | 0 |
| INTRA_ANGULAR3, INTRA_ANGULAR5,..., INTRA_ANGULAR27, INTRA_ANGULAR29, INTRA_ANGULAR38, INTRA_ANGULAR40,...,INTRA_ANGULAR64, INTRA_ANGULAR66 | 0 | ( nTbH >= 4 && nTbH <= 16 ) ? 1 : 0 |

FIG. 40

| Syntax element | binIdx | | | | | |
|---|---|---|---|---|---|---|
| | 0 | 1 | 2 | 3 | 4 | >= 5 |
| end_of_tile_one_bit | terminate | na | na | na | na | na |
| alf_ctb_flag[ ][ ][ ] | 0..8 (clause 9.5.4.2.2) | na | na | na | na | na |
| sao_merge_left_flag | 0 | na | na | na | na | na |
| sao_merge_up_flag | 0 | na | na | na | na | na |
| sao_type_idx_luma | 0 | bypass | na | na | na | na |
| sao_type_idx_chroma | 0 | bypass | na | na | na | na |
| sao_offset_abs[ ][ ][ ][ ] | bypass | bypass | bypass | bypass | bypass | na |
| sao_offset_sign[ ][ ][ ][ ] | bypass | na | na | na | na | na |
| sao_band_position[ ][ ][ ] | bypass | bypass | bypass | bypass | bypass | bypass |
| sao_eo_class_luma | bypass | bypass | na | na | na | na |
| sao_eo_class_chroma | bypass | bypass | na | na | na | na |
| split_cu_flag | 0..8 (clause 9.5.4.2.2) | na | na | na | na | na |
| split_qt_flag | 0..5 (clause 9.5.4.2.2) | na | na | na | na | na |
| mtt_split_cu_vertical_flag | 0..4 (clause 9.5.4.2.3) | na | na | na | na | na |
| mtt_split_cu_binary_flag | ( 2 * mtt_split_cu_vertical_flag ) + ( mttDepth < = 1 ? 1 : 0 ) | na | na | na | na | na |
| cu_skip_flag[ ][ ] | 0,1,2 (clause 9.5.4.2.2) | na | na | na | na | na |
| pred_mode_flag | 0,1 (clause 9.5.4.2.2) | na | na | na | na | na |
| pred_mode_ibc_flag | 0,1,2 (clause 9.5.4.2.2) | na | na | na | na | na |
| pcm_flag[ ][ ] | terminate | na | na | na | na | na |
| intra_luma_ref_idx[ ][ ] | 0 | 1 | na | na | na | na |
| intra_subpartitions_mode_flag | 0 | na | na | na | na | na |
| intra_subpartition_split_flag | 0 | na | na | na | na | na |
| intra_luma_mpm_flag[ ][ ] | 0 | na | na | na | na | na |
| intra_luma_mpm_idx[ ][ ] | intra_luma_ref_idx!=0 ? 2: (intra_subpartitions_mode_flag? 0: 1) | bypass | bypass | bypass | bypass | na |
| intra_luma_mpm_remainder[ ][ ] | bypass | bypass | bypass | bypass | bypass | bypass |
| intra_chroma_pred_mode[ ][ ] sps_cclm_enabled_flag = = 0 | 0 | bypass | bypass | na | na | na |

FIG. 41

Specification of INTRA_DC intra prediction mode

Inputs to this process are:

– a variable nTbW specifying the transform block width,

– a variable nTbH specifying the transform block height,

– a variable refIdx specifying the intra prediction reference line index,

– the neighbouring samples p[ x ][ y ], with x = −1−refIdx, y = −1−refIdx..nTbH − 1 and x = −refIdx..nTbW − 1 , y = −1−refIdx.

Outputs of this process are the predicted samples predSamples[ x ][ y ], with x = 0..nTbW − 1, y = 0..nTbH − 1.

The values of the prediction samples predSamples[ x ][ y ], with x = 0..nTbW − 1, y = 0..nTbH − 1, are derived by the following ordered steps:

1. A variable dcVal is derived as follows:

– When nTbW is equal to nTbH:

$$\text{dcVal} = \left(\sum_{x'=-\text{refIdx}}^{\text{nTbW}-1-\text{refIdx}} p[x'][-1-\text{refIdx}] + \sum_{y'=-\text{refIdx}}^{nTbH-1-\text{refIdx}} p[-1-\text{refIdx}][y'] + \text{nTbW}\right) \gg (\text{Log2}(\text{nTbW}) + 1) \qquad (8\text{-}121)$$

– When nTbW is greater than nTbH:

$$\text{dcVal} = \left(\sum_{x'=-\text{refIdx}}^{\text{nTbW}-1-\text{refIdx}} p[x'][-1-\text{refIdx}] + (\text{nTbW} \gg 1)\right) \gg \text{Log2}(\text{nTbW}) \qquad (8\text{-}122)$$

– When nTbW is less than nTbH:

$$\text{dcVal} = \left(\sum_{y'=-\text{refIdx}}^{\text{nTbH}-1-\text{refIdx}} p[-1-\text{refIdx}][y'] + (\text{nTbH} \gg 1)\right) \gg \text{Log2}(\text{nTbH}) \qquad (8\text{-}123)$$

1. The prediction samples predSamples[x][y] are derived as follows:

predSamples[ x ][ y ] = dcVal, with x = 0.. nTbW − 1, y = 0.. nTbH − 1     (8-124)

Specification of INTRA_PLANAR intra prediction mode

Inputs to this process are:

– a variable nTbW specifying the transform block width,

– a variable nTbH specifying the transform block height,

– a variable refIdx specifying the intra prediction reference line index,

– the neighbouring samples p[ x ][ y ], with x = −1−refIdx, y = −1−refIdx..nTbH and x = −refIdx..nTbW, y = −1−refIdx.

Outputs of this process are the predicted samples predSamples[ x ][ y ], with x = 0..nTbW − 1, y = 0..nTbH − 1.

The variables nW and nH are derived as follows:

nW = Max( nTbW, 2 )  (8-116)

nH = Max( nTbH, 2 )  (8-117)

The values of the prediction samples predSamples[ x ][ y ], with x = 0..nTbW − 1 and y = 0..nTbH − 1, are derived as follows:predV[ x ][ y ] = ( ( nH − 1 − y ) * p[ x ][ −1 − refIdx ] + ( y + 1 ) * p[ −1− refIdx ][ nTbH − refIdx] ) << Log2 ( nW )  (8-118)

predH[ x ][ y ] = ( ( nW − 1 − x ) * p[ −1− refIdx ][ y ] + ( x + 1 ) * p[ nTbW − refIdx ][ −1− refIdx ] ) << Log2 ( nH )

(8-119)

predSamples[ x ][ y ] = ( predV[ x ][ y ] + predH[ x ][ y ] + nW * nH ) >> (Log2 ( nW ) + Log2 ( nH ) + 1 )

(8-120)

IMAGE DECODING METHOD AND DEVICE AND IMAGE ENCODING METHOD AND DEVICE IN IMAGE CODING SYSTEM

CROSS-REFERENCE TO RELATED APPLICATIONS

This application is a continuation of U.S. application Ser. No. 17/442,046, filed on Sep. 22, 2021, which is a National Stage application under 35 U.S.C. § 371 of International Application No. PCT/KR2020/003678, filed on Mar. 18, 2020, which claims the benefit of U.S. Provisional Application No. 62/822,735, filed on Mar. 22, 2019. The disclosures of the prior applications are incorporated by reference in their entirety.

BACKGROUND OF THE DISCLOSURE

Field of the Disclosure

The present disclosure relates to an image coding technique and, more specifically, to an image decoding method and apparatus for performing intra prediction by deriving an intra prediction mode candidate list from a plurality of intra prediction types in an image coding system.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

An object of the present disclosure is to provide a method and apparatus for improving image coding efficiency.

Another object of the present disclosure is to provide a method and apparatus for improving efficiency of intra prediction.

Further another object of the present disclosure is to provide a method and apparatus for applying the same construction process to intra prediction types in constructing an intra prediction mode candidate list for deriving an intra prediction mode.

Further another object of the present disclosure is to provide a method and apparatus for deriving a reference sample used in a DC intra prediction mode in consideration of a reference line index.

According to an embodiment of the present disclosure, an image decoding method performed by a decoding apparatus is provided. The method includes receiving image information including prediction related information for a current block and generating a reconstructed sample of the current block based on the image information.

According to another embodiment of the present disclosure, a decoding apparatus performing image decoding is provided. The decoding apparatus includes an entropy decoder configured to receive image information including prediction related information for a current block and a predictor configured to generate a reconstructed sample of the current block based on the image information.

According to another embodiment of the present disclosure, an image encoding method performed by an encoding apparatus is provided. The method includes generating a reconstructed sample of a current block, generating prediction related information for the current block and encoding image information including the prediction related information.

According to another embodiment of the present disclosure, an image encoding apparatus is provided. The encoding apparatus includes a predictor configured to generate a reconstructed sample of a current block, and an entropy encoder configured to generate prediction related information for the current block, to encode image information including the prediction related information.

Advantageous Effects

According to the present disclosure, it is possible to improve overall image/video compression efficiency.

According to the present disclosure, it is possible to reduce hardware and software implementation complexity using a unified intra prediction mode list construction process for intra prediction types.

According to the present disclosure, it is possible to improve intra-prediction coding efficiency by reducing dependency on intra prediction types using a unified intra prediction mode list construction process for intra prediction types.

According to the present disclosure, it is possible to improve the coding efficiency of intra prediction by deriving a reference sample used when MRL is applied and the intra prediction mode is derived as the DC intra prediction mode based on the reference picture index.

According to the present disclosure, it is possible to improve the coding efficiency of intra prediction by deriving a reference sample used when MRL is applied and the intra prediction mode is derived as the DC intra prediction mode based on the reference picture index and a shape of the current block.

According to the present disclosure, it is possible to improve the coding efficiency of intra prediction by deriving a reference sample used when MRL is applied and the intra prediction mode is derived as the planar intra prediction mode based on the reference picture index.

BRIEF DESCRIPTION OF THE DRAWINGS

FIG. 26 schematically shows the syntax elements related to ISP.

FIG. 27 schematically shows an example of the MPM list generation method.

FIG. 28 schematically shows another example of the MPM list generation method.

FIG. 29 schematically shows another example of the MPM list generation method.

FIG. 30 schematically shows another example of the MPM list generation method.

FIGS. 31-32 schematically show a source code for a method for generating the MPM list according to an embodiment of present document.

FIGS. 33-35 schematically show a method for generating the MPM list in standard format according to an embodiment of present document.

FIG. 36 schematically shows an intra prediction process in standard format according to an embodiment of present document.

FIG. 37 schematically shows a planar intra prediction mode-based intra prediction process when the MRL is applied in standard format according to an embodiment of present document.

FIG. 38 schematically shows a DC intra prediction mode-based intra prediction process when the MRL is applied in standard format according to an embodiment of present document.

FIG. 39 schematically shows an example of a horizontal transform kernel and a vertical transform kernel derived according to the intra prediction mode.

FIG. 40 schematically shows an example of an assignment of context index increment to syntax elements.

FIG. 41 schematically shows a DC intra prediction mode-based intra prediction process when the MRL is applied in standard format according to an embodiment of present document.

FIG. 42 schematically shows a planar intra prediction mode-based intra prediction process when the MRL is applied in standard format according to an embodiment of present document.

DESCRIPTION OF EXEMPLARY EMBODIMENTS

Figure 1:
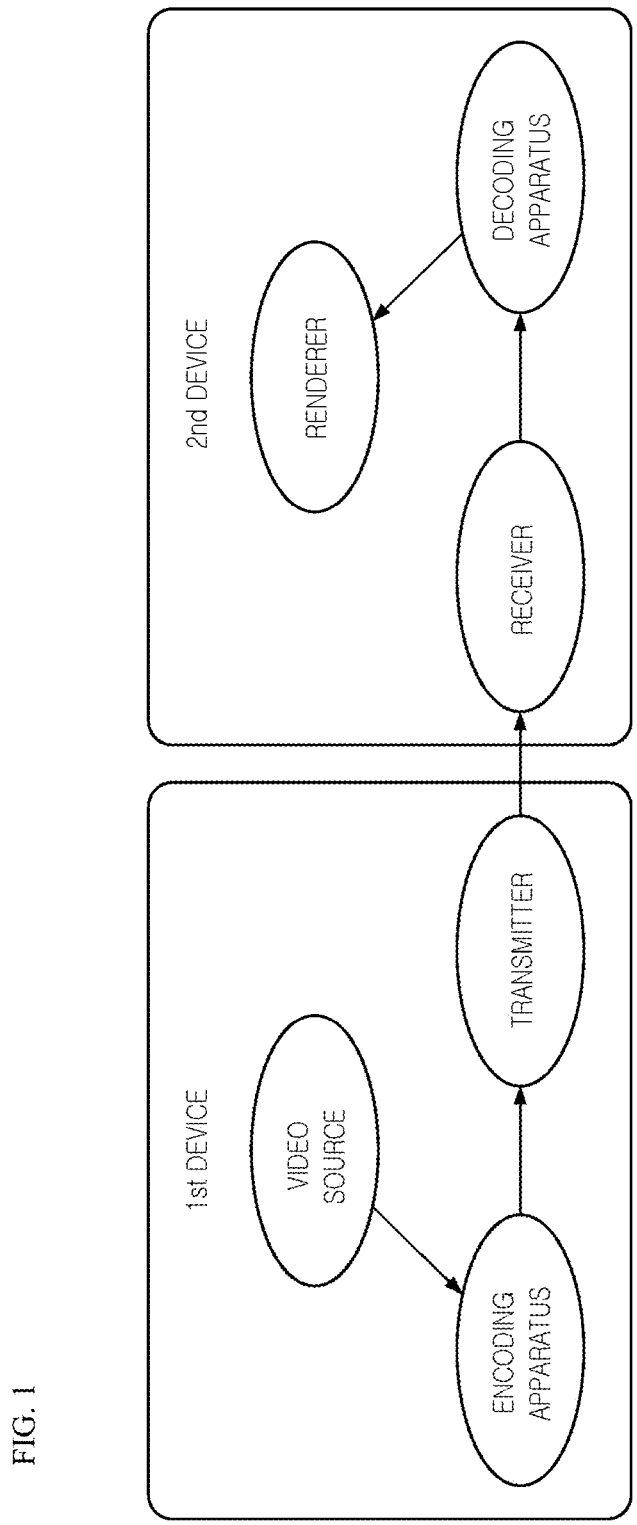
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure.

Present disclosure relates to video/image coding. For example, the methods/embodiments disclosed in the present disclosure may be applied to a method disclosed in the versatile video coding (VVC). Also, the methods/embodiments disclosed in the present disclosure may be applied to a method disclosed in the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

In the present disclosure, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice may include an integer number of complete tiles or an integer number of consecutive complete CTU rows within a tile of a picture, that may be exclusively contained in a single NAL unit.

Meanwhile, a picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present specification, "A or B" may mean "only A", "only B" or "both A and B". In other words, "A or B" may be construed as "A and/or B" in the present specification. For example, "A, B or C" may mean "only A", "only B", "only C" or "any combination of A, B and C" in the present specification.

A slash (/) or a comma used in the present specification may mean "and/of". For example, "A/B" may mean "A and/or B". Accordingly, "A/B" may mean "only A", "only B" or "both A and B". For example, "A, B, C" may mean "A, B or C".

In the present specification, "at least one of A and B" may mean "only A", "only B" or "both A and B". Further, "at least one of A or B" or "at least one of A and/or B" may be construed as "at least one of A and B" in the present specification.

Furthermore, "at least one of A, B and C" may mean "only A", "only B", "only C" or "any combination of A, B and C" in the present specification. In addition, "at least one of A, B or C" or "at least one of A, B and/or C" may mean "at least one of A, B and C".

Moreover, a parenthesis used in the present specification may mean "for example". Specifically, in the case of "prediction (intra-prediction)", it may represent that "intra-prediction" is proposed as an example of "prediction". In other words, "prediction" in the present specification is not limited to "intra-prediction" and "intra-prediction" may be proposed as an example of "prediction". Further, in the case of "prediction (i.e., intra-prediction)", it may also represent that "intra-prediction" is proposed as an example of "prediction".

Technical features individually described in a single drawing may be implemented individually or simultaneously in the present specification.

Figure 2:
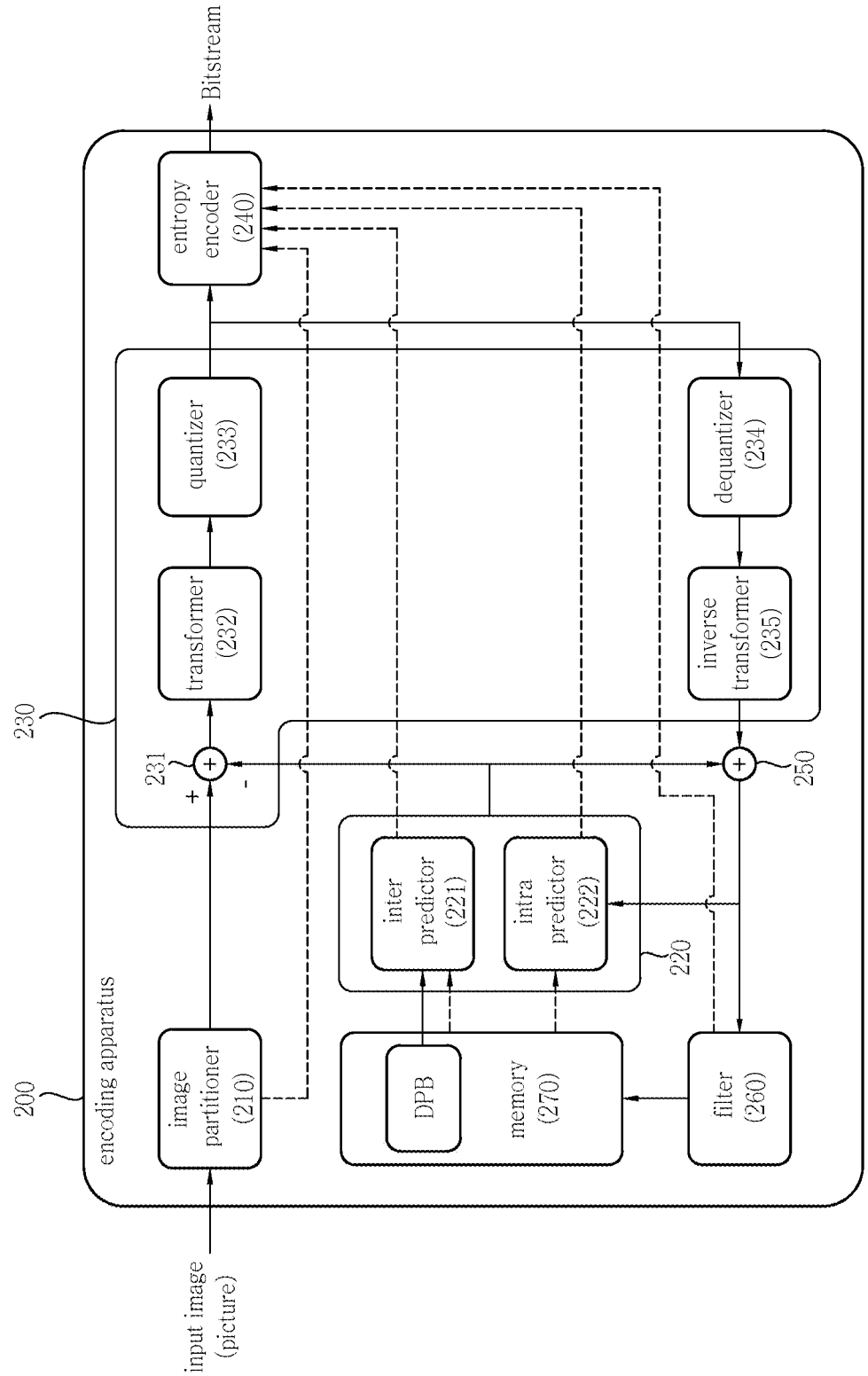
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the encoding apparatus may include an image encoding apparatus and/or a video encoding apparatus. Also, an image encoding method/apparatus may include a video encoding method/apparatus. Alternatively, a video encoding method/apparatus may include an image encoding method/apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra-prediction or inter-prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra-prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter-prediction mode, the motion information may be predicted in units of blocks, sub-blocks, or samples based on correlation of motion information between the neighboring block and the current block. The motion information may include a motion vector and a reference picture index. The motion information may further include inter-prediction direction (L0 prediction, L1 prediction, Bi prediction, etc.) information. In the case of inter-prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter-prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra-prediction or inter-prediction to predict one block but also simultaneously apply both intra-prediction and inter-prediction. This may be called combined inter and intra-prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter-prediction in that a reference block is derived in the current picture. That is, the IBC may use at least one of the inter-prediction techniques described in the present disclosure. The palette mode may be considered as an example of intra coding or intra-prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra-prediction of a next block to be processed in the current picture and may be used for inter-prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter-prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
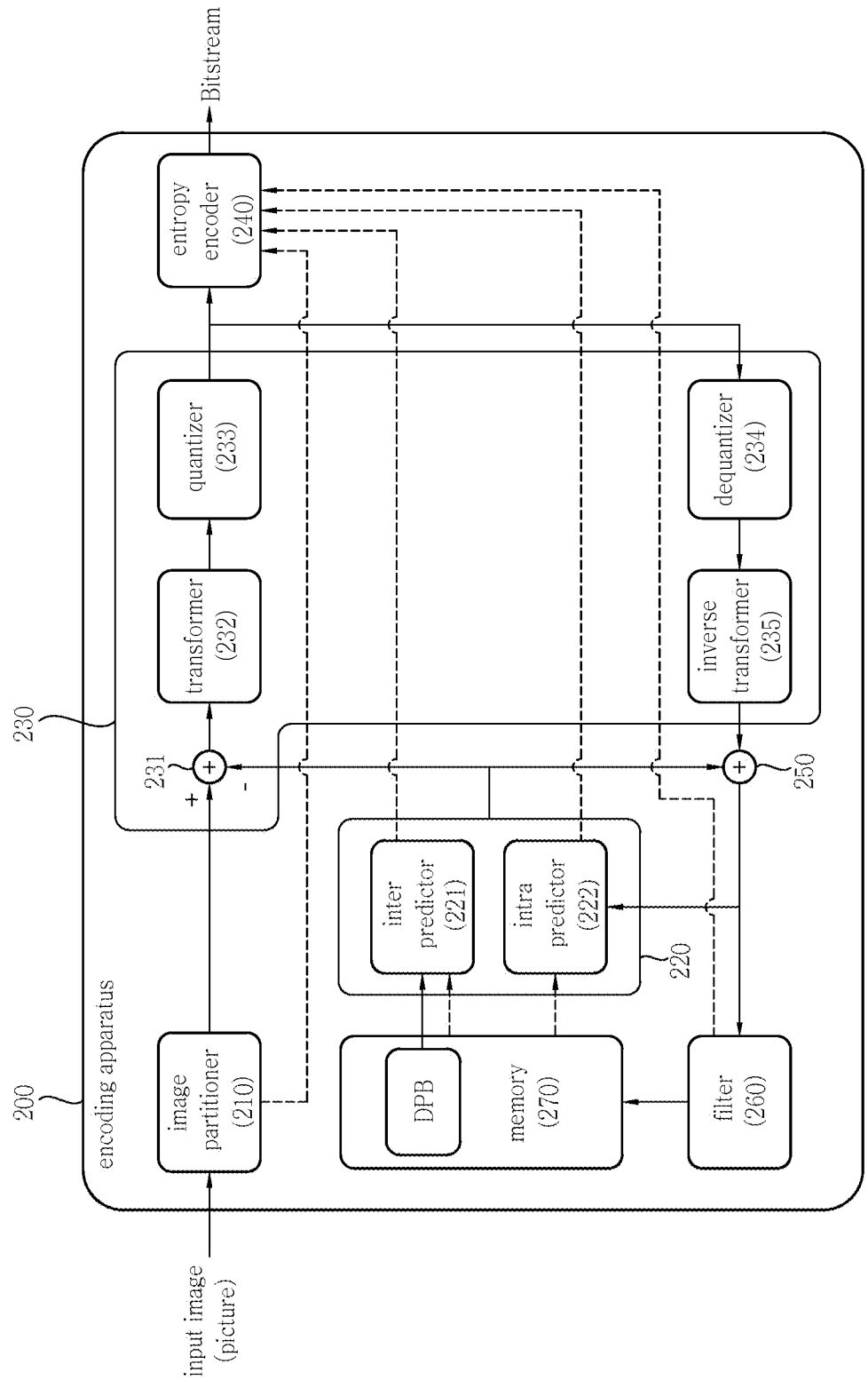
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied. Hereinafter, the decoding apparatus may include an image decoding apparatus and/or a video decoding apparatus. Also, an image decoding method/apparatus may include a video decoding method/apparatus. Alternatively, a video decoding method/apparatus may include an image decoding method/apparatus.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra-prediction or inter-prediction is applied to the current block based on the information on the prediction output from the entropy decoder 310 and may determine a specific intra/inter-prediction mode.

The predictor 320 may generate a prediction signal based on various prediction methods described below. For example, the predictor may not only apply intra-prediction or inter-prediction to predict one block but also simultaneously apply intra-prediction and inter-prediction. This may be called combined inter and intra-prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter-prediction in that a reference block is derived in the current picture. That is, the IBC may use at least one of the inter-prediction techniques described in the present disclosure. The palette mode may be considered as an example of intra coding or intra-prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra-prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter-prediction mode, motion information may be predicted in units of blocks, sub-blocks, or samples based on correlation of motion information between the neighboring block and the current block. The motion information may include a motion vector and a reference picture index. The motion information may further include inter-prediction direction (L0 prediction, L1 prediction, Bi prediction, etc.) information. In the case of inter-prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter-prediction may be performed based on various prediction modes, and the information on the prediction may include information indicating a mode of inter-prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra-prediction of a next block to be processed in the current picture, may be output through filtering as described below, or may be used for inter-prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Figure 4:
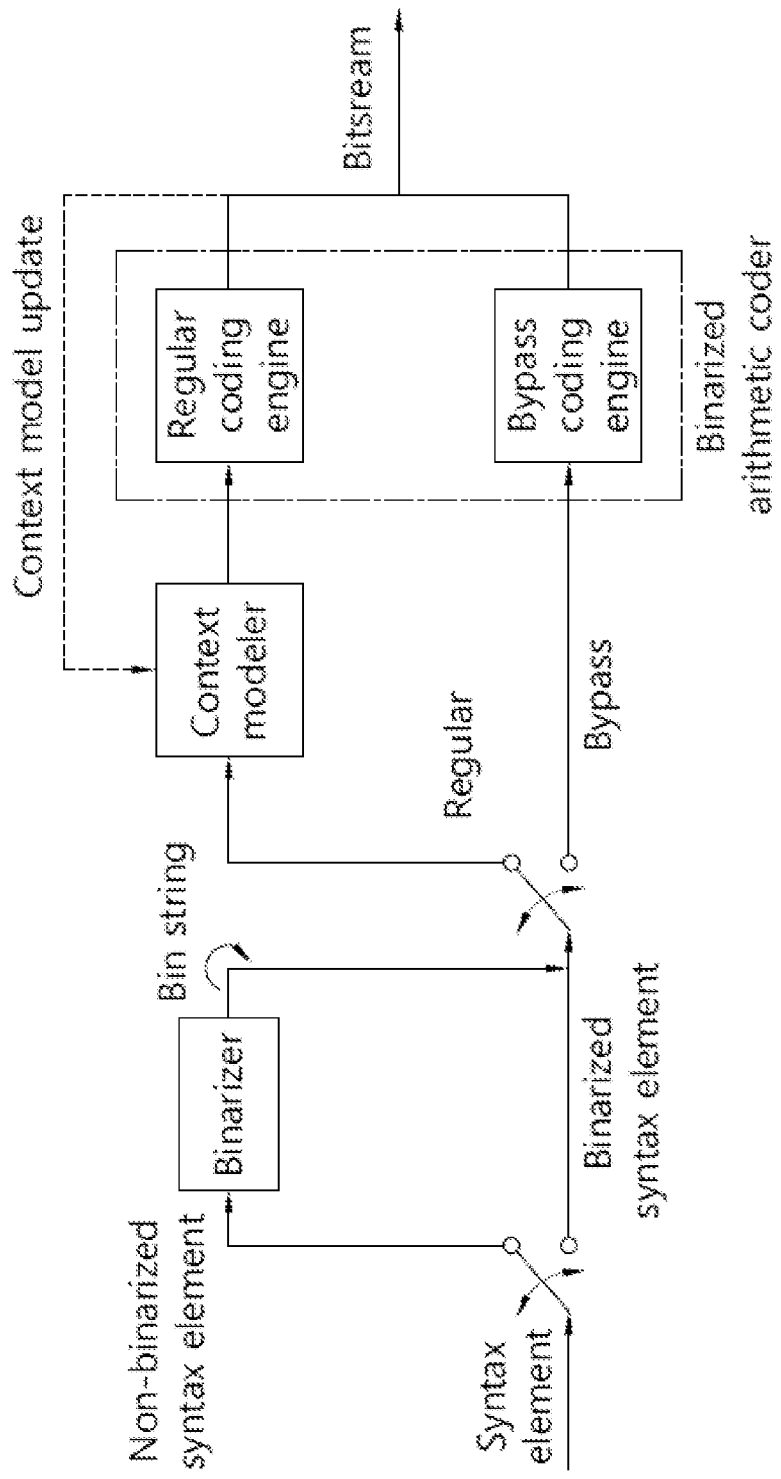
FIG. 4 schematically shows a hierarchical structure for a coded image/video.

FIG. 4 schematically shows a hierarchical structure for a coded image/video.

Referring to FIG. 4, the coded image/video is divided into a video coding layer (VCL) that handles decoding processing of the image/video and itself, a subsystem that transmits and stores coded information, and a network abstraction layer (NAL) that exists between them the VCL and the subsystem and is responsible for network adaptation functions.

In the VCL, VCL data including compressed video data (slice data) may be generated, or a Supplemental Enhancement Information (SEI) message additionally necessary for the video decoding process or a parameter set including information such as a picture parameter set (PPS), a sequence parameter set (SPS), a video parameter set (VPS) may be generated.

In the NAL, a NAL unit may be generated by adding header information (NAL unit header) to a raw byte sequence payload (RBSP) generated in the VCL. In this case, the RBSP refers to slice data, parameter set, SEI message, etc. generated in the VCL. The NAL unit header may include NAL unit type information specified according to RBSP data included in the corresponding NAL unit.

As shown in the figure, the NAL unit may be divided into a VCL NAL unit and a Non-VCL NAL unit according to the RBSP generated in the VCL. The VCL NAL unit may mean a NAL unit including information about an image (slice data), the Non-VCL NAL unit may mean a NAL unit including information (a parameter set or an SEI message) necessary for decoding the image.

The above-described VCL NAL unit and Non-VCL NAL unit may be transmitted through a network by attaching header information according to a data standard of a subsystem. For example, the NAL unit may be transformed into a data form of a predetermined standard such as H.266/VVC file format, Real-time Transport Protocol (RTP), Transport Stream (TS), and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be largely classified into a VCL NAL unit type and a Non-VCL NAL unit type according to whether or not the NAL unit includes image information (slice data). The VCL NAL unit type may be classified according to properties and types of pictures included in the VCL NAL unit, and the Non-VCL NAL unit type may be classified according to a type of a parameter set.

The following is an example of the NAL unit type specified according to the type of parameter set included in the Non-VCL NAL unit type.

Adaptation Parameter Set (APS) NAL unit: a type for a NAL unit containing the APS Decoding Parameter Set (DPS) NAL unit: a type for a NAL unit containing the DPS Video Parameter Set (VPS) NAL unit: a type for a NAL unit containing the VPS Sequence Parameter Set (SPS) NAL unit: a type for a NAL unit containing the SPS PPS (Picture Parameter Set) NAL unit: a type for a NAL unit containing the PPS Picture header (PH) NAL unit: a type for a NAL unit containing the PH The above-described NAL unit types may have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added for a plurality of slices (a slice header and a slice data set) in one picture. The picture header (picture header syntax) may include information/parameters commonly applicable to the picture. In the present disclosure, a slice may be mixed or replaced with a tile group. Also, in the present disclosure, a slice header may be mixed or replaced with a type group header.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In the present disclosure, high level syntax (HLS) may include at least one of the APS syntax, PPS syntax, SPS syntax, VPS syntax, DPS syntax, picture header syntax, and slice header syntax.

In the present disclosure, image/video information encoded by the encoding apparatus and signaled in the form of a bitstream to the decoding apparatus may include not only picture partitioning related information, intra/inter prediction information, residual information, in-loop filtering information, etc., but also information included in the slice header, information included in the picture header, information included in the APS, information included in the PPS, information included in the SPS, information included in the VPS and/or information included in the DPS. In addition, the image/video information may further include information of a NAL unit header.

Also, as described above, the encoding apparatus may perform various encoding methods such as, for example, exponential Golomb, context-adaptive variable length coding (CAVLC), and context-adaptive binary arithmetic coding (CABAC). In addition, the decoding apparatus may decode information in the bitstream based on a coding method such as the exponential Golomb coding, the CAVLC or the CABAC, and output a value of a syntax element required for image reconstruction and a quantized value of a transform coefficient related to a residual.

For example, the above-described coding methods may be performed as described below.

Figure 5:
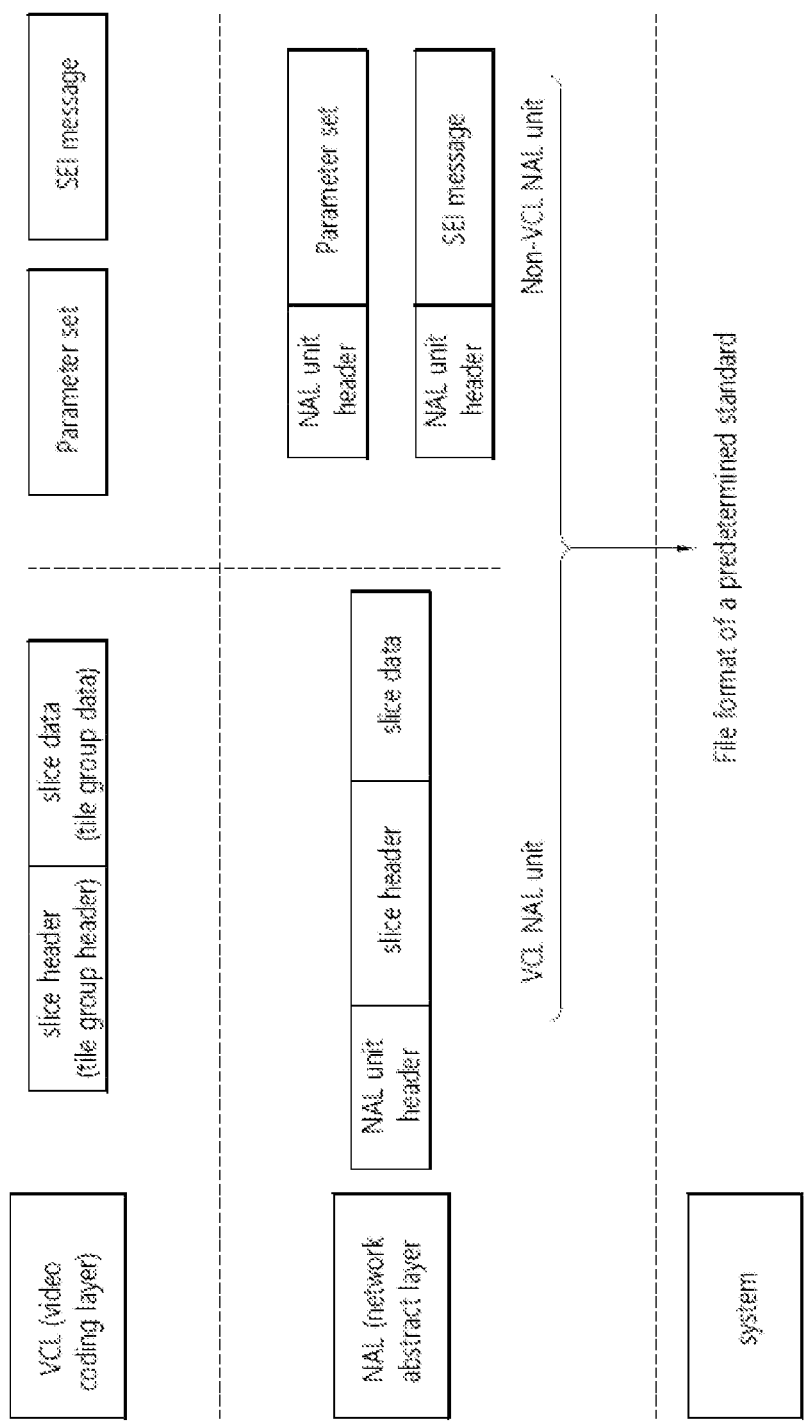
FIG. 5 schematically shows context-adaptive binary arithmetic coding (CABAC) for encoding a syntax element.

FIG. 5 schematically shows context-adaptive binary arithmetic coding (CABAC) for encoding a syntax element. For example, in the CABAC encoding process, when an input signal is a syntax element instead of a binary value, the encoding apparatus may convert the input signal into a binary value by binarizing the value of the input signal. In addition, when the input signal is already a binary value (ie, when a value of the input signal is a binary value), binarization may not be performed and may be bypassed. Here, each binary number 0 or 1 constituting a binary value may be referred to as a bin. For example, if the binary string after binarization is 110, each of 1, 1, and 0 is called one bin. The bin(s) for one syntax element may indicate a value of the syntax element.

Thereafter, the binarized bins of the syntax element may be input to a regular encoding engine or a bypass encoding engine. The regular encoding engine of the encoding apparatus may allocate a context model reflecting a probability value to the corresponding bin, and may encode the corresponding bin based on the allocated context model. The regular encoding engine of the encoding apparatus may update the context model for the corresponding bin after encoding for each bin. The encoded bin as described above may be referred to as a context-coded bin.

Meanwhile, when the binarized bins of the syntax element are input to the bypass encoding engine, they may be coded as follows. For example, the bypass encoding engine of the encoding apparatus omits a procedure of estimating a probability with respect to an input bin and a procedure of updating a probability model applied to the bin after encoding. When bypass encoding is applied, the encoding apparatus may encode the input bin by applying a uniform probability distribution instead of allocating the context model, thereby improving the encoding speed. The encoded bin as described above may be referred to as a bypass bin.

Entropy decoding may represent a process of performing the same process as the above-described entropy encoding in a reverse order.

For example, when a syntax element is decoded based on a context model, the decoding apparatus may receive a bin corresponding to the syntax element through a bitstream, may determine a context model using the syntax element and decoding information of a decoding target block or neighboring blocks, or information of symbols/bins decoded in the previous step, may derive a value of the syntax element by predicting the occurrence probability of the received bin according to the determined context model and performing arithmetic decoding of the bin. Thereafter, a context model of a next decoded bin may be updated with the determined context model.

Also, for example, when a syntax element is bypass decoded, the decoding apparatus may receive a bin corresponding to the syntax element through a bitstream, and may decode the input bin by applying a uniform probability distribution. In this case, the decoding apparatus may omit a procedure for deriving a context model of the syntax element and a procedure for updating a context model applied to the bin after decoding.

Meanwhile, when video coding is performed as described above, prediction is performed in order to improve compression efficiency. Accordingly, a predicted block including prediction samples for a current block that is a coding target block may be generated. For example, when the aforementioned intra-prediction is performed, a correlation between samples may be used and a difference between an original block and a predicted block, that is, a residual, may be obtained. The aforementioned transform and quantization may be applied to the residual to remove spatial redundancy. Specifically, an encoding method and a decoding method using intra-prediction may be as follows.

Figure 6:
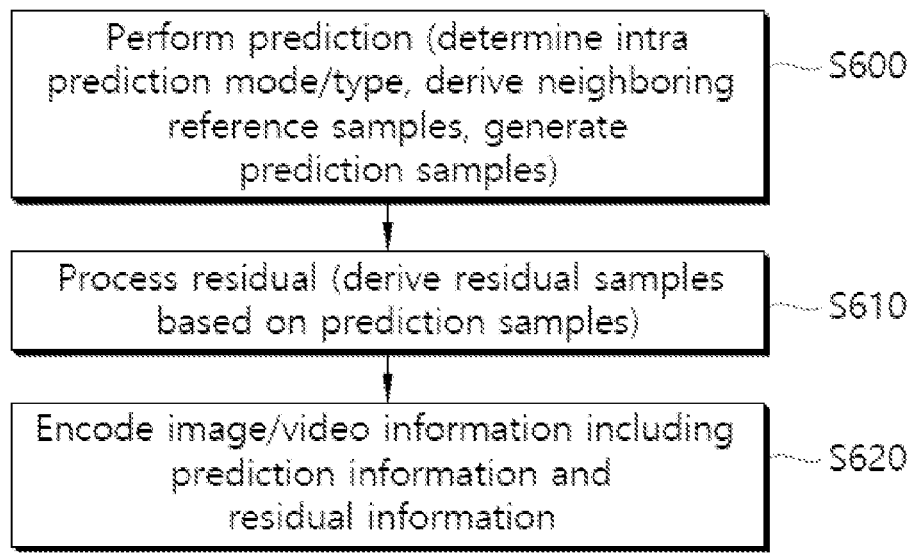
FIG. 6 illustrates an example of an intra prediction-based video/image encoding method.

FIG. 6 illustrates an example of an intra prediction-based video/image encoding method.

Referring to FIG. 6, the encoding device performs intra prediction on the current block S600. The encoding device derives an intra prediction mode/type for the current block, derives neighboring reference samples of the current block, generates prediction samples in the current block based on the intra prediction mode/type and the neighboring reference samples. Here, the intra prediction mode/type determination, neighboring reference samples derivation, and prediction samples generation procedures may be performed simultaneously, or one procedure may be performed before another procedure. The encoding device may determine a mode/type applied to the current block from among a plurality of intra prediction modes/types. The encoding device may compare RD costs for the intra prediction mode/types and determine an optimal intra prediction mode/type for the current block.

Meanwhile, the encoding device may perform a prediction sample filtering procedure. The prediction sample filtering may be referred to as post filtering. Some or all of the prediction samples may be filtered by the prediction sample filtering procedure. In some cases, the prediction sample filtering procedure may be omitted.

The encoding device generates residual samples for the current block based on the (filtered) prediction samples S610. The encoding device may compare the prediction samples in the original samples of the current block based on the phase and derive the residual samples.

The encoding device may encode image information including information on the intra prediction (prediction information) and residual information on the residual samples S620. The prediction information may include the intra prediction mode information and the intra prediction type information. The encoding device may output encoded image information in the form of a bitstream. The output bitstream may be transmitted to the decoding device through a storage medium or a network.

The residual information may include residual coding syntax, which will be described later. The encoding device may transform/quantize the residual samples to derive quantized transform coefficients. The residual information may include information on the quantized transform coefficients.

Meanwhile, as described above, the encoding device may generate a reconstructed picture (including reconstructed samples and reconstructed blocks). To this end, the encoding device may derive (modified) residual samples by performing inverse quantization/inverse transformation on the quantized transform coefficients again. The reason for performing the inverse quantization/inverse transformation again after transforming/quantizing the residual samples in this way is to derive the same residual samples as the residual samples derived in the decoding device as described above. The encoding device may generate a reconstructed block including reconstructed samples for the current block based on the prediction samples and the (modified) residual samples. A reconstructed picture for the current picture may be generated based on the reconstructed block. As described above, an in-loop filtering procedure may be further applied to the reconstructed picture.

Figure 7:
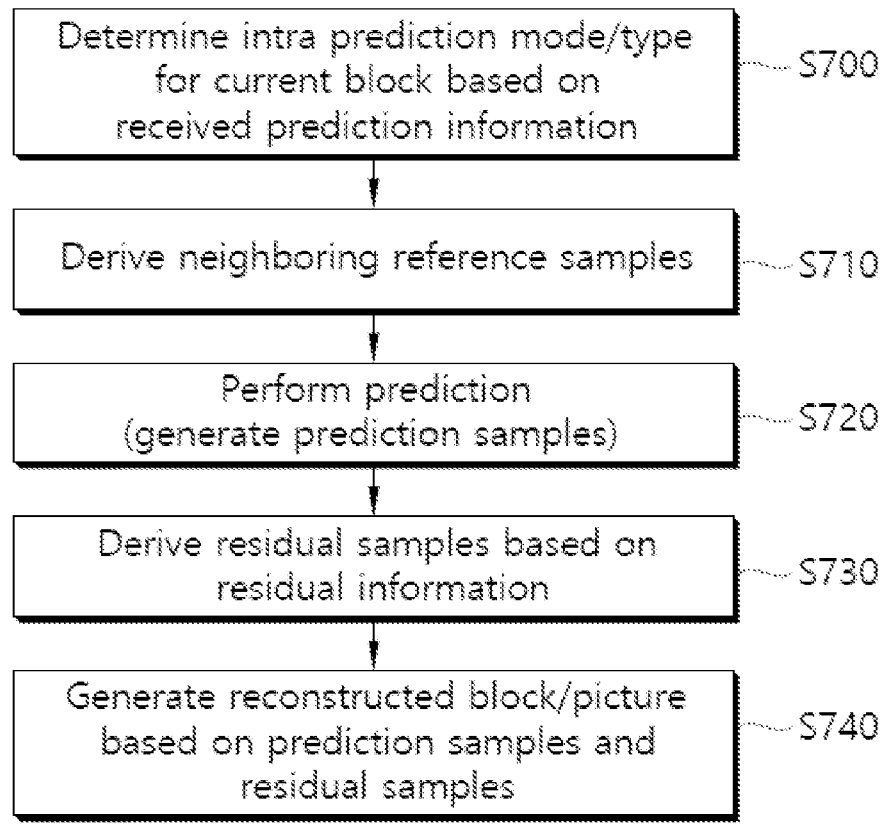
FIG. 7 illustrates an example of an intra prediction-based video/image decoding method.

FIG. 7 illustrates an example of an intra prediction-based video/image decoding method.

The decoding device may perform an operation corresponding to the operation performed by the encoding apparatus.

Prediction information and residual information may be obtained from a bitstream. Residual samples for the current block may be derived based on the residual information. Specifically, transform coefficients may be derived by performing inverse quantization based on the quantized transform coefficients derived based on the residual information, residual samples for the current block may be derived by performing inverse transform on the transform coefficients.

Specifically, the decoding device may derive the intra prediction mode/type for the current block based on the received prediction information (intra prediction mode/type information) S700. The decoding device may derive neighboring reference samples of the current block S710. The decoding device generates prediction samples in the current block based on the intra prediction mode/type and the neighboring reference samples S720. In this case, the decoding device may perform a prediction sample filtering procedure. The Predictive sample filtering may be referred to as post filtering. Some or all of the prediction samples may be filtered by the prediction sample filtering procedure. In some cases, the prediction sample filtering procedure may be omitted.

The decoding device generates residual samples for the current block based on the received residual information S730. The decoding device may generate reconstructed samples for the current block based on the prediction samples and the residual samples, and may derive a reconstructed block including the reconstructed samples S740. A reconstructed picture for the current picture may be generated based on the reconstructed block. As described above, an in-loop filtering procedure may be further applied to the reconstructed picture.

The intra prediction mode information may include, for example, flag information (ex. intra_luma_mpm_flag) indicating whether MPM (most probable mode) is applied to the current block or whether a remaining mode is applied, and, when the MPM is applied to the current block, the prediction mode information may further include index information (eg, intra_luma_mpm_idx) indicating one of the intra prediction mode candidates (MPM candidates). The intra prediction mode candidates (MPM candidates) may be constructed of an MPM candidate list or an MPM list. In addition, when the MPM is not applied to the current block, the intra prediction mode information includes remaining mode information (ex. intra_luma_mpm_remainder) indicating one of the remaining intra prediction modes except for the intra prediction mode candidates (MPM candidates). The decoding device may determine the intra prediction mode of the current block based on the intra prediction mode information.

Also, the intra prediction type information may be implemented in various forms. For example, the intra prediction type information may include intra prediction type index information indicating one of the intra prediction types. As another example, the intra prediction type information may include at least one of reference sample line information (ex. intra_luma_ref_idx) representing whether the MRL is applied to the current block and, if applied, which reference sample line is used, ISP flag information representing whether the ISP is applied to the current block (ex. intra_subpartitions_mode_flag), ISP type information indicating a split type of subpartitions when the ISP is applied (ex. intra_subpartitions_split_flag), flag information representing whether PDCP is applied or flag information representing whether LIP is applied. Also, the intra prediction type information may include a MIP flag representing whether matrix-based intra prediction (MIP) is applied to the current block.

The intra prediction mode information and/or the intra prediction type information may be encoded/decoded through a coding method described in the present disclosure. For example, the intra prediction mode information and/or the intra prediction type information may be encoded/decoded through entropy coding (eg, CABAC, CAVLC).

Figure 8:
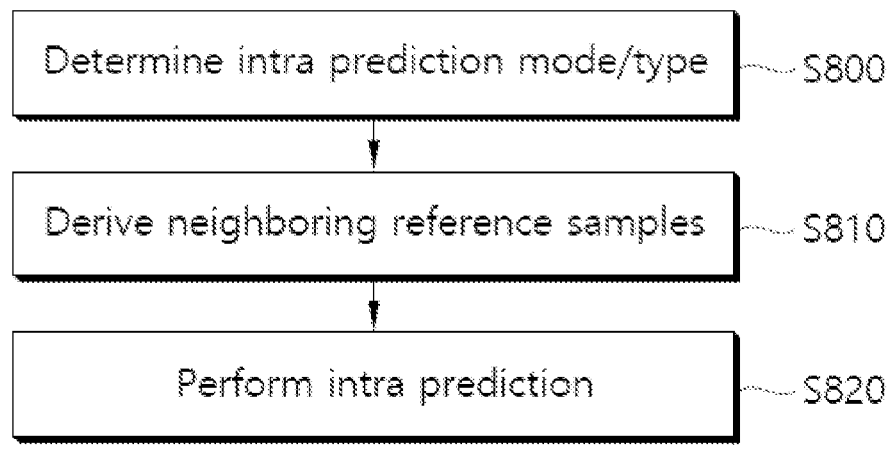
FIG. 8 schematically shows an intra prediction procedure.

FIG. 8 schematically shows an intra prediction procedure.

Referring to FIG. 8, as described above, the intra prediction procedure may include a step of determinating an intra prediction mode/type, a step of deriving neighboring reference samples, and a step of performing intra prediction (generating a prediction sample). The intra prediction procedure may be performed by the encoding device and the decoding device as described above. In the present disclosure, a coding device may include the encoding device and/or the decoding device.

Referring to FIG. 8, the coding device determines an intra prediction mode/type S800.

The encoding device may determine an intra prediction mode/type applied to the current block from among the various intra prediction modes/types described above, and may generate prediction related information. The prediction related information may include intra prediction mode information representing an intra prediction mode applied to the current block and/or intra prediction type information representing an intra prediction type applied to the current block. The decoding device may determine an intra prediction mode/type applied to the current block based on the prediction related information.

The intra prediction mode information may include, for example, flag information (ex. intra_luma_mpm_flag) representing whether a most probable mode (MPM) is applied to the current block or a remaining mode is applied, and the When the MPM is applied to the current block, the prediction mode information may further include index information (eg, intra_luma_mpm_idx) indicating one of the intra prediction mode candidates (MPM candidates). The intra prediction mode candidates (MPM candidates) may be constructed of an MPM candidate list or an MPM list. In addition, when the MPM is not applied to the current block, the intra prediction mode information may further include remaining mode information (ex. intra_luma_mpm_remainder) indicating one of the remaining intra prediction modes except for the intra prediction mode candidates (MPM candidates). The decoding device may determine the intra prediction mode of the current block based on the intra prediction mode information.

In addition, the intra prediction type information may be implemented in various forms. For example, the intra prediction type information may include intra prediction type index information indicating one of the intra prediction types. As another example, the intra prediction type information may include at least one of reference sample line information (ex. intra_luma_ref_idx) representing whether the MRL is applied to the current block and, if applied, which reference sample line is used, ISP flag information representing whether the ISP is applied to the current block (ex. intra_subpartitions_mode_flag), ISP type information indicating a split type of subpartitions when the ISP is applied (ex. intra_subpartitions_split_flag), flag information representing whether PDCP is applied or flag information representing whether LIP is applied. Also, the intra prediction type information may include a MIP flag representing whether matrix-based intra prediction (MIP) is applied to the current block.

For example, when intra prediction is applied, an intra prediction mode applied to the current block may be determined using an intra prediction mode of a neighboring block. For example, the coding device may select one of most probable mode (MPM) candidates in the MPM list derived based on additional candidate modes and/or an intra prediction mode of the neighboring block (eg, the left and/or top neighboring block) of the current block, or select one of the remaining intra prediction modes not included in the MPM candidates (and planar mode) based on the MPM remainder information (remaining intra prediction mode information). The MPM list may be configured to include or not include the planner mode as a candidate. For example, when the MPM list includes a planner mode as a candidate, the MPM list may have 6 candidates, and when the MPM list does not include a planner mode as a candidate, the MPM list may have 5 candidates. When the MPM list does not include the planar mode as a candidate, a not planar flag (ex. intra_luma_not_planar_flag) representing whether the intra prediction mode of the current block is not the planar mode may be signaled. For example, the MPM flag may be signaled first, and the MPM index and not planner flag may be signaled when the value of the MPM flag is 1. Also, the MPM index may be signaled when the value of the not planner flag is 1. Here, the fact that the MPM list is configured not to include the planner mode as a candidate is that the planner mode is always considered as MPM rather than that the planner mode is not MPM, thus, the flag (not planar flag) is signaled first to check whether it is the planar mode.

For example, whether the intra prediction mode applied to the current block is among the MPM candidates (and the planar mode) or the remaining modes may be indicated based on the MPM flag (eg, intra_luma_mpm_flag). The MPM flag with a value of 1 may indicate that the intra prediction mode for the current block is within MPM candidates (and planar mode), and The MPM flag with a value of 0 may indicate that the intra prediction mode for the current block is not within MPM candidates (and planar mode). The not planar flag (ex. intra_luma_not_planar_flag) with a value of 0 may indicate that the intra prediction mode for the current block is a planar mode, and the not planar flag with a value of 1 may indicate that the intra prediction mode for the current block is not the planar mode. The MPM index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of the remaining intra prediction modes not included in the MPM candidates (and planar mode) among all intra prediction modes by indexing in the order of prediction mode number. The intra prediction mode may be an intra prediction mode for a luma component (sample). Hereinafter, the intra prediction mode information may include at least one of the MPM flag (ex. intra_luma_mpm_flag), the not planar flag (ex. intra_luma_not_planar_flag), the MPM index (ex. mpm_idx or intra_luma_mpm_idx), or the remaining intra prediction mode information (rem_intra_luma_luma_mpm_mode or intra_luma_mpminder). In the present disclosure, the MPM list may be referred to by various terms such as an MPM candidate list and candModeList.

When the MIP is applied to the current block, a separate MPM flag (ex. intra_mip_mpm_flag) for the MIP, an MPM index (ex. intra_mip_mpm_idx), and remaining intra prediction mode information (ex. intra_mip_mpm_remainder) may be signaled, and the not planar flag may not be signaled.

In other words, in general, when a block partition for an image is performed, the current block to be coded and a neighboring block have similar image characteristics. Therefore, there is a high probability that the current block and the neighboring block have the same or similar intra prediction mode. Accordingly, the encoder may use the intra prediction mode of the neighboring block to encode the intra prediction mode of the current block.

The coding device may construct a most probable modes (MPM) list for the current block. The MPM list may be referred to as the MPM candidate list. Here, the MPM may refer to modes used to improve coding efficiency in consideration of the similarity between the current block and the neighboring blocks during intra prediction mode coding. As described above, the MPM list may be constructed to include the planar mode, or may be constructed to exclude the planar mode. For example, when the MPM list includes the planar mode, the number of candidates in the MPM list may be 6. And, when the MPM list does not include the planar mode, the number of candidates in the MPM list may be 5.

The encoding device may perform prediction based on various intra prediction modes, and may determine an optimal intra prediction mode based on rate-distortion optimization (RDO) based thereon. In this case, the encoding device may determine the optimal intra prediction mode by using only the MPM candidates and planar mode configured in the MPM list, or by further using the remaining intra prediction modes as well as the MPM candidates and planar mode configured in the MPM list. Specifically, for example, if the intra prediction type of the current block is a specific type (ex. LIP, MRL, or ISP) other than the normal intra prediction type, the encoding device may determine the optimal intra prediction mode by considering only the MPM candidates and the planar mode as intra prediction mode candidates for the current block. That is, in this case, the intra prediction mode for the current block may be determined only from among the MPM candidates and the planar mode, and in this case, encoding/signaling of the MPM flag may not be performed. In this case, the decoding device may infer that the MPM flag is 1 without separately signaling the MPM flag.

Meanwhile, in general, when the intra prediction mode of the current block is not the planar mode and is one of the MPM candidates in the MPM list, the encoding device generates an MPM index (mpm idx) indicating one of the MPM candidates. when the intra prediction mode of the current block is not included in the MPM list, the encoding device generates MPM reminder information (remaining intra prediction mode information) indicating the same mode as the intra prediction mode of the current block among the remaining intra prediction modes not included in the MPM list (and planar mode). The MPM reminder information may include, for example, an intra_luma_mpm_remainder syntax element.

The decoding device obtains intra prediction mode information from the bitstream. As described above, the intra prediction mode information may include at least one of an MPM flag, a not planner flag, an MPM index, and MPM remaster information (remaining intra prediction mode information). The decoding device may construct the MPM list. The MPM list is constructed the same as the MPM list constructed in the encoding device. That is, the MPM list may include intra prediction modes of neighboring blocks, or may further include specific intra prediction modes according to a predetermined method.

The decoding device may determine the intra prediction mode of the current block based on the MPM list and the intra prediction mode information. For example, when the value of the MPM flag is 1, the decoding device may derive the planar mode as the intra prediction mode of the current block (based on not planar flag) or derive the candidate indicated by the MPM index from among the MPM candidates in the MPM list as the intra prediction mode of the current block. Here, the MPM candidates may represent only candidates included in the MPM list, or may include not only candidates included in the MPM list but also the planar mode applicable when the value of the MPM flag is 1.

As another example, when the value of the MPM flag is 0, the decoding device may derive an intra prediction mode indicated by the remaining intra prediction mode information (which may be referred to as mpm remainder information) among the remaining intra prediction modes not included in the MPM list and the planner mode as the intra prediction mode of the current block. Meanwhile, as another example, when the intra prediction type of the current block is a specific type (ex. LIP, MRL or ISP, etc.), the decoding device may derive a candidate indicated by the MPM flag in the planar mode or the MPM list as the intra prediction mode of the current block without parsing/decoding/checking the MPM flag.

The coding device derives neighboring reference samples of the current block S810. When intra prediction is applied to the current block, the neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

On the other hand, when the MRL is applied (that is, when the value of the MRL index is greater than 0), the neighboring reference samples may be located on lines 1 to 2 instead of line 0 adjacent to the current block on the left/top side, and in this case, the number of the neighboring reference samples may be further increased. Meanwhile, when the ISP is applied, the neighboring reference samples may be derived in units of sub-partitions.

The coding device derives prediction samples by performing intra prediction on the current block S820. The coding device may derive the prediction samples based on the intra prediction mode/type and the neighboring samples. The coding device may derive a reference sample according to an intra prediction mode of the current block among neighboring reference samples of the current block, and may derive a prediction sample of the current block based on the reference sample.

Meanwhile, when intra-prediction is applied to the current block, the encoding apparatus/decoding apparatus may derive an intra prediction mode for the current block and derive prediction samples for the current block based on the intra prediction mode, as described above. That is, the encoding apparatus/decoding apparatus may derive the prediction samples of the current block by applying a directional or non-directional mode based on neighboring reference samples of the current block.

For reference, intra prediction modes may include, for example, two non-directional (or non-angular) intra prediction modes and 65 directional (or angular) intra prediction modes. The non-directional intra prediction modes may include planar intra prediction mode #0 and DC intra prediction mode #1, and the directional intra prediction modes may include 65 intra prediction modes #2 to #66. However, this is an example and the present disclosure can also be applied to cases of different numbers of intra prediction modes. Intra prediction mode #67 may be additionally used as necessary and intra prediction mode #67 may represent a linear model (LM) mode.

Figure 9:
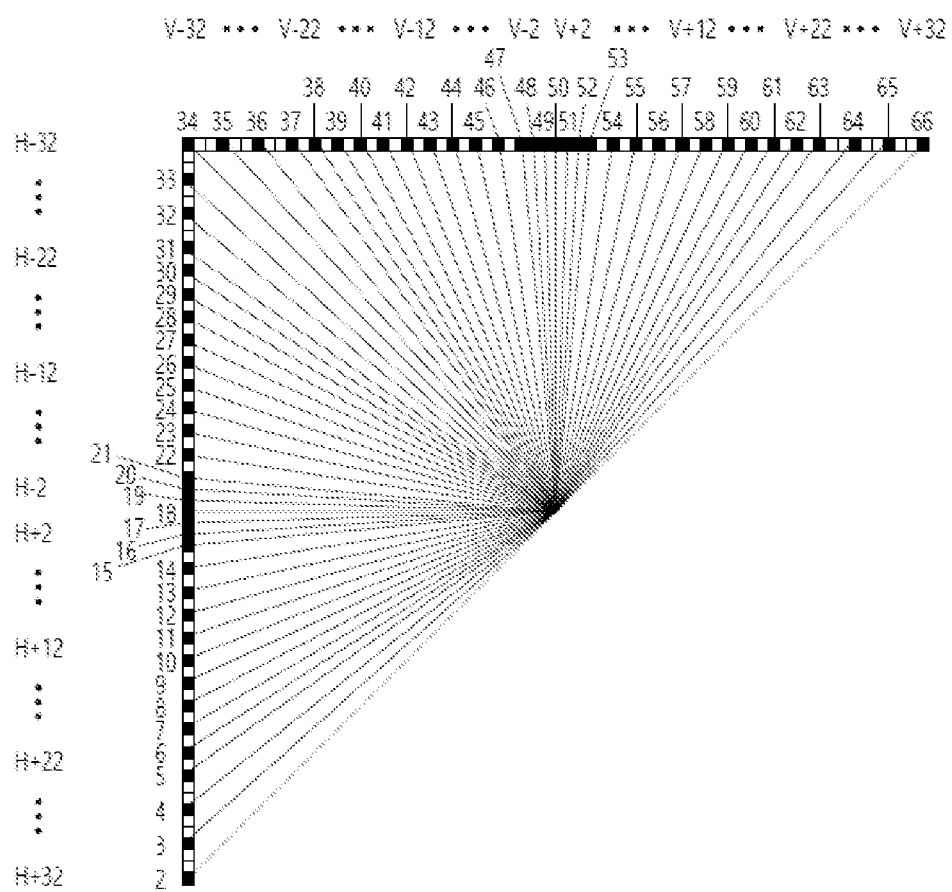
FIG. 9 illustrates intra-directional modes in 65 prediction directions.

FIG. 9 illustrates intra-directional modes in 65 prediction directions.

Referring to FIG. 9, the intra prediction modes may be divided into intra prediction modes having horizontal directionality and intra prediction modes having vertical directionality on the basis of intra prediction mode #34 in the top left diagonal prediction direction. In FIG. 9, H and V mean horizontal directionality and vertical directionality, and numerals −32 to 32 indicate displacement in units of 1/32 at a sample grid position. Intra prediction modes #2 to #33 have horizontal directionality and intra prediction modes #34 to #66 have vertical directionality. Intra prediction mode #18 and intra prediction mode #30 are respectively a horizontal intra prediction mode and a vertical intra prediction mode, intra prediction mode #2 may be called a bottom left diagonal intra prediction mode, intra prediction mode #34 may be called a top left diagonal intra prediction mode, and intra prediction mode #55 may be called a top right diagonal intra prediction mode.

As an embodiment of intra-prediction, a method of selecting a reference sample line having highest prediction accuracy from a plurality of reference sample lines of the current block and deriving a prediction sample using a reference sample located in a prediction direction in the selected reference sample line may be proposed. This method may be called multi-reference line (MRL) intra-prediction or MRL based intra-prediction.

Specifically, only neighboring samples of the first line above the current block and neighboring samples of the first line on the left of the current block can be used as reference samples for intra-prediction in conventional intra-prediction. However, in MRL, intra-prediction can be performed using neighboring samples positioned in upper and/or left sample lines separated from the current block by 1, 2 or 3 sample distances as reference samples.

Figure 10:
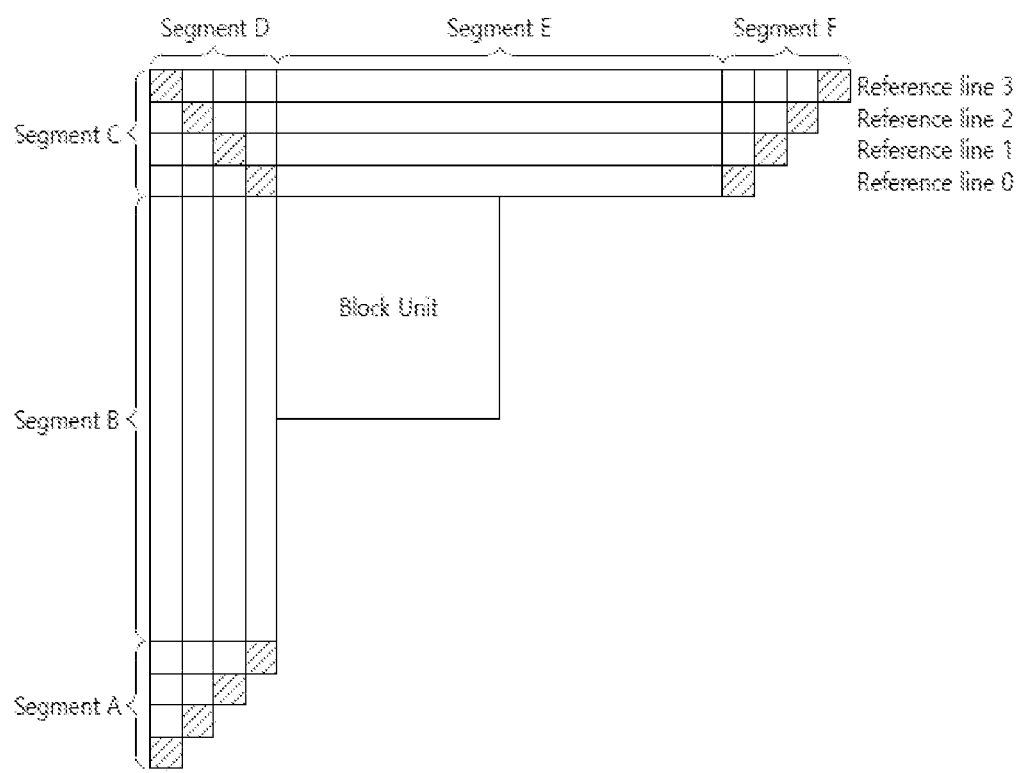
FIG. 10 illustrates multiple reference lines that can be used in MRL.

FIG. 10 illustrates multiple reference lines that can be used in MRL. When MRL is performed, the decoding apparatus may receive a reference line index. The reference line index may indicate one of the plurality of reference lines. The decoding apparatus may perform intra-prediction based on reference samples in a reference line indicated by the reference line index. A syntax element of the reference line index may be intra_luma_ref_idx. Further, MRL may be disabled for blocks of the first line (i.e., first row) in a CTU.

As an embodiment of intra-prediction, a method of partitioning the current block in the horizontal direction or the vertical direction and performing intra-prediction in units of partitioned blocks may be proposed. That is, a method of partitioning the current block in the horizontal direction or the vertical direction to derive sub-blocks and performing intra-prediction on the sub-blocks may be proposed. In this case, encoding/decoding may be performed per partitioned sub-block to generate a reconstructed block, and the reconstructed block may be used as a reference block of the next partitioned sub-block. The aforementioned method may also be called intra sub-partitions prediction (ISP prediction), intra sub-partitions (ISP) mode or intra sub-partitions (ISP) based prediction. Otherwise, the aforementioned method may also be called ISP based intra-prediction. Further, a sub-block may be called an intra sub-partition. Otherwise, sub-blocks (or sub-partitions) partitioned according to ISP may called transform units (TUs).

According to ISP, the current block may be partitioned into two or four sub-partitions in the vertical or horizontal direction based on the size of the current block. For example, when ISP is performed, the current block may be partitioned into the number of sub-blocks shown in the following table depending on the size of the current block.

TABLE 1

| Block size (CU) | Number of partitions |
|---|---|
| 4 × 4 | Not partitioned |
| 4 × 8, 8 × 4 | 2 |
| Other cases | 4 |

Referring to Table 1, ISP may be disabled when the size of the current block is 4×4. The current block may be partitioned into two sub-blocks when the size of the current block is 4×8 or 8×4 and may be partitioned into four sub-blocks when the current block has sizes other than 4×4, 4×8 and 8×4 (i.e., sizes greater than 4×8 or 8×4).

Figure 11A:
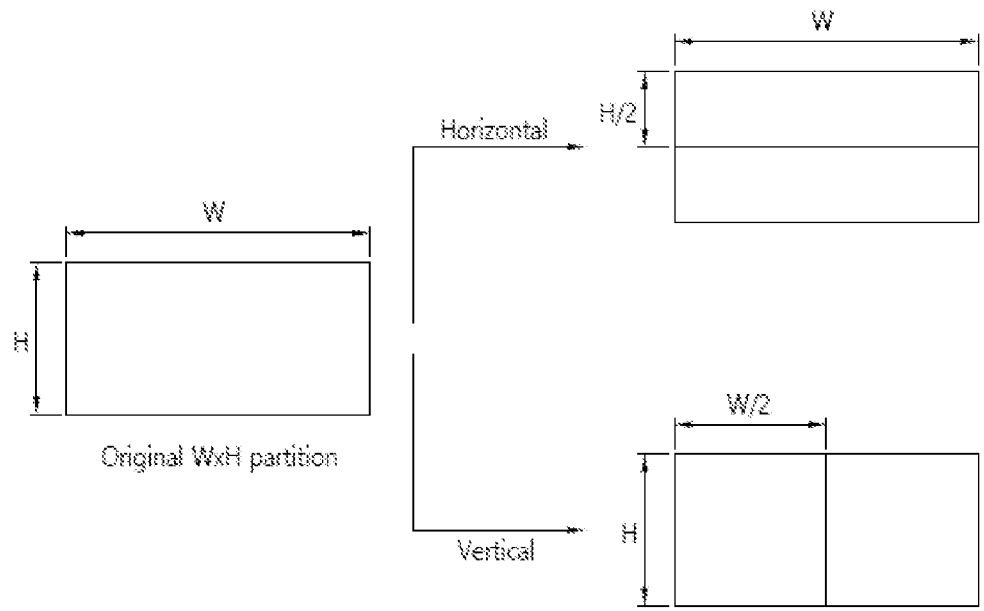
FIGS. 11A and 11B illustrates an example in which a block to which ISP is applied is partitioned into sub-blocks based on block sizes.
Figure 11B:
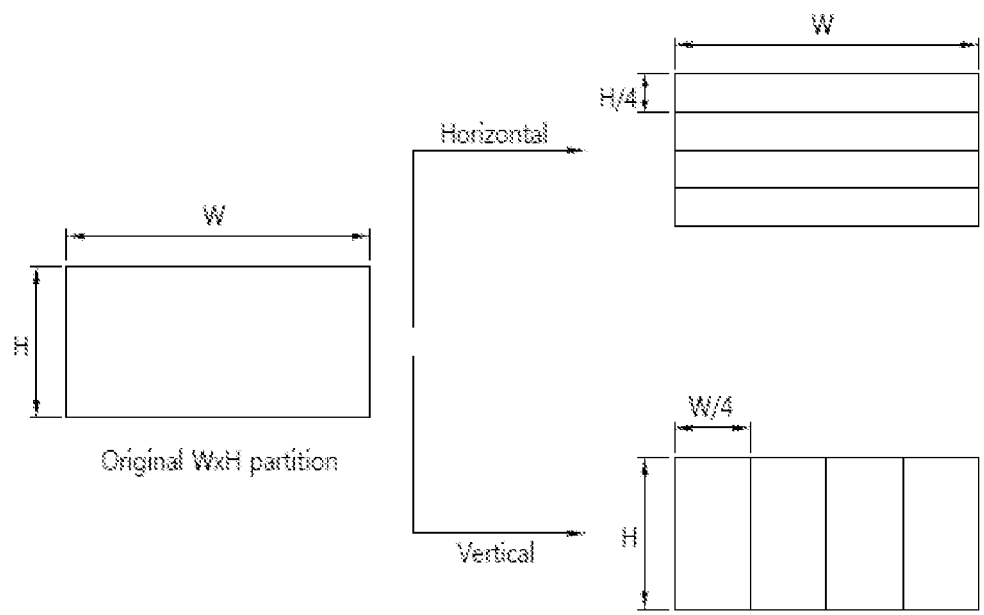

FIGS. 11A and 11B illustrate an example in which a block to which ISP is applied is partitioned into sub-blocks based on block sizes. Referring to FIG. 11A, the current block may be partitioned into two sub-blocks when the size of the current block is 4×8 or 8×4. Referring to FIG. 11B, the current block may be partitioned into four sub-blocks when the current block has sizes other than 4×4, 4×8 and 8×4 (i.e., sizes greater than 4×8 or 8×4).

Meanwhile, M×128 (M≤64) and 128×N (N≤64) ISP blocks (i.e., intra sub-partitions) may cause potential problems for 64×64 VDPU. For example, an M×128 CU in a single tree may have M×128 luma TBs and two M/2×64 chroma TBs corresponding to the luma TBs. When ISP is applied to the CU, a luma TB may be partitioned into four M×32 TBs, that is, four M×32 sub-blocks (only horizontal split is possible), and each TB is smaller than a 64×64 block. In this case, however, a chroma block to which ISP is applied may not be partitioned in design according to current video standards. Accordingly, the size of the two chroma component TBs for the luma component TBs is greater than 32×32. Likewise, a 128×N CU may cause a situation similar to the aforementioned situation. Accordingly, the aforementioned two cases may become problems in a 64×64 decoder pipeline. For this reason, a maximum size of a CU for which ISP can be used may be limited to 64×64.

When ISP is applied, the encoding apparatus may generate an MPM list depending on a partitioning method (e.g., horizontal split or vertical split) in order to reduce coding complexity and compare intra prediction modes in the generated MPM list in terms of rate distortion optimization (RDO) to derive an optimal intra prediction mode. When the aforementioned MRL is used, ISP cannot be used. That is, ISP can be applied only when a 0-th reference line is used for intra-prediction (i.e., when the value of intra_luma_ref_idx is 0). Further, when ISP is used, position dependent intra-prediction (PDPC) cannot be used.

A flag indicating whether ISP is applied may be transmitted per block, and when ISP is applied to the current block, a flag indicating whether a split type is horizontal split or vertical split, that is, whether a split direction is the horizontal direction or the vertical direction may be encoded/decoded. The flag indicating whether ISP is applied may be called an ISP flag, and a syntax element of the ISP flag may be intra_subpartitions_mode_flag. Further, the flag indicating the split type may be called an ISP split flag, and a syntax element of the ISP split type may be intra_subpartitions_split_flag.

Syntax elements related to ISP are shown in the following figure.

FIG. 26 schematically shows the syntax elements related to ISP.

In FIG. 26, intra_luma_ref_idx may be the syntax element of the reference line index. When ISP is applied, an intra prediction mode for the current block may be equally applied to sub-partitions of the current block and intra-prediction may be performed by deriving a neighboring reference sample per sub-partition to improve intra-prediction performance. That is, when ISP is applied, a residual sample processing procedure may be performed per sub-partition. In other words, intra-prediction may be performed on each sub-partition to derive prediction samples, and a residual signal (residual samples) with respect to each sub-partition may be added to prediction samples with respect to each sub-partition to derive reconstructed samples. The residual signal (residual samples) may be derived through an inverse quantization/inverse transform procedure based on residual information (quantized transform coefficient information or a residual coding syntax) in a bitstream. Intra-prediction for the sub-partitions may be performed from the leftmost sub-partition to the rightmost sub-partition when the split type is vertical split and may be performed from the uppermost sub-partition to the lowermost sub-partition when the split type is horizontal split.

For example, intra-prediction may be performed on a first sub-partition of the current block to derive prediction samples, residual samples with respect to the first sub-partition may be derived based on residual information about the first sub-partition, and reconstructed samples with respect to the first sub-partition may be derived based on the prediction samples and the residual samples. Here, the first sub-partition may be the leftmost sub-block if the split type for the current block to which ISP is applied is vertical split and the first sub-partition may be the uppermost sub-block if the split type for the current block to which ISP is applied is horizontal split.

Subsequently, some of the reconstructed samples in the first sub-partition may be used as neighboring reference samples with respect to a second sub-partition (e.g., left or upper neighboring reference samples of the second sub-partition) in a process of deriving prediction samples with respect to the second sub-partition. Specifically, intra-prediction may be performed on the second sub-partition of the current block to derive prediction samples, residual samples with respect to the second sub-partition may be derived based on residual information about the second sub-partition, and reconstructed samples with respect to the second sub-partition may be derived based on the prediction samples and the residual samples. Likewise, when a process of deriving prediction samples with respect to a third sub-partition is performed, some of the reconstructed samples in the second sub-partition may be used as neighboring reference samples with respect to the third sub-partition (e.g., left or upper neighboring reference samples of the third sub-partition). Likewise, when a process of deriving prediction samples with respect to a fourth sub-partition is performed, some of the reconstructed samples in the third sub-partition may be used as neighboring reference samples with respect to the fourth sub-partition (e.g., left or upper neighboring reference samples of the fourth sub-partition).

Meanwhile, as another embodiment of intra prediction, Combined Inter and Intra Prediction (CIIP) may be proposed. The CIP may represent a process of deriving a prediction sample of the current block based on inter prediction and intra prediction. For example, when the CIIP is applied to the current block, an intra prediction mode of the current block may be derived, and a first prediction sample of the current block may be derived based on the intra prediction mode. Thereafter, a second prediction sample of the current block may be derived by performing inter prediction on the current block, and the prediction sample of the current block may be derived by weighted summing (i.e., weighted averaging) the first prediction sample and the second prediction sample. Here, the first prediction sample may be referred to as an intra prediction sample, and the second prediction sample may be referred to as an inter prediction sample. Also, for example, the inter prediction for the current block may be inter prediction according to a general merge mode. Specifically, for example, a merge candidate list for the current block may be constructed based on motion information of neighboring blocks of the current block, and motion information of the current block may be derived based on a merge candidate in the merge candidate list indicated by a merge index for the current block, and the second prediction sample of the current block may be derived based on the motion information.

Also, for example, a CIIP flag representing whether the CIIP is applied to the current block may be signaled, and whether the CIIP is applied to the current block may be determined based on the CIIP flag. For example, the CIIP flag may be signaled when the current block is coded in merge mode, and the current block includes at least 64 luma samples (that is, the product of the width and height of the current block is 64 or more).

Also, for example, the intra prediction mode of the current block when the CIIP is applied may be derived based on two syntax elements. For example, one of up to four intra prediction modes may be used as the intra prediction mode. The four intra prediction modes may include a DC intra prediction mode, a planar intra prediction mode, a horizontal intra prediction mode, and/or a vertical intra prediction mode.

For example, in CIIP for the luma component, up to four intra prediction modes including a DC intra prediction mode, a planar intra prediction mode, a horizontal intra prediction mode, and a vertical intra prediction mode may be used. Also, for example, when the width of the current block is more than two times of the height, the vertical intra prediction mode may not be available. In this case, only three intra prediction modes are available. Also, for example, when the height of the current block is more than two times of the width, the vertical intra prediction mode may not be available. In this case, only three intra prediction modes are available.

Specifically, for example, when the CIIP is applied to the current block, the intra prediction mode of the current block may be derived as follows. For example, a Most Probable Mode (MPM) list including MPM candidates for the current block may be constructed as follows. For example, the MPM list may include three MPM candidates.

For example, the left neighboring block of the current block may be set to A, and the top neighboring block may be set to B. Thereafter, intra prediction modes of the left neighboring block A and the top neighboring block B indicated by intraModeA and intraModeB may be derived as follows.

Set X to A or B
1) when block X is not available, 2) when block X is not predicted using CIIP or intra prediction mode, 3) when block B is located outside the current CTU, intraModeX may be set to the DC intra prediction mode. Here, the current CTU may mean a CTU including the current block.

Otherwise, 1) when an intra prediction mode of block X is the DC intra prediction mode or the planar intra prediction mode, intraModeX may be set to the intra prediction mode of the block X, that is, the DC intra prediction mode or the planar intra prediction mode, or 2) when the intra prediction mode of block X is a vertical-like directional intra prediction mode (that is, intra prediction modes #35 to #66), intraModeX may be set to the vertical intra prediction mode, or 3) when the intra prediction mode of block X is a horizontal-like directional intra prediction mode (that is, intra prediction modes #2 to #34), intraModeX may be set to the horizontal intra prediction mode.

Thereafter, the MPM candidates may be derived based on the derived intraModeA and intraModeB.

For example, when intraModeA and intraModeB are the same:
When intraModeA is the planar intra prediction mode or the DC intra prediction mode, three MPM candidates may be sequentially set to {planar intra prediction mode, DC intra prediction mode, vertical intra prediction mode}.
Or, otherwise, that is when intraModeA is not the planar intra prediction mode and the DC intra prediction mode, three MPM candidates may be sequentially set to {intraModeA, planar intra prediction mode, DC intra prediction mode}.

Otherwise, that is, when intraModeA and intraModeB are not the same:
The first two MPM candidates may be set to {intraModeA, intraModeB}.
Thereafter, when it is confirmed as an intra prediction mode other than the derived MPM candidate by checking whether it is included in the previously derived MPM candidates in the order of the planar intra prediction mode, the DC intra prediction mode, and the vertical intra prediction mode, it can be added as a third MPM candidate.

Meanwhile, for example, when the width of the current block is more than two times of the height or the height of the current block is more than two times of the width, the MPM flag may be inferred to be equal to 1 without signaling. Otherwise, the MPM flag for the current block may be signaled.

For example, when the value of the MPM flag is 1, an MPM index indicating one of the MPM candidates of the MPM list may be signaled, and the MPM candidate indicated by the MPM index may be derived as the intra prediction mode of the current block. Also, for example, when the value of the MPM flag is 0, the intra prediction mode of the current block may be set to a "missing" mode. Here, the missing mode may represent an intra prediction mode not included in the MPM list among four intra prediction modes available in the CIIP. For example, when the planar intra prediction mode is not included in the MPM list, the missing mode may be the planar intra prediction mode, and when the value of the MPM flag is 0, the intra prediction mode of the current block may be derived as the planar intra prediction mode, which is the missing mode. Meanwhile, for example, the intra prediction mode of the CU coded with the CIIP may be stored and used for prediction of neighboring CUs coded after the CU.

Meanwhile, as described above, the first prediction sample and the second prediction sample may be weighted averaged. Here, for example, weights for the first prediction sample and the second prediction sample may be derived based on the intra prediction mode of the current block and/or the position of the current sample in the current block.

Specifically, for example, when the intra prediction mode of the current block is the DC intra prediction mode or the planar intra prediction mode, or the width or height of the current block is less than 4, the same weight may be applied to the first prediction sample and the second prediction sample. That is, when the intra prediction mode of the current block is the DC intra prediction mode or the planar intra prediction mode, or the width or height of the current block is less than 4, weights for the first prediction sample and the second prediction sample may be derived as the same value.

In addition, in cases other than the above cases, weights for the first prediction sample and the second prediction sample may be derived based on the intra prediction mode of the current block and the current sample position in the current block. For example, when the intra prediction mode of the current block is the horizontal intra prediction mode, the current block may be divided into partitions of size (W/4)×H. And, when the current sample is located in the closest partition to an intra prediction reference sample of the current block, the weight for the first prediction sample of the current sample may be set to 6 and the weight for the second prediction sample may be set to 2, or, when the current sample is located in the second closest partition to the intra prediction reference sample of the current block, the weight for the first prediction sample of the current sample may be set to 5 and the weight for the second prediction sample may be set to 3, or, when the current sample is located in the third closest partition to the intra prediction reference sample of the current block, the weight for the first prediction sample of the current sample may be set to 3 and the weight for the second prediction sample may be set to 5, or, when the current sample is located in the partition furthest from the intra prediction reference sample of the current block, the weight for the first prediction sample of the current sample may be set to 2 and the weight for the second prediction sample may be set to 6. Here, the size of the current block may be W×H, W may represent the width of the current block, and H may represent the height of the current block.

Also, for example, when the intra prediction mode of the current block is the vertical intra prediction mode, the current block may be divided into partitions of size W×(H/4). And, when the current sample is located in the closest partition to an intra prediction reference sample of the current block, the weight for the first prediction sample of the current sample may be set to 6 and the weight for the second prediction sample may be set to 2, or, when the current sample is located in the second closest partition to the intra prediction reference sample of the current block, the weight for the first prediction sample of the current sample may be set to 5 and the weight for the second prediction sample may be set to 3, or, when the current sample is located in the third closest partition to the intra prediction reference sample of the current block, the weight for the first prediction sample of the current sample may be set to 3 and the weight for the second prediction sample may be set to 5, or when the current sample is located in the partition furthest from the intra prediction reference sample of the current block, the weight for the first prediction sample of the current sample may be set to 2 and the weight for the second prediction sample may be set to 6.

Thereafter, the prediction sample of the current sample may be derived by weighted averaging the first prediction sample and the second prediction sample based on the weights. For example, the prediction sample may be derived by the following equation.

$$P_{CIIP} = ((8 - wt) * P_{inter} + wt * P_{intra} + 4) >> 3 \quad \text{[Equation 1]}$$

Herein, $P_{CIIP}$ may represent the prediction sample, $P_{intra}$ may represent the first prediction sample, $P_{inter}$ may represent the second prediction sample, wt may represent a weight for the first prediction sample, and (8-wt) may represent a weight for the second prediction sample.

Meanwhile, when intra-prediction is performed as described above, general intra-prediction, MRL and/or ISP may be applied. Here, different MPM list generation methods may be employed in general intra-prediction, MRL and ISP. 67 intra prediction modes may be used in the general intra-prediction, 65 intra prediction modes except the planar intra prediction mode and the DC intra prediction mode may be used in the MRL based intra-prediction, and 66 intra prediction modes except the DC intra prediction mode may be used in ISP. Since encoding/decoding is performed in the three intra-predictions (general intra-prediction, MRL based intra-prediction, and ISP) using different numbers of intra prediction modes, an MPM list generation method may be different for the respective intra-predictions.

Specifically, when the general intra-prediction is performed, an MPM list including six MPM candidates may be constructed using all the 67 intra prediction modes. When the MRL based intra-prediction is performed, an MPM list including six MPM candidates may be constructed using all the 65 intra prediction modes except the planar intra prediction mode and the DC intra prediction mode. Further, when ISP is performed, an MPM list including six MPM candidates may be constructed using the 66 intra prediction modes except the DC intra prediction mode. Here, an MPM list may be constructed through a method depending on whether the split type of ISP is horizontal split or vertical split.

Figure 12:
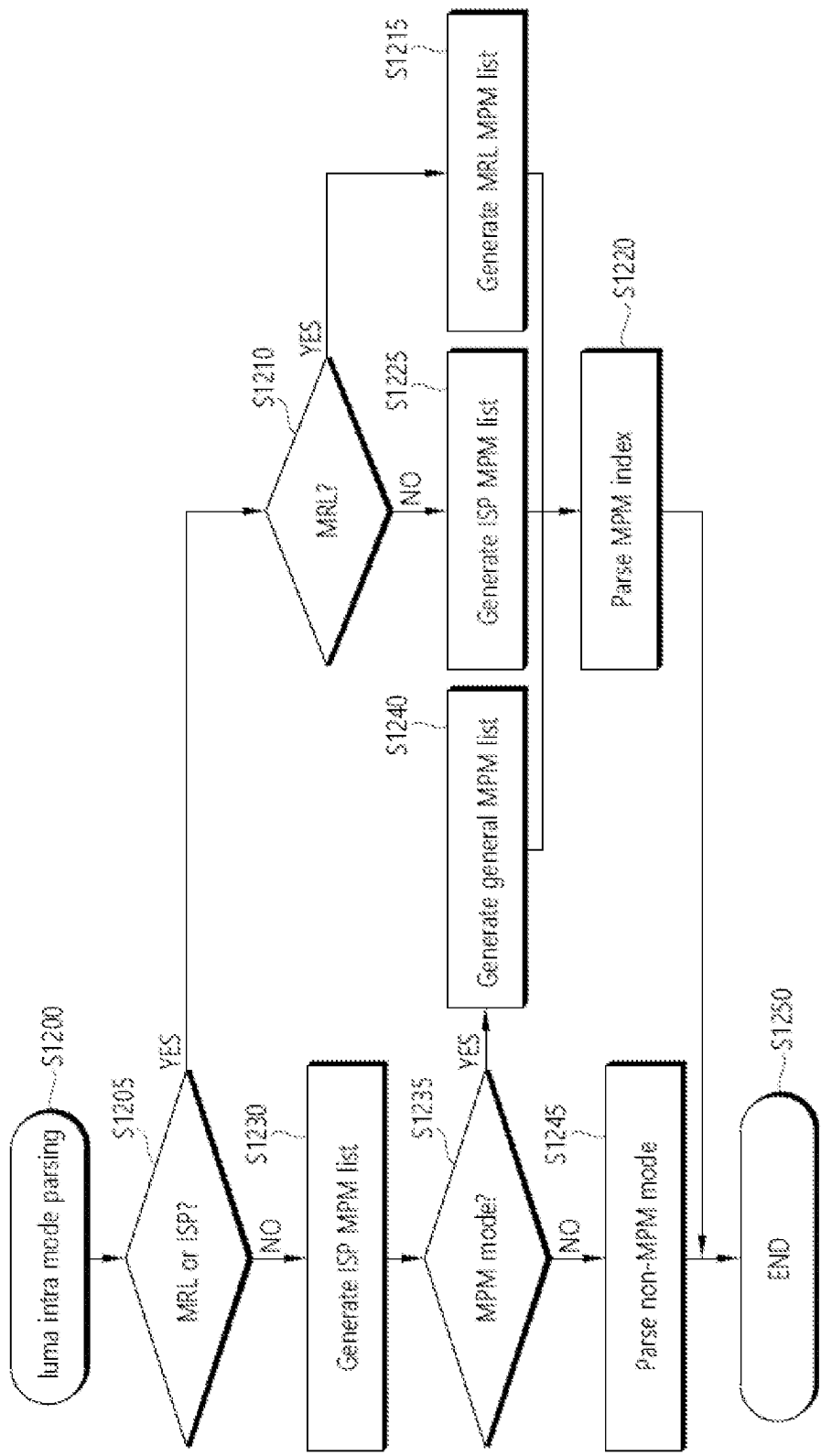
FIG. 12 illustrates an example of deriving an MPM list according to applied intra-prediction.

FIG. 12 illustrates an example of deriving an MPM list according to applied intra-prediction. Referring to FIG. 12, the decoding apparatus may determine whether MRL or ISP is applied to the current block (S1205). If MRL or ISP is applied to the current block, the decoding apparatus may determine whether MRL is applied to the current block (S1210). If MRL is applied to the current block, the decoding apparatus may generate an MRL MPM list for the current block (S1215). Here, the MRL MPM list may be an MPM list generated through an MPM list generation method when MRL is applied. Subsequently, the decoding apparatus may parse an MPM index (S1220). The MPM index may indicate an MPM candidate derived as an intra prediction mode of the current block from among MPM candidates. The decoding apparatus may derive the MPM candidate indicated by the MPM index from among the MPM candidates of the MRL MPM list as an intra prediction mode of the current block.

If ISP instead of MRL is applied to the current block, the decoding apparatus may generate an ISP MPM list for the current block (S1225). Here, the ISP MPM list may be an MPM list generated through an MPM list generation method when ISP is applied. Thereafter, the decoding apparatus may parse the MPM index (S1220). The decoding apparatus may derive the MPM candidate indicated by the MPM index from among MPM candidates of the ISP MPM list as an intra prediction mode of the current block.

If any of MRL and ISP is not applied to the current block, the decoding apparatus may parse an MPM flag for the current block (S1230). Subsequently, the decoding apparatus may determine whether the intra prediction mode of the current block is an MPM mode based on the MPM flag, that is, whether the intra prediction mode of the current block is an MPM candidate included in the MPM list based on the MPM flag (S1235). Here, the MPM flag may indicate whether the intra prediction mode of the current block is included in the MPM list.

If the intra prediction mode of the current block is an MPM mode, the decoding apparatus may generate an MPM list in general intra-prediction (S1240) and parse the MPM index for the current block (S1220). The decoding apparatus may derive an MPM candidate indicated by the MPM index from among MPM candidates of the MPM list as an intra prediction mode of the current block.

On the other hand, if the intra prediction mode of the current block is not an MPM mode, that is, if the intra prediction mode of the current block is not included in MPM candidates, the decoding apparatus may parse remaining intra prediction mode information representing one of the remaining intra prediction modes that are not included in the MPM candidates of the MPM list (S1245). The decoding apparatus may derive an intra prediction mode indicated by the remaining intra prediction mode information from among the remaining intra prediction modes as the intra prediction mode of the current block.

As described above, an MPM list including six MPM candidates may be configured using different methods according to intra-predictions. However, if an MPM list generation method depends on an intra-prediction execution method, coding complexity may be improved and coding efficiency may be deteriorated.

Accordingly, the present disclosure proposes a method of modifying MPM list generation methods used in the conventional general intra-prediction, MRL based intra-prediction and ISP into a generalized method. That is, the present disclosure proposes a method of generating an MPM list using a generalized method. It is possible to simplify an intra-prediction encoding/decoding structure and to improve the efficiency of encoding/decoding using an intra prediction mode to enhance video coding efficiency by using the generalized MPM list generation method.

As an embodiment, a method of generating an MPM list using the generalized method and then applying an MPM candidate in the MPM list as an intra prediction mode in the conventional general intra-prediction, MRL based intra-prediction and ISP intra-prediction is proposed.

For example, the method of generating an MPM list including six MPM candidates used in the conventional general intra-prediction may be applied as an MPM list generation method for MRL based intra-prediction and the ISP-based intra-prediction. Here, the MPM list generation method may be a conventional MPM list generation method or a method enhanced from the conventional MPM list generation method. The aforementioned method of generating an MPM list including six MPM candidates used in the conventional general intra-prediction is a method of generating an MPM list in consideration of all the 67 intra prediction modes, and the MPM list may include the planar intra prediction mode and/or the DC intra prediction mode as MPM candidates. However, since the planar intra prediction mode and the DC intra prediction mode are not used in the MRL based intra-prediction and the DC intra prediction mode is not used in the ISP based intra-prediction, an MPM list construction method different from the conventional method may be required for the MRL based intra-prediction and the ISP based intra-prediction.

Figure 13:
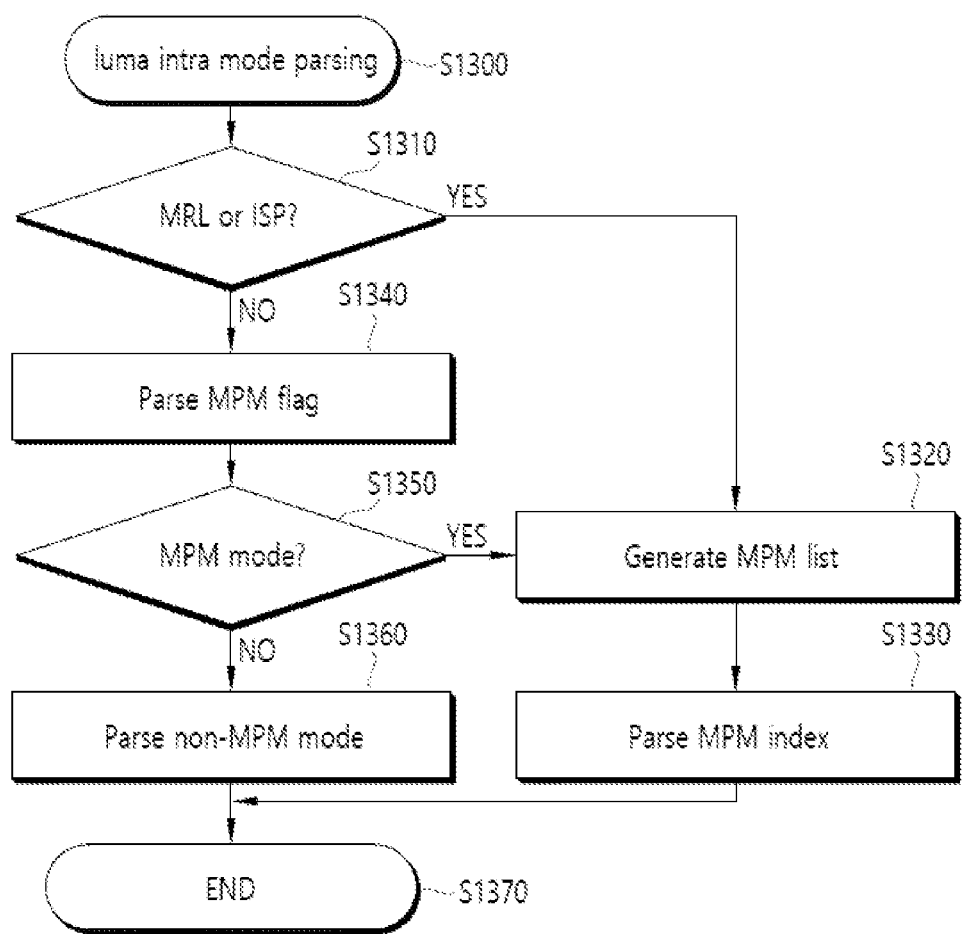
FIG. 13 illustrates an example of constructing an MPM list of a current block and deriving an intra prediction mode according to the present embodiment.

FIG. 13 illustrates an example of constructing an MPM list of a current block and deriving an intra prediction mode according to the present embodiment. Referring to FIG. 13, the decoding apparatus may determine whether MRL or ISP is applied to the current block (S1310). If MRL or ISP is applied to the current block, the decoding apparatus may generate an MPM list of the current block (S1320) and parse an MPM index for the current block (S1330). The decoding apparatus may derive an MPM candidate indicated by the MPM index from among MPM candidates of the MPM list as an intra prediction mode of the current block.

If any of the MRL and ISP is not applied to the current block, the decoding apparatus may parse an MPM flag for the current block (S1340) and determine whether the intra prediction mode of the current block is included in the MPM list based on the MPM flag (S1350). The MPM flag may indicate whether the intra prediction mode of the current block is included in the MPM candidates of the MPM list.

When the intra prediction mode of the current block is an MPM mode, that is, when the MPM flag indicates that the intra prediction mode of the current block is included in the MPM candidates of the MPM list (e.g., when the MPM flag is 1), the decoding apparatus may generate the MPM list of the current block (S1320). Here, the MPM list may be the same as the MPM list generated when MRL or ISP is applied to the current block. Subsequently, the decoding apparatus may parse the MPM index for the current block (S1330) and derive the MPM candidate indicated by the MPM index from among the MPM candidates of the MPM list as an intra prediction mode of the current block.

On the other hand, when the intra prediction mode of the current block is not an MPM mode, that is, when the MPM flag indicates that the intra prediction mode of the current block is not included in the MPM candidates of the MPM list (e.g., when the MPM flag is 0), the decoding apparatus may parse remaining intra prediction mode information of the current block (S1360). The decoding apparatus may derive an intra prediction mode indicated by the remaining intra prediction mode information from among the remaining intra prediction modes as the intra prediction mode for the current block.

The MPM list generation method proposed in the present embodiment and commonly used in the general intra-prediction, the MRL based intra-prediction, and the ISP based intra-prediction may be the same as the following examples.

An example of the MPM list generation method may be as shown in the following figure.

FIG. 27 schematically shows an example of the MPM list generation method.

According to an example of the MPM list generation method shown in FIG. 27, the encoding apparatus/decoding apparatus may derive MPM candidate 0 as an intra prediction mode of a left neighboring block of the current block, may derive MPM candidate 1 as the DC intra prediction mode if the derived MPM candidate 0 is the planar intra prediction mode, may derive MPM candidate 1 as the planar intra prediction mode if the derived MPM candidate 0 is not the planar intra prediction mode, may derive MPM candidate 2 as a vertical intra prediction mode, may derive MPM candidate 3 as a horizontal intra prediction mode, may derive MPM candidate 4 as an intra prediction mode corresponding to a mode number obtained by subtracting 4 from the mode number of the vertical intra prediction mode, that is, intra prediction mode #46, and may derive MPM candidate 5 as an intra prediction mode corresponding to a mode number obtained by adding 4 to the mode number of the vertical intra prediction mode, that is, intra prediction mode #54.

Thereafter, the encoding apparatus/decoding apparatus may determine whether the intra prediction mode of the left neighboring block of the current block is identical to the intra prediction mode of a top neighboring block, and construct an MPM list based on whether the intra prediction mode of the left neighboring block is identical to the intra prediction mode of the top neighboring block. For example, when the intra prediction mode of the left neighboring block is identical to the intra prediction mode of the top neighboring block, the encoding apparatus/decoding apparatus may determine whether the mode number of the intra prediction mode of the left neighboring block is greater than the mode number of the DC intra prediction mode, and if the mode number of the intra prediction mode of the left neighboring block is greater than the mode number of the DC intra prediction mode, derive an MPM list of the current block which includes the derived MPM candidate 0 to MPM candidate 5, as described below.

$$mpm[0] = \text{leftIntraDir}$$

$$mpm[1] = \text{PLANAR\_IDX}$$

$$mpm[2] = \text{DC\_IDX}$$

$$mpm[3] = ((\text{leftIntraDir} + \text{offset}) \% \text{ mod}) + 2$$

$$mpm[4] = ((\text{leftIntraDir} + 1) \% \text{ mod}) + 2$$

$$mpm[5] = ((\text{leftIntraDir} + \text{offset} - 1) \% \text{ mod}) + 2$$

That is, MPM candidate 0 of the MPM list may be derived as the intra prediction mode of the left neighboring block, MPM candidate 1 of the MPM list may be derived as the planar intra prediction mode, MPM candidate 2 of the MPM list may be derived as the DC intra prediction mode, MPM candidate 3 of the MPM list may be derived as an intra prediction mode having a mode number of ((leftIntraDir+ offset) % mod)+2, that is, an intra prediction mode having a value, obtained by performing a modulo arithmetic operation on the sum of the mode number of the intra prediction mode of the left neighboring block and an offset and adding 2 to the modulo arithmetic operation result, as a mode number, MPM candidate 4 of the MPM list may be derived as an intra prediction mode having a mode number of ((leftIntraDir−1)% mod)+2, that is, an intra prediction mode having a value, obtained by performing a modulo arithmetic operation on a value obtained by subtracting 1 from the mode number of the intra prediction mode of the left neighboring block and adding 2 to the modulo arithmetic operation result, as a mode number, and MPM candidate 5 of the MPM list may be derived as an intra prediction mode having a mode number of ((leftIntraDir+offset−1)% mod)+2, that is, an intra prediction mode having a value, obtained by performing a modulo arithmetic operation on the sum of the mode number of the intra prediction mode of the left neighboring block and (offset −1) and adding 2 to the modulo arithmetic operation result, as a mode number.

For example, if the intra prediction mode of the left neighboring block is identical to the intra prediction mode of the top neighboring block and the mode number of the intra prediction mode of the left neighboring block is not greater than the mode number of the DC intra prediction mode, the encoding apparatus/decoding apparatus may derive an MPM list of the current block which includes previously derived MPM candidate 0 to MPM candidate 5.

On the other hand, if the intra prediction mode of the left neighboring block is not identical to the intra prediction mode of the top neighboring block, for example, the encoding apparatus/decoding apparatus may derive the intra prediction mode of the left neighboring block of the current block as MPM candidate 0 of the MPM list and may derive the intra prediction mode of the top neighboring block of the current block as MPM candidate 1 of the MPM list. Further, the encoding apparatus/decoding apparatus may derive maxCandModeIdx as 0 if the mode number of MPM candidate 0 is greater than the mode number of MPM candidate 1 and may derive maxCandModeIdx as 1 if the mode number of MPM candidate 0 is not greater than the mode number of MPM candidate 1.

Then, if the mode number of the intra prediction mode of the left neighboring block and the mode number of the intra prediction mode of the top neighboring block are greater than the mode number of the DC intra prediction mode, the encoding apparatus/decoding apparatus may derive the planar intra prediction mode as MPM candidate 2 of the MPM list and may derive the DC intra prediction mode as MPM candidate 3 of the MPM list.

Then, if a value obtained by subtracting a mode number of mpm[!maxCandModeIdx] from a mode number of mpm[maxCandModeIdx] is less than 63 and greater than 1, the encoding apparatus/decoding apparatus may derive an intra prediction mode having a mode number of ((mpm[maxCandModeIdx]+offset) % mod)+2 as MPM candidate 4 of the MPM list and derive an intra prediction mode having a mode number of ((mpm[maxCandModeIdx]−1) % mod)+2 as MPM candidate 5 of the MPM list. Here, mpm[maxCandModeIdx] may indicate MPM candidate 0 and mpm[!maxCandModeIdx] may indicate MPM candidate 1 if maxCandModeIdx is 0, and mpm[maxCandModeIdx] may indicate MPM candidate 1 and mpm[!maxCandModeIdx] may indicate MPM candidate 0 if maxCandModeIdx is 1.

Further, if the value obtained by subtracting the mode number of mpm[!maxCandModeIdx] from the mode number of mpm[maxCandModeIdx] is equal to or greater than 63 or equal to or less than 1, the encoding apparatus/decoding apparatus may derive an intra prediction mode having a mode number of ((mpm[maxCandModeIdx]+offset −1)% mod)+2 as MPM candidate 4 of the MPM list and may derive an intra prediction mode having a mode number of ((mpm[maxCandModeIdx]) % mod)+2 as MPM candidate 5 of the MPM list.

For example, if at least one of the mode number of the intra prediction mode of the left neighboring block and the mode number of the intra prediction mode of the top neighboring block is not greater than the mode number of the DC intra prediction mode, the encoding apparatus/decoding apparatus may determine whether the sum of the mode number of the intra prediction mode of the left neighboring block and the mode number of the intra prediction mode of the top neighboring block is equal to or greater than 2, and if the sum of the mode number of the intra prediction mode of the left neighboring block and the mode number of the intra prediction mode of the top neighboring block is equal to or greater than 2, derive MPM candidate 2 to MPM candidate 5 as follows.

$$mpm[2] = (mpm[!\, maxCandModeIdx] == \text{PLANAR\_IDX}) \;?\; \text{DC\_IDX}$$
$$:\text{PLANAR\_IDX}$$
$$mpm[3] = ((mpm[maxCandModIdx] + \text{offset}) \;\%\; \text{mod}) + 2$$
$$mpm[4] = ((mpm[maxCandModeIdx] - 1) \;\%\; \text{mod}) + 2$$
$$mpm[5] = ((mpm[maxCandModeIdx] + \text{offset} - 1) \;\%\; \text{mod}) + 2$$

That is, MPM candidate 2 of the MPM list may be derived as the DC intra prediction mode if mpm[!maxCandModeIdx] is the planar intra prediction mode and may be derived as the planar intra prediction mode if mpm[!maxCandModeIdx] is not the planar intra prediction mode. In addition, MPM candidate 3 of the MPM list may be derived as an intra prediction mode having a mode number of ((mpm[maxCandModeIdx]+offset) % mod)+2, that is, an intra prediction mode having a value, obtained by performing a modulo arithmetic operation on the sum of mpm[maxCandModeIdx] and an offset and adding 2 to the modulo arithmetic operation result, as a mode number, MPM candidate 4 of the MPM list may be derived as an intra prediction mode having a mode number of ((mpm[maxCandModeIdx]−1) % mod)+2, that is, an intra prediction mode having a value, obtained by performing a modulo arithmetic operation on a value obtained by subtracting 1 from mpm[maxCandModeIdx] and adding 2 to the modulo arithmetic operation result, as a mode number, and MPM candidate 5 of the MPM list may be derived as an intra prediction mode having a mode number of ((mpm[maxCandModeIdx]+offset−1) % mod)+2, that is, an intra prediction mode having a value, obtained by performing a modulo arithmetic operation on the sum of mpm[maxCandModeIdx] and (offset −1) and adding 2 to the modulo arithmetic operation result, as a mode number.

Otherwise, another example of the MPM list generation method may be used. Another example of the MPM list generation method may be as shown in the following figure. FIG. 28 schematically shows another example of the MPM list generation method.

According to an example of the MPM list generation method shown in FIG. 28, the encoding apparatus/decoding apparatus may derive MPM candidate 0 for the current block as an intra prediction mode of the left neighboring block of the current block, may derive MPM candidate 1 as the DC intra prediction mode if the derived MPM candidate 0 is the planar intra prediction mode, may derive MPM candidate 1 as the planar intra prediction mode if the derived MPM candidate 0 is not the planar intra prediction mode, may derive MPM candidate 2 as a vertical intra prediction mode, may derive MPM candidate 3 as a horizontal intra prediction mode, may derive MPM candidate 4 as an intra prediction mode corresponding to a mode number obtained by subtracting 4 from the mode number of the vertical intra prediction mode, that is, intra prediction mode #46, and may derive MPM candidate 5 as an intra prediction mode corresponding to a mode number obtained by adding 4 to the mode number of the vertical intra prediction mode, that is, intra prediction mode #54.

Thereafter, the encoding apparatus/decoding apparatus may determine whether the intra prediction mode of the left neighboring block of the current block is identical to the intra prediction mode of the top neighboring block, and construct an MPM list based on whether the intra prediction mode of the left neighboring block is identical to the intra prediction mode of the top neighboring block. For example, when the intra prediction mode of the left neighboring block is identical to the intra prediction mode of the top neighboring block, the encoding apparatus/decoding apparatus may determine whether the mode number of the intra prediction mode of the left neighboring block is greater than the mode number of the DC intra prediction mode, and if the mode number of the intra prediction mode of the left neighboring block is greater than the mode number of the DC intra prediction mode, derive an MPM list of the current block which includes the derived MPM candidate 0 to MPM candidate 5, as described below.

$$mpm[0] = leftIntraDir$$

$$mpm[1] = PLANAR\_IDX$$

$$mpm[2] = DC\_IDX$$

$$mpm[3] = ((leftIntraDir + \text{offset}) \% \text{mod}) + 2$$

$$mpm[4] = ((leftIntraDir + 1) \% \text{mod}) + 2$$

$$mpm[5] = ((leftIntraDir + \text{offset} - 1) \% \text{mod}) + 2$$

That is, MPM candidate 0 of the MPM list may be derived as the intra prediction mode of the left neighboring block, MPM candidate 1 of the MPM list may be derived as the planar intra prediction mode, MPM candidate 2 of the MPM list may be derived as an intra prediction mode having a mode number of ((leftIntraDir+offset) % mod)+2, that is, an intra prediction mode having a value, obtained by performing a modulo arithmetic operation on the sum of the mode number of the intra prediction mode of the left neighboring block and an offset and adding 2 to the modulo arithmetic operation result, as a mode number, MPM candidate 3 of the MPM list may be derived as an intra prediction mode having a mode number of ((leftIntraDir−1) % mod)+2, that is, an intra prediction mode having a value, obtained by performing a modulo arithmetic operation on a value obtained by subtracting 1 from the mode number of the intra prediction mode of the left neighboring block and adding 2 to the modulo arithmetic operation result, as a mode number, MPM candidate 4 of the MPM list may be derived as the DC intra prediction mode, and MPM candidate 5 of the MPM list may be derived as an intra prediction mode having a mode number of ((leftIntraDir+offset−1) % mod)+2, that is, an intra prediction mode having a value, obtained by performing a modulo arithmetic operation on the sum of the mode number of the intra prediction mode of the left neighboring block and (offset −1) and adding 2 to the modulo arithmetic operation result, as a mode number.

For example, if the intra prediction mode of the left neighboring block is identical to the intra prediction mode of the top neighboring block and the mode number of the intra prediction mode of the left neighboring block is not greater than the mode number of the DC intra prediction mode, the encoding apparatus/decoding apparatus may derive an MPM list of the current block which includes previously derived MPM candidate 0 to MPM candidate 5.

On the other hand, if the intra prediction mode of the left neighboring block is not identical to the intra prediction mode of the top neighboring block, for example, the encoding apparatus/decoding apparatus may derive the intra prediction mode of the left neighboring block of the current block as MPM candidate 0 of the MPM list and may derive the intra prediction mode of the top neighboring block of the current block as MPM candidate 1 of the MPM list. Further, the encoding apparatus/decoding apparatus may derive max-CandModeIdx as 0 if the mode number of MPM candidate 0 is greater than the mode number of MPM candidate 1 and may derive maxCandModeIdx as 1 if the mode number of MPM candidate 0 is not greater than the mode number of MPM candidate 1.

Then, if the mode number of the intra prediction mode of the left neighboring block and the mode number of the intra prediction mode of the top neighboring block are greater than the mode number of the DC intra prediction mode, the encoding apparatus/decoding apparatus may derive the planar intra prediction mode as MPM candidate 1 of the MPM list and may derive the intra prediction mode of the top neighboring block as MPM candidate 2 of the MPM list. Further, the encoding apparatus/decoding apparatus may derive maxCandModeIdx as 0 if the mode number of MPM candidate 0 is greater than the mode number of MPM candidate 2 and may derive maxCandModeIdx as 2 if the mode number of MPM candidate 0 is not greater than the mode number of MPM candidate 2. In addition, the encoding apparatus/decoding apparatus may derive minCandModeIdx as 2 if the mode number of MPM candidate 0 is greater than the mode number of MPM candidate 2 and may derive maxCandModeIdx as 0 if the mode number of MPM candidate 0 is not greater than the mode number of MPM candidate 2. Further, the encoding apparatus/decoding apparatus may derive the DC intra prediction mode as MPM candidate 3 of the MPM list.

Then, if a value obtained by subtracting a mode number of mpm[minCandModeIdx] from a mode number of mpm[maxCandModeIdx] is less than 63 and greater than 1, the encoding apparatus/decoding apparatus may derive an intra prediction mode having a mode number of ((mpm[maxCandModeIdx]+offset) % mod)+2 as MPM candidate 4 of the MPM list and derive an intra prediction mode having a mode number of ((mpm[maxCandModeIdx]−1) % mod)+2 as MPM candidate 5 of the MPM list. Here, mpm[maxCandModeIdx] may be MPM candidate 0 if maxCandModeIdx is 0, mpm[maxCandModeIdx] may be MPM candidate 1 if maxCandModeIdx is 1, mpm[maxCandModeIdx] may be MPM candidate 2 if maxCandModeIdx is 2, mpm[minCandModeIdx] may be MPM candidate 0 if minCandModeIdx is 0, and mpm[minCandModeIdx] may be MPM candidate 2 if minCandModeIdx is 2.

Further, if the value obtained by subtracting the mode number of mpm[minCandModeIdx] from the mode number of mpm[maxCandModeIdx] is equal to or greater than 63 or equal to or less than 1, the encoding apparatus/decoding apparatus may derive an intra prediction mode having a mode number of ((mpm[maxCandModeIdx]+offset−1) % mod)+2 as MPM candidate 4 of the MPM list and may derive an intra prediction mode having a mode number of ((mpm[maxCandModeIdx]) % mod)+2 as MPM candidate 5 of the MPM list.

For example, if at least one of the mode number of the intra prediction mode of the left neighboring block and the mode number of the intra prediction mode of the top neighboring block is not greater than the mode number of the DC intra prediction mode, the encoding apparatus/decoding apparatus may determine whether the sum of the mode number of the intra prediction mode of the left neighboring block and the mode number of the intra prediction mode of the top neighboring block is equal to or greater than 2, and if the sum of the mode number of the intra prediction mode of the left neighboring block and the mode number of the intra prediction mode of the top neighboring block is equal to or greater than 2, determine whether at least one of the intra prediction mode of the left neighboring block and the intra prediction mode of the top neighboring block is identical to the planar intra prediction mode.

If at least one of the intra prediction mode of the left neighboring block and the intra prediction mode of the top neighboring block is identical to the planar intra prediction mode, the encoding apparatus/decoding apparatus may derive MPM candidate 0 and MPM candidate 1 as follows.

$$mpm[0] = PLANAR\_IDX$$

$$mpm[1] = (leftIntraDir < aboveIntraDir) \text{ ? } aboveIntraDir:leftIntraDir$$

That is, MPM candidate 0 of the MPM list may be derived as the planar intra prediction mode, MPM candidate 1 of the MPM list may be derived as the intra prediction mode of the top neighboring block if the mode number of the intra prediction mode of the left neighboring block is less than the mode number of the intra prediction mode of the top neighboring block, and MPM candidate 1 of the MPM list may be derived as the intra prediction mode of the left neighboring block if the mode number of the intra prediction mode of the left neighboring block is equal to or greater than the mode number of the intra prediction mode of the top neighboring block. Further, maxCandModeIdx may be derived as 1.

On the other hand, if the intra prediction mode of the left neighboring block and the intra prediction mode of the top neighboring block are not identical to the planar intra prediction mode, MPM candidate 0 and MPM candidate 1 of the MPM list may be previously derived intra prediction modes. Further, maxCandModeIdx may be previously derived value.

Further, if the sum of the mode number of the intra prediction mode of the left neighboring block and the mode number of the intra prediction mode of the top neighboring block is equal to or greater than 2, the encoding apparatus/decoding apparatus may derive MPM candidate 2 to MPM candidate 5 as follows.

$$mpm[2] = (mpm[! maxCandModeIdx] == PLANAR\_IDX) \text{ ? } DC\_IDX$$
$$:PLANAR\_IDX$$

$$mpm[3] = ((mpm[maxCandModIdx] + \text{offset}) \% \text{ mod}) + 2$$

$$mpm[4] = ((mpm[maxCandModeIdx] - 1) \% \text{ mod}) + 2$$

$$mpm[5] = ((mpm[maxCandModeIdx] + \text{offset} - 1) \% \text{ mod}) + 2$$

That is, MPM candidate 2 of the MPM list may be derived as the DC intra prediction mode if mpm[!maxCandModeIdx] is the planar intra prediction mode and may be derived as the planar intra prediction mode if mpm[!maxCandModeIdx] is not the planar intra prediction mode. In addition, MPM candidate 3 of the MPM list may be derived as an intra prediction mode having a mode number of ((mpm[maxCandModeIdx]+offset) % mod)+2, that is, an intra prediction mode having a value, obtained by performing a modulo arithmetic operation on the sum of mpm[maxCandModeIdx] and an offset and adding 2 to the modulo arithmetic operation result, as a mode number, MPM candidate 4 of the MPM list may be derived as an intra prediction mode having a mode number of ((mpm[maxCandModeIdx]−1) % mod)+2, that is, an intra prediction mode having a value, obtained by performing a modulo arithmetic operation on a value obtained by subtracting 1 from mpm[maxCandModeIdx] and adding 2 to the modulo arithmetic operation result, as a mode number, and MPM candidate 5 of the MPM list may be derived as an intra prediction mode having a mode number of ((mpm[maxCandModeIdx]+offset−1) % mod)+2, that is, an intra prediction mode having a value, obtained by performing a modulo arithmetic operation on the sum of mpm[maxCandModeIdx] and (offset −1) and adding 2 to the modulo arithmetic operation result, as a mode number.

Otherwise, another example of the MPM list generation method may be used. Another example of the MPM list generation method may be as shown in the following figure.

FIG. 29 schematically shows another example of the MPM list generation method.

According to an example of the MPM list generation method shown in FIG. 29, the encoding apparatus/decoding apparatus may determine whether the intra prediction mode of the left neighboring block of the current block is identical to the intra prediction mode of the top neighboring block.

If the intra prediction mode of the left neighboring block is identical to the intra prediction mode of the top neighboring block, the encoding apparatus/decoding apparatus may determine whether the mode number of the intra prediction mode of the left neighboring block is greater than the mode number of the DC intra prediction mode, and if the mode number of the intra prediction mode of the left neighboring block is greater than the mode number of the DC intra prediction mode, may derive an MPM list of the current block which includes MPM candidate 0 to MPM candidate 2 derived as described later.

$$mpm[0] = g\_intraMode65to33AngMapping[PLANAR\_IDX]$$

$$mpm[1] = g\_intraMode65to33AngMapping[DC\_IDX]$$

$$mpm[2] = g\_intraMode65to33AngMapping[VER\_IDX]$$

That is, MPM candidate 0 of the MPM list may be derived as the intra prediction mode of the left neighboring block. In addition, MPM candidate 1 of the MPM list may be derived as an intra prediction mode having a mode number of ((g_intraMode65to33AngMapping[leftIntraDir]+offset) % mod)+2, that is, an intra prediction mode having a value, obtained by performing a modulo arithmetic operation on the sum of the mode number of the intra prediction mode of the left neighboring block and an offset and adding 2 to the modulo arithmetic operation result, as a mode number, and MPM candidate 2 of the MPM list may be derived as an intra prediction mode having a mode number of ((g_intraMode65to33AngMapping[leftIntraDir]−1) % mod)+2, that is, an intra prediction mode having a value, obtained by performing a modulo arithmetic operation on a value obtained by subtracting 1 from the mode number of the intra prediction mode of the left neighboring block and adding 2 to the modulo arithmetic operation result, as a mode number.

If the mode number of the intra prediction mode of the left neighboring block is equal to or less than the mode number of the DC intra prediction mode, the encoding apparatus/decoding apparatus may derive an MPM list of the current block which includes MPM candidate 0 to MPM candidate 2 derived as described later.

$$mpm[0] = g\_intraMode65to33AngMapping[PLANAR\_IDX]$$

$$mpm[1] = g\_intraMode65to33AngMapping[DC\_IDX]$$

$$mpm[2] = g\_intraMode65to33AngMapping[VER\_IDX]$$

That is, MPM candidate 0 of the MPM list may be derived as the planar intra prediction mode, MPM candidate 1 of the MPM list may be derived as the DC intra prediction mode, and MPM candidate 2 of the MPM list may be derived as a vertical intra prediction mode.

On the other hand, the intra prediction mode of the left neighboring block is not identical to the intra prediction mode of the top neighboring block, the encoding apparatus/decoding apparatus may derive MPM candidate 0 as the intra prediction mode of the left neighboring block of the current block and may derive MPM candidate 1 as the intra prediction mode of the top neighboring block of the current block.

If both the intra prediction mode of the left neighboring block and the intra prediction mode of the top neighboring block are not the planar intra prediction mode, the encoding apparatus/decoding apparatus may derive MPM candidate 2 as the planar intra prediction mode. If at least one of the intra prediction mode of the left neighboring block and the intra prediction mode of the top neighboring block is the planar intra prediction mode, the encoding apparatus/decoding apparatus may determine whether the sum of the mode number of the intra prediction mode of the left neighboring block and the mode number of the intra prediction mode of the top neighboring block is less than 2, derive MPM candidate 2 as a vertical intra prediction mode if the sum of the mode number of the intra prediction mode of the left neighboring block and the mode number of the intra prediction mode of the top neighboring block is less than 2, and derive MPM candidate 2 as the DC intra prediction mode if the sum of the mode number of the intra prediction mode of the left neighboring block and the mode number of the intra prediction mode of the top neighboring block is equal to or greater than 2.

Furthermore, the present disclosure proposes another embodiment of modifying MPM list generation methods used in the conventional general intra-prediction, MRL based intra-prediction, and ISP based intra-prediction into a generalized method. A method that does not consider an intra prediction mode that is not used for multi-reference line intra-prediction and sub-partition intra-prediction in an encoder stage is proposed.

As an example, when an encoder performs multi-reference line intra-prediction, the encoder performs inter-prediction in consideration of only intra prediction modes included in an MPM list. For example, an example in which intra prediction modes that are not used for MRL and/or ISP are not considered in generation of an MPM list may be proposed in the present embodiment.

That is, when the encoding apparatus performs MRL based intra-prediction, for example, the encoding apparatus may perform intra-prediction in consideration of only intra prediction modes included in an MPM list. That is, when the MPM list includes the planar intra prediction mode or the DC intra prediction mode, the encoding apparatus may not select the planar intra prediction mode or the DC intra prediction mode as an intra prediction mode of the current block in the present embodiment. Further, as an example similar to the aforementioned example, when the encoding apparatus performs ISP, the encoding apparatus may skip the DC intra prediction mode when the MPM list includes the DC intra prediction mode.

An MPM mode generation method and a mode decoding method proposed in the present embodiment may be the same as the MPM mode generation method and the mode decoding method of the above-described embodiment and may include a feature in which a specific intra prediction mode is not considered only at the time of encoding. Accordingly, coding efficiency may be reduced to some degree during MPM index encoding and decoding, but hardware and software implementation complexity can be reduced according to generation a generalized MPM list, and MRL based intra-prediction and ISP which do not use a specific intra prediction mode can be maintained.

The present embodiment proposes a method of performing intra-prediction, by the encoding apparatus, irrespective of a specific intra prediction mode when MRL based intra-prediction and/or ISP are applied. In this case, an MPM index parsed by the decoding apparatus may not indicate the specific intra prediction mode.

For example, an example in which encoding using the planar intra prediction mode and the DC intra prediction mode is prohibited when MRL based intra-prediction is applied and encoding using the DC intra prediction mode is prohibited when ISP is applied may be proposed.

Figure 14:
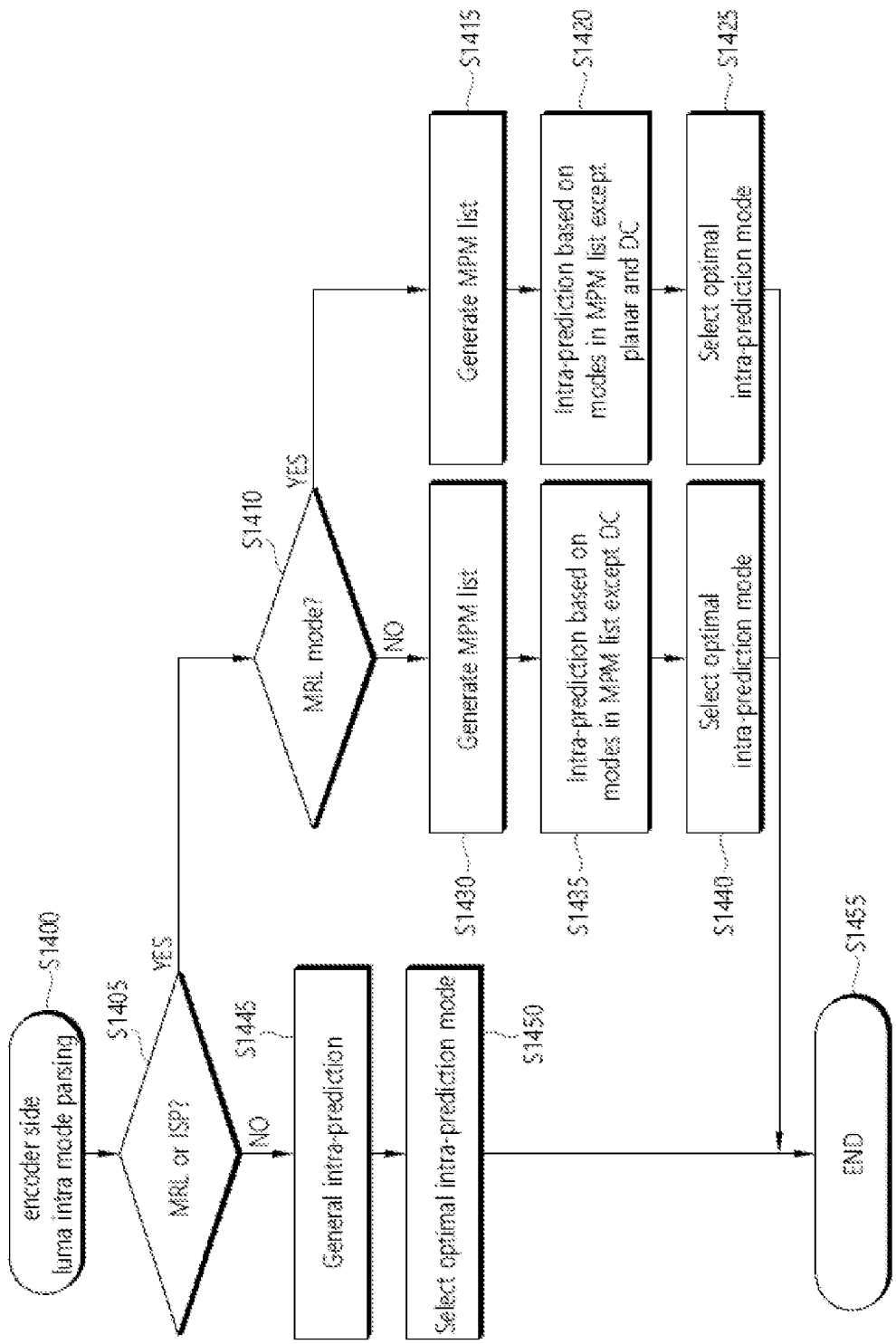
FIG. 14 illustrates an example of encoding based on intra-prediction according to the present embodiment.

FIG. 14 illustrates an example of encoding based on intra-prediction according to the present embodiment. Referring to FIG. 14, the encoding apparatus may determine whether MRL or ISP is applied to the current block (S1405). If MRL or ISP is applied to the current block, the encoding apparatus may determine whether MRL is applied (S1410).

If MRL is applied to the current block, the encoding apparatus may generate an MPM list for the current block through an MPM list generation process (S1415). Thereafter, the encoding apparatus may perform intra-prediction on the current block based on MPM candidates in the MPM list except the planar intra prediction mode and the DC intra prediction mode (i.e., intra prediction modes derived as MPM candidates of the MPM list except the planar intra prediction mode and the DC intra prediction mode) (S1420) and select an optimal intra prediction mode for the current block (S1425).

If ISP is applied to the current block instead of MRL, the encoding apparatus may generate an MPM list for the current block through an MPM list generation process (S1430). Here, the MPM list generation process may be the same as the above-described MPM list generation process performed when MRL is applied. Thereafter, the encoding apparatus may perform intra-prediction on the current block based on MPM candidates in the MPM list except the DC intra prediction mode (i.e., intra prediction modes derived as MPM candidates of the MPM list except the DC intra prediction mode) (S1435) and select an optimal intra prediction mode for the current block (S1440).

If MRL and ISP are not applied to the current block, the encoding apparatus may perform general intra-prediction on the current block based on 67 intra prediction modes (S1445) and select an optimal intra prediction mode for the current block (S1450).

As another example, an example in which encoding using the planar intra prediction mode is prohibited when MRL based intra-prediction is applied and encoding using the DC intra prediction mode is prohibited when ISP is applied may be proposed.

Figure 15:
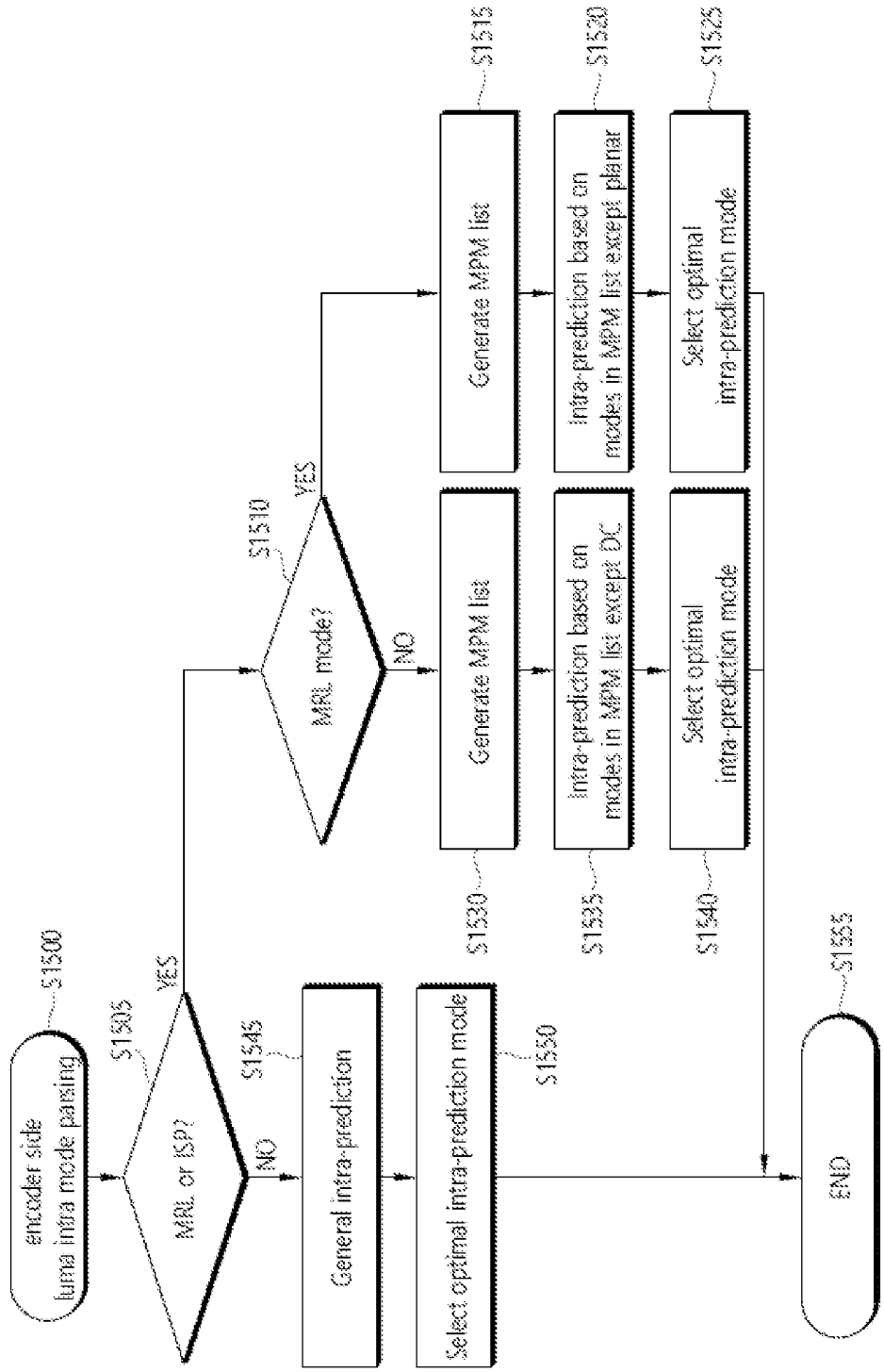
FIG. 15 illustrates an example of encoding based on intra-prediction according to the present embodiment.

FIG. 15 illustrates an example of encoding based on intra-prediction according to the present embodiment. Referring to FIG. 15, the encoding apparatus may determine whether MRL or ISP is applied to the current block (S1505). If MRL or ISP is applied to the current block, the encoding apparatus may determine whether MRL is applied (S1510).

If MRL is applied to the current block, the encoding apparatus may generate an MPM list for the current block through an MPM list generation process (S1515). Thereafter, the encoding apparatus may perform intra-prediction on the current block based on MPM candidates in the MPM list except the planar intra prediction mode (i.e., intra prediction modes derived as MPM candidates of the MPM list except the planar intra prediction mode) (S1520) and select an optimal intra prediction mode for the current block (S1525).

If ISP is applied to the current block instead of MRL, the encoding apparatus may generate an MPM list for the current block through an MPM list generation process (S1530). Here, the MPM list generation process may be the same as the above-described MPM list generation process performed when MRL is applied. Thereafter, the encoding apparatus may perform intra-prediction on the current block based on MPM candidates in the MPM list except the DC intra prediction mode (i.e., intra prediction modes derived as MPM candidates of the MPM list except the DC intra prediction mode) (S1535) and select an optimal intra prediction mode for the current block (S1540).

If MRL and ISP are not applied to the current block, the encoding apparatus may perform general intra-prediction on the current block based on 67 intra prediction modes (S1545) and select an optimal intra prediction mode for the current block (S1550).

As another example, an example in which encoding using the planar intra prediction mode is prohibited when MRL based intra-prediction is applied may be proposed.

Figure 16:
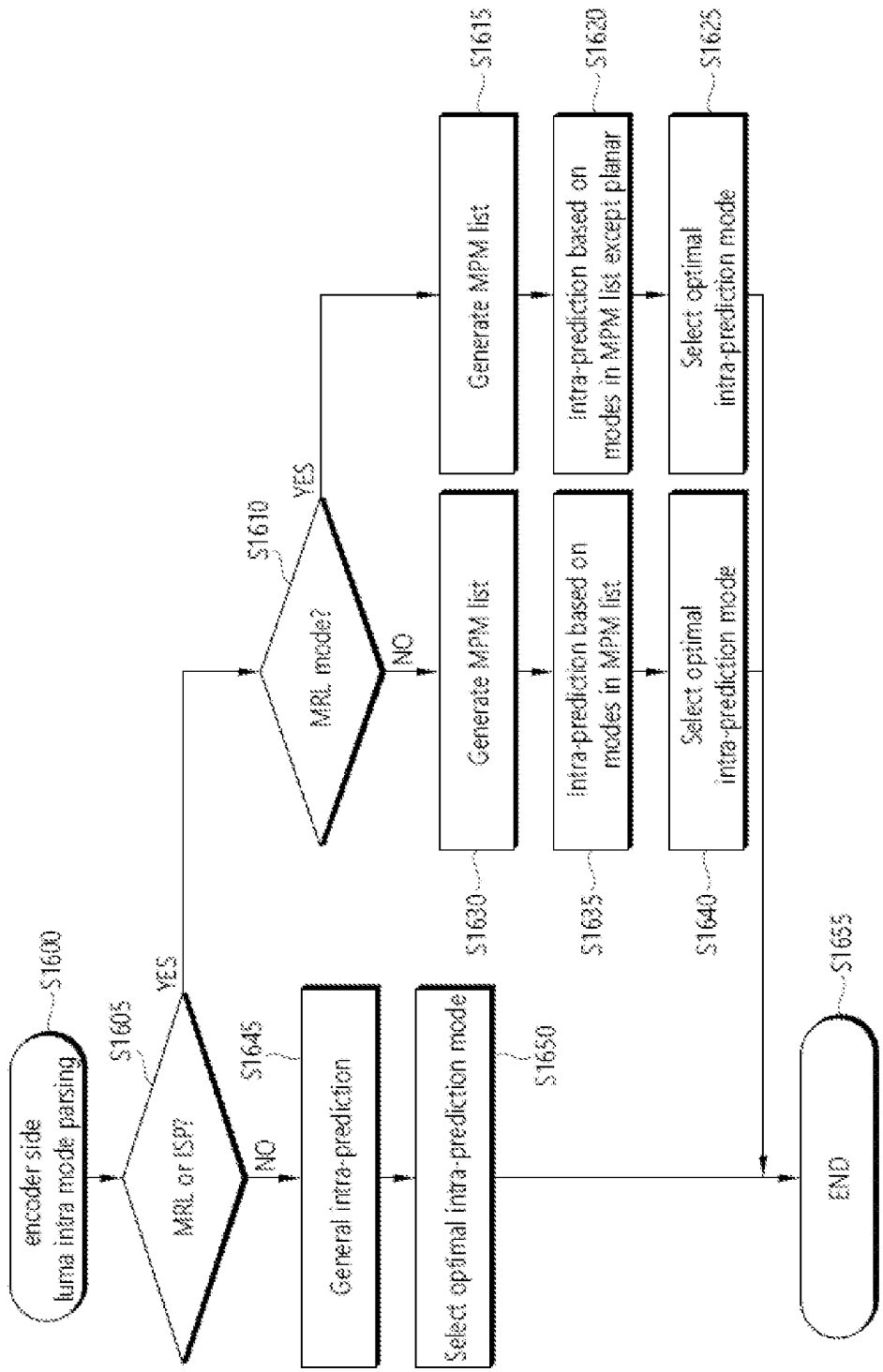
FIG. 16 illustrates an example of encoding based on intra-prediction according to the present embodiment.

FIG. 16 illustrates an example of encoding based on intra-prediction according to the present embodiment. Referring to FIG. 16, the encoding apparatus may determine whether MRL or ISP is applied to the current block (S1605). If MRL or ISP is applied to the current block, the encoding apparatus may determine whether MRL is applied (S1610).

If MRL is applied to the current block, the encoding apparatus may generate an MPM list for the current block through an MPM list generation process (S1615). Thereafter, the encoding apparatus may perform intra-prediction on the current block based on MPM candidates in the MPM list except the planar intra prediction mode (i.e., intra prediction modes derived as MPM candidates of the MPM list except the planar intra prediction mode) (S1620) and select an optimal intra prediction mode for the current block (S1625).

If ISP is applied to the current block instead of MRL, the encoding apparatus may generate an MPM list for the current block through an MPM list generation process (S1630). Here, the MPM list generation process may be the same as the above-described MPM list generation process performed when MRL is applied. Thereafter, the encoding apparatus may perform intra-prediction on the current block based on MPM candidates in the MPM list (i.e., intra prediction modes derived as MPM candidates of the MPM list) (S1635) and select an optimal intra prediction mode for the current block (S1640).

If MRL and ISP are not applied to the current block, the encoding apparatus may perform general intra-prediction on the current block based on 67 intra prediction modes (S1645) and select an optimal intra prediction mode for the current block (S1650).

Meanwhile, the present disclosure proposes a method of more efficiently performing intra prediction performed based on the DC intra prediction mode when the MRL is applied. For example, the present embodiment proposes a method for calculating a DC value when the DC intra prediction mode is applied in MRL-based intra prediction (i.e., when the intra prediction type of the current block is the MRL and the intra prediction mode of the current block is the DC intra prediction mode).

Figure 17:
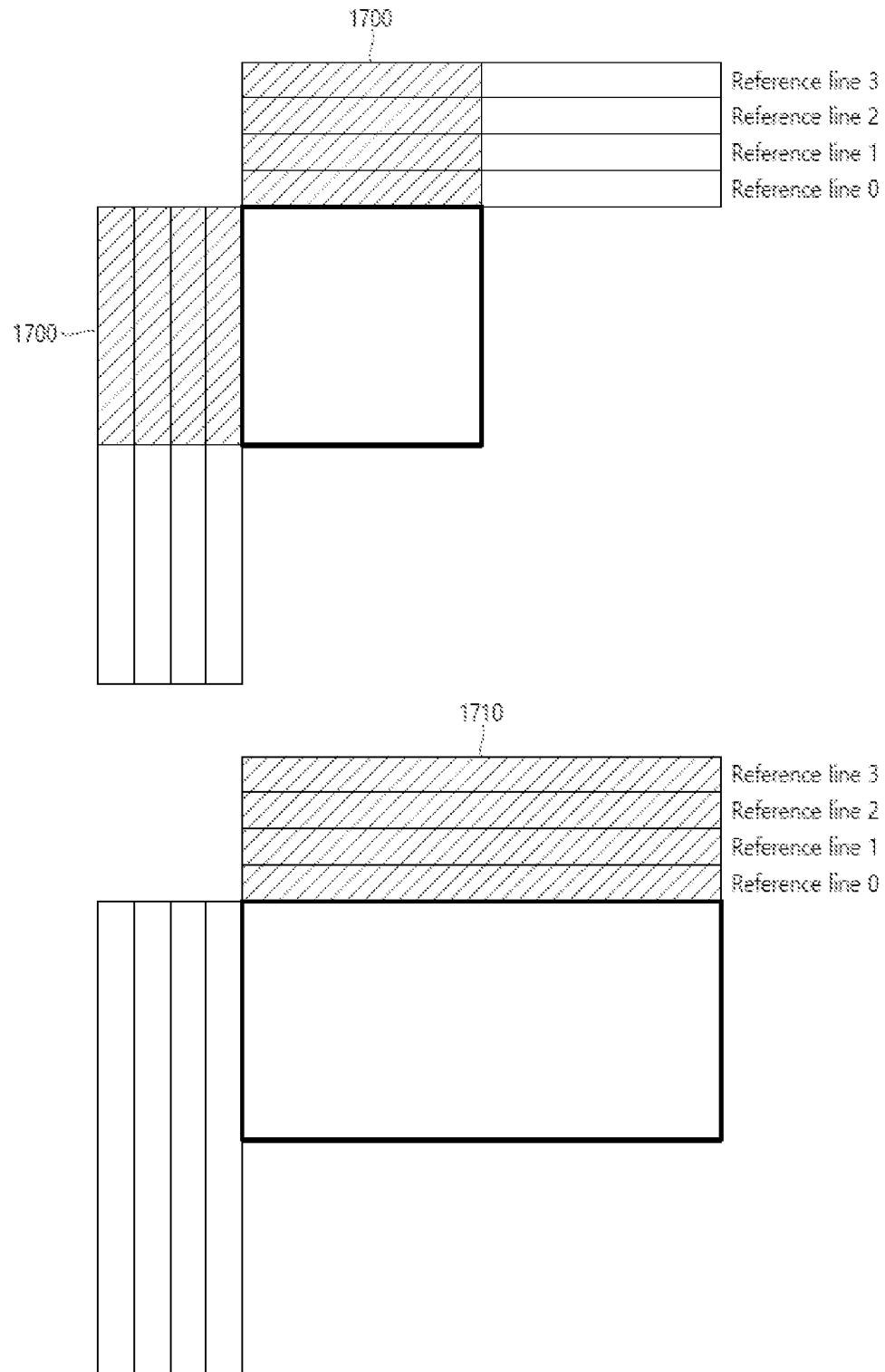
FIG. 17 illustrates a reference sample used to derive a DC value when an intra prediction type of the current block is MRL and an intra prediction mode of the current block is the DC intra prediction mode.

FIG. 17 illustrates a reference sample used to derive a DC value when an intra prediction type of the current block is MRL and an intra prediction mode of the current block is the DC intra prediction mode.

(a) of FIG. 17 may represent a reference sample used to derive a DC value when the current block is a square block. For example, when the reference line indicated by the reference line index is the reference line 0, the reference line 1, the reference line 2, or the reference line 3, the DC value may be derived based on reference samples in the region (1700) shown in (a) of FIG. 17. That is, the DC value may be derived based on the number of reference samples equal to the width from the left end reference sample in the top reference line of the current block and the number of reference samples equal to the width from the top end reference sample in the left reference line of the current block. In other words, when the size of the current block is W×H and the x component and y component of the upper left position of the current block are 0, the DC value may be derived based on (0, −refIdx−1) coordinate reference sample to (W−1, −refIdx−1) coordinate reference sample in the top reference line indicated by the reference line index and (−refIdx−1, 0) coordinate reference sample to (−refIdx−1, H−1) coordinate reference sample in the left reference line indicated by the reference line index.

For example, the DC value may be derived as the following equation.

$$dcVal = \left( \sum_{x'=0}^{nTbW-1} p[x'][-1-refIdx] + \sum_{y'=0}^{nTbH-1} p[-1-refIdx][y'] + nTbW \right) >> (\text{Log2}(nTbW)+1) \quad \text{[Equation 2]}$$

Herein, dcVal may represent the DC value, nTbW may represent the width of the current block, refIdx may represent the reference line indicated by the reference line index.

Also, (b) of FIG. 17 may represent a reference sample used to derive a DC value when the current block is a non-square block. In the present embodiment, when the current block is a non-square block, the DC value may be derived based on reference samples in a reference line on the longer side among a width and a height of the current block. For example, when the reference line indicated by the reference line index is the reference line 0, the reference line 1, the reference line 2, or the reference line 3, the DC value may be derived based on reference samples in the region (1710) of the reference line on the longer side among the width and the height of the current block. For example, when the width of the current block is greater than the height, the DC value may be derived based on the same number of reference samples as the width from the left end reference sample in the top reference line of the current block. In other words, when the size of the current block is W×H and the x component and y component of the upper left position of the current block are 0, the DC value may be derived based on (0, −refIdx−1) coordinate reference sample to (W−1, −refIdx−1) coordinate reference sample in the top reference line indicated by the reference line index. The DC value may be derived as the following equation.

$$deVal = \left( \sum_{x'=0}^{nTbW-1} p[x'][-1-refIdx] + (nTbW) >> 1 \right) \quad \text{[Equation 3]}$$
$$>> \text{Log2}(nTbW)$$

Herein, dcVal may represent the DC value, nTbW may represent the width of the current block, refIdx may represent the reference line indicated by the reference line index.

Also, for example, when the width of the current block is smaller than the height, the DC value may be derived based on the same number of reference samples as the height from the top end reference sample in the left reference line of the current block. In other words, when the size of the current block is W×H and the x component and y component of the upper left position of the current block are 0, the DC value may be derived based on (−refIdx−1, 0) coordinate reference sample to (−refIdx−1, H−1) coordinate reference sample in the left reference line indicated by the reference line index. The DC value may be derived as the following equation.

$$deVal = \left( \sum_{y'=0}^{nTbH-1} p[-1-refIdx][y'] + (nTbH >> 1) \right) \quad \text{[Equation 4]}$$
$$>> \text{Log2}(nTbH)$$

Herein, dcVal may represent the DC value, nTbH may represent the height of the current block, refIdx may represent the reference line indicated by the reference line index.

Thereafter, the prediction sample of the current block may be derived as the DC value.

Meanwhile, the present disclosure proposes a method of more efficiently performing intra prediction performed based on the planar intra prediction mode when the MRL is applied. For example, the present embodiment proposes a method for determining reference samples for planar prediction when the planar intra prediction mode is applied in MRL-based intra prediction (i.e., when the intra prediction type of the current block is the MRL and the intra prediction mode of the current block is the planar intra prediction mode).

Figure 18:
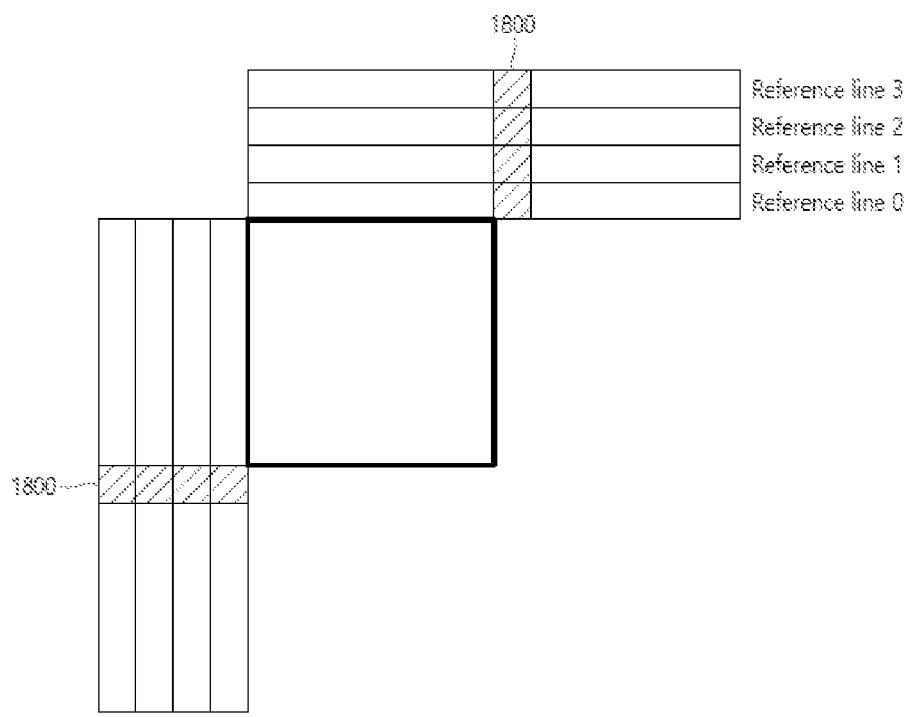
FIG. 18 illustrates a reference sample used when an intra prediction type of the current block is MRL and an intra prediction mode of the current block is the planar intra prediction mode.

FIG. 18 illustrates a reference sample used when an intra prediction type of the current block is MRL and an intra prediction mode of the current block is the planar intra prediction mode.

Referring to FIG. 18, when the reference line indicated by the reference line index is the reference line 0, the reference line 1, the reference line 2, or the reference line 3, planar prediction may be performed based on reference samples in the region (1800) of the reference line shown in FIG. 18. According to the present embodiment, the planar prediction may be performed based on the sample of the end +1 of the width/height of the current block, regardless of the reference line index. That is, according to the present embodiment, when the x component and y component of the upper left position of the current block are 0, the intra prediction type of the current block is the MRL and the intra prediction mode of the current block is the planar intra prediction mode, the planar prediction for the current block may be performed based on a reference sample of (W, −refIdx−1) coordinates in the top reference line and a reference sample of (−refIdx−1, H) coordinates in the left reference line.

Referring to the present embodiment, the planar intra prediction may be performed using reference samples of the reference line indicated by the reference line index, and specifically, the planar intra prediction may be performed based on a left reference sample in the same row (i.e., the same y-coordinate) as the current sample position in the current block, and a top reference sample in the same column (i.e., the same x-coordinate) as the current sample position, among the reference samples of the reference line and the reference sample of (W, −refIdx−1) coordinates in the top reference line and the reference sample of (−refIdx−1, H) coordinates in the left reference line. In this case, a prediction sample value of the current sample may be derived by performing bidirectional linear interpolation based on values of the above-described four reference samples. Here, the bidirectional linear interpolation may be performed assuming that the bottom left reference sample is located at the lower side of the current sample and the right top reference sample is located at the right side of the current sample.

Meanwhile, an embodiment different from the embodiments of the MPM list generation method commonly used in the above-described general intra prediction, the MRL, and the ISP may be used. That is, the present disclosure proposes another example of the MPM list generation method commonly used in the general intra prediction, the MRL, and the ISP. Another example of the MPM list generation method may be as shown in the following figure.

FIG. 30 schematically shows another example of the MPM list generation method.

According to an example of the MPM list generation method shown in FIG. 30, the encoding apparatus/decoding apparatus may derive an intra prediction mode of the left neighboring block and an intra prediction mode of the top neighboring block of the current block. The intra prediction mode of the left neighboring block may be expressed as leftIntraDir, and the intra prediction mode of the top neighboring block may be expressed as aboveIntraDir.

Also, for example, the encoding apparatus/decoding apparatus may derive a default MPM list. For example, the encoding apparatus/decoding apparatus may derive the planar intra prediction mode as a MPM candidate 0 of the default MPM list, the DC intra prediction mode as a MPM candidate 1 of the default MPM list, the vertical intra prediction mode as a MPM candidate 2 of the default MPM list, the horizontal intra prediction mode as a MPM candidate 3 of the default MPM list, an intra prediction mode of the mode number obtained by subtracting 4 from the mode number of the vertical intra prediction mode, that is, the intra prediction mode #46 as a MPM candidate 4 of the default MPM list, an intra prediction mode of the mode number obtained by adding 4 from the mode number of the vertical intra prediction mode, that is, the intra prediction mode #54 as a MPM candidate 5 of the default MPM list.

Thereafter, the encoding apparatus/decoding apparatus may determine whether the intra prediction mode of the left neighboring block and the intra prediction mode of the top neighboring block of the current block are the same and the mode number of the intra prediction mode of the left neighboring block is greater than the mode number of the DC intra prediction mode.

For example, when the intra prediction mode of the left neighboring block and the intra prediction mode of the top neighboring block are the same and the mode number of the intra prediction mode of the left neighboring block is greater than the mode number of the DC intra prediction mode, the encoding apparatus/decoding apparatus may derive the MPM list of the current block including the derived MPM candidate 0 to MPM candidate 5 as described below.

$$mpm[0] = \text{PLANAR\_IDX}$$
$$mpm[1] = \text{leftIntraDir}$$
$$mpm[2] = 2 + ((\text{leftIntraDir} + 61) \% 64)$$
$$mpm[3] = 2 + ((\text{leftIntraDir} - 1) \% 64)$$
$$mpm[4] = \text{DC\_IDX}$$
$$mpm[5] = 2 + ((\text{leftIntraDir} + 60) \% 64)$$

That is, MPM candidate 0 of the MPM list may be derived as the planar intra prediction mode, MPM candidate 1 of the MPM list may be derived as the intra prediction mode of the left neighboring block, MPM candidate 2 of the MPM list may be derived as an intra prediction mode having a mode number of 2+((leftIntraDir+61) % 64), that is, an intra prediction mode having a value, obtained by performing a modulo arithmetic operation with 64 on a value obtained by adding 61 from the mode number of the intra prediction mode of the left neighboring block and adding 2 to the modulo arithmetic operation result, as a mode number, MPM candidate 3 of the MPM list may be derived as an intra prediction mode having a mode number of 2+((leftIntraDir−1) % 64), that is, an intra prediction mode having a value, obtained by performing a modulo arithmetic operation with 64 on a value obtained by subtracting 1 from the mode number of the intra prediction mode of the left neighboring block and adding 2 to the modulo arithmetic operation result, as a mode number, MPM candidate 4 of the MPM list may be derived as the DC intra prediction mode, and MPM candidate 5 of the MPM list may be derived as an intra prediction mode having a mode number of 2+((leftIntraDir+60) % 64), that is, an intra prediction mode having a value, obtained by performing a modulo arithmetic operation with 64 on a value obtained by adding 60 from the mode number of the intra prediction mode of the left neighboring block and adding 2 to the modulo arithmetic operation result, as a mode number.

Meanwhile, when the intra prediction mode of the left neighboring block of the current block and the intra prediction mode of the top neighboring block are not the same, the encoding apparatus/decoding apparatus may determine the mode number of the intra prediction mode of the left neighboring block is greater than the mode number of the DC intra prediction mode and the mode number of the intra prediction mode of the top neighboring block is greater than the mode number of the DC intra prediction mode.

When the mode number of the intra prediction mode of the left neighboring block is greater than the mode number of the DC intra prediction mode and the mode number of the intra prediction mode of the top neighboring block is greater than the mode number of the DC intra prediction mode, the encoding apparatus/decoding apparatus may derive the planar intra prediction mode as a MPM candidate 0 of the MPM list, the intra prediction mode of the left neighboring block as a MPM candidate 1 of the MPM list, the intra prediction mode of the top neighboring block as a MPM candidate 2 of the MPM list, the DC intra prediction mode as a MPM candidate 3 of the MPM list. In addition, when the mode number of the MPM candidate 1 is greater than the mode number of the MPM candidate 2, the encoding apparatus/decoding apparatus may derive maxCandModeIdx as 1, when the mode number of the MPM candidate 1 is not greater than the mode number of the MPM candidate 2, the encoding apparatus/decoding apparatus may derive maxCandModeIdx as 2.

Thereafter, when a value obtained by subtracting the mode number of mpm[minCandModeIdx] from the mode number of mpm[maxCandModeIdx] is less than 63 and greater than 1, the encoding apparatus/decoding apparatus may derive an intra prediction mode with a mode number of 2+((maxAB+61) % 64) as MPM candidate 4 of the MPM list, and an intra prediction mode with a mode number of 2+((maxAB−1) % 64) as MPM candidate 5 of the MPM list. Here, when the maxCandModeIdx is 1, mpm[maxCandModeIdx] may be MPM candidate 1, when the maxCandModeIdx is 2, mpm[maxCandModeIdx] may be MPM candidate 2, when the minCandModeIdx is 1, mpm[minCandModeIdx] may be MPM candidate 1, when the minCandModeIdx is 2, mpm[minCandModeIdx] may be MPM candidate 2. Also, here, maxAB may be a larger value of the mode number of the intra prediction mode of the left neighboring block and the mode number of the intra prediction mode of the top neighboring block.

Alternatively, when the value obtained by subtracting the mode number of mpm[minCandModeIdx] from the mode number of mpm[maxCandModeIdx] is greater than or equal to 63 or less than or equal to 1, the encoding apparatus/decoding apparatus may derive an intra prediction mode with a mode number of 2+((maxAB+60) % 64) as MPM candidate 4 of the MPM list, and an intra prediction mode with a mode number of 2+(maxAB % 64) as MPM candidate 5 of the MPM list.

Meanwhile, when the intra prediction mode of the left neighboring block and the intra prediction mode of the top neighboring block of the current block are not the same, or at least one of the mode numbers of the intra prediction mode of the left neighboring block and the intra prediction mode of the top neighboring block is smaller than the mode number of the DC intra prediction mode, the encoding apparatus/decoding apparatus may determine whether the sum of the mode number of the intra prediction mode of the left neighboring block and the mode number of the intra prediction mode of the top neighboring block is equal to or greater than the mode number of the DC intra prediction mode.

When the sum of the mode number of the intra prediction mode of the left neighboring block and the mode number of the intra prediction mode of the top neighboring block is equal to or greater than the mode number of the DC intra prediction mode, the encoding apparatus/decoding apparatus may derive the MPM list of the current block including the derived MPM candidate 0 to MPM candidate 5 as described below.

$$mpm[0] = PLANAR\_IDX$$
$$mpm[1] = leftIntraDir$$
$$mpm[2] = 2 + ((leftIntraDir + 61) \% 64)$$
$$mpm[3] = 2 + ((leftIntraDir - 1) \% 64)$$
$$mpm[4] = DC\_IDX$$
$$mpm[5] = 2 + ((leftIntraDir + 60) \% 64)$$

That is, MPM candidate 0 of the MPM list may be derived as the planar intra prediction mode, MPM candidate 1 of the MPM list may be derived as the intra prediction mode of the top neighboring block when the mode number of the intra prediction mode of the left neighboring block is smaller than the mode number of the intra prediction mode of the top neighboring block, MPM candidate 1 of the MPM list may be derived as the intra prediction mode of the left neighboring block when the mode number of the intra prediction mode of the left neighboring block is greater than or equal to the mode number of the intra prediction mode of the left neighboring block, MPM candidate 2 of the MPM list may be derived as the DC intra prediction mode, MPM candidate 3 of the MPM list may be derived as an intra prediction mode having a mode number of 2+((maxAB+61) % 64), that is, an intra prediction mode having a value, obtained by performing a modulo arithmetic operation with 64 on a value obtained by adding 61 from the larger value among the mode number of the intra prediction mode of the left neighboring block and the mode number of the intra prediction mode of the top neighboring block and adding 2 to the modulo arithmetic operation result, as a mode number, MPM candidate 4 of the MPM list may be derived as an intra prediction mode having a mode number of 2+((maxAB−1) % 64), that is, an intra prediction mode having a value, obtained by performing a modulo arithmetic operation with 64 on a value obtained by subtracting 1 from the larger value among the mode number of the intra prediction mode of the left neighboring block and the mode number of the intra prediction mode of the top neighboring block and adding 2 to the modulo arithmetic operation result, as a mode number, MPM candidate 5 of the MPM list may be derived as an intra prediction mode having a mode number of 2+((maxAB+60) % 64), that is, an intra prediction mode having a value, obtained by performing a modulo arithmetic operation with 64 on a value obtained by adding 60 from the larger value among the mode number of the intra prediction mode of the left neighboring block and the mode number of the intra prediction mode of the top neighboring block and adding 2 to the modulo arithmetic operation result, as a mode number.

Meanwhile, the embodiment of the above-described method for generating the MPM list may be shown in the following figures as source code.

FIGS. 31-32 schematically show a source code for a method for generating the MPM list according to an embodiment of present document.

In addition, the embodiment of the above-described method for generating the MPM list may be shown in the following figure in a standard format.

FIGS. 33-35 schematically show a method for generating the MPM list in standard format according to an embodiment of present document.

Meanwhile, when the intra prediction according to the intra prediction mode of the current block is expressed in a standard format, it may be as shown in the following figure.

FIG. 36 schematically shows an intra prediction process in standard format according to an embodiment of present document.

In addition, an embodiment of the planar intra prediction mode-based intra prediction performed when the MRL is applied in the present disclosure may be shown in the following figure in a standard format.

FIG. 37 schematically shows a planar intra prediction mode-based intra prediction process when the MRL is applied in standard format according to an embodiment of present document.

In addition, an embodiment of the DC intra prediction mode-based intra prediction performed when the MRL is applied in the present disclosure may be shown in the following figure in a standard format.

FIG. 38 schematically shows a DC intra prediction mode-based intra prediction process when the MRL is applied in standard format according to an embodiment of present document.

In addition, a horizontal transform kernel and a vertical transform kernel derived according to the intra prediction mode may be as follows.

FIG. 39 schematically shows an example of a horizontal transform kernel and a vertical transform kernel derived based on the intra prediction mode.

For example, when the intra prediction mode of the current block is determined as the DC intra prediction mode, DCT2 may be used as a vertical transformation kernel for transform/inverse transform for the residual of the current block, and DCT2 may be used as a horizontal transform kernel.

Meanwhile, according to the present disclosure, a first bin among bins of a bin string of the syntax element of the MPM index may be coded based on context-based regular coding, remaining bins of the bin string may be bypass coded.

In this case, the context index increment ctxInc for indicating the context model of the first bin may be set differently based on at least one of a value of an ISP flag for the current block and/or a value of a reference line index for the current block as follows.

FIG. 40 schematically shows an example of an assignment of context index increment to syntax elements.

For example, referring to FIG. 40, when the value of the reference line index is not 0, the ctxInc may be derived as 2, when the value of the reference line index is 0, if the value of the ISP flag is 1, the ctxInc may be derived as 0, and if the value of the ISP flag is not 1, the ctxInc may be derived as 1.

Meanwhile, the present disclosure proposes another embodiment of more efficiently performing intra prediction performed based on the DC intra prediction mode when the MRL is applied.

Figure 19:
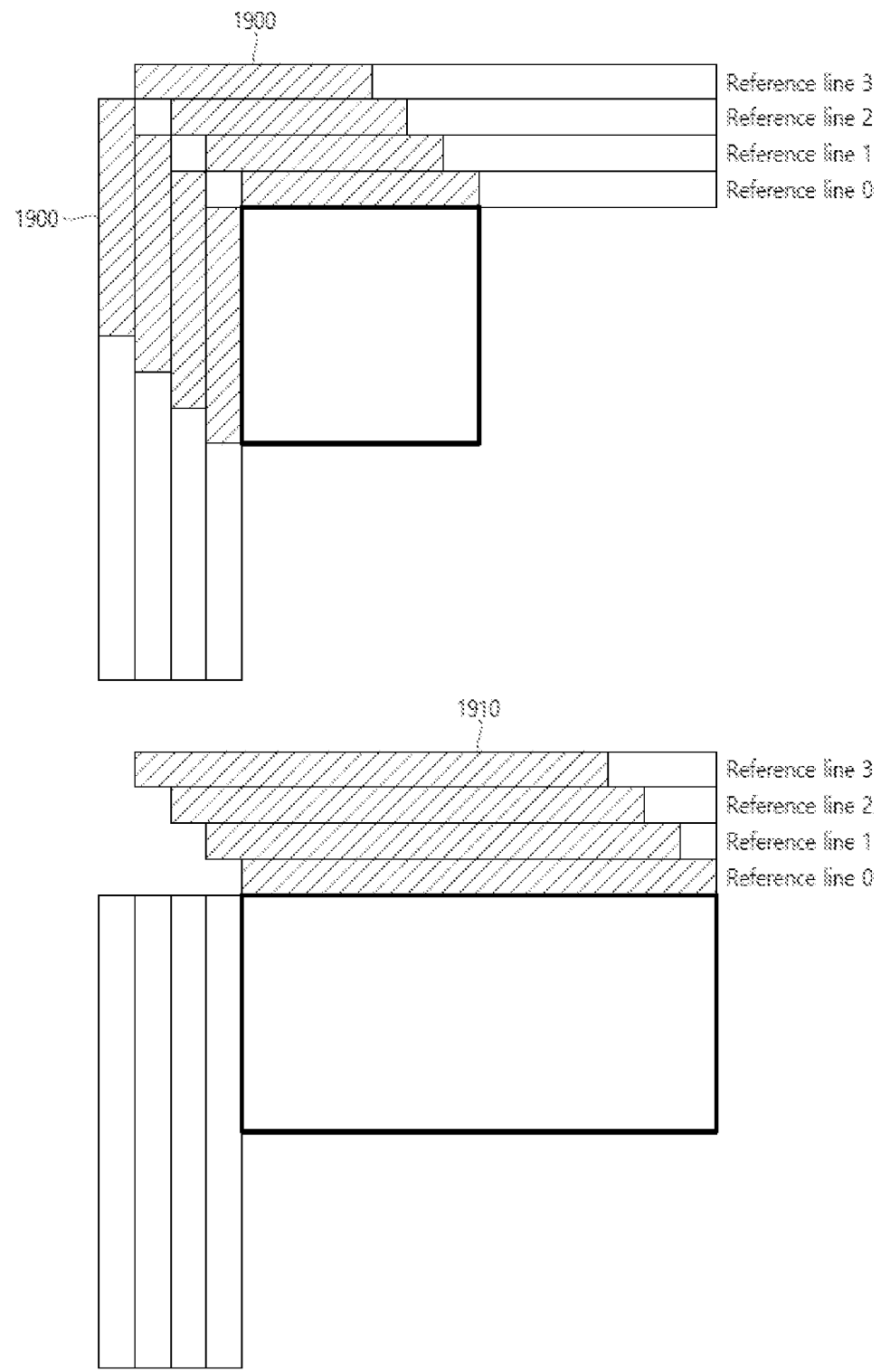
FIG. 19 illustrates a reference sample used to derive a DC value when an intra prediction type of the current block is MRL and an intra prediction mode of the current block is the DC intra prediction mode.

FIG. 19 illustrates a reference sample used to derive a DC value when an intra prediction type of the current block is MRL and an intra prediction mode of the current block is the DC intra prediction mode.

(a) of FIG. 19 may represent a reference sample used to derive a DC value when the current block is a square block. For example, when the reference line indicated by the reference line index is the reference line 0, the reference line 1, the reference line 2, or the reference line 3, the DC value may be derived based on reference samples in the region (1900) shown in (a) of FIG. 19. That is, when the x component and y component of the upper left position of the current block are 0, the DC value may be derived based on the number of reference samples equal to the width from the (−refIdx, −refIdx−1) coordinate reference sample in the top reference line of the current block and the number of reference samples equal to the width from the (−refIdx−1, −refIdx) coordinate reference sample in the left reference line of the current block. For example, when the value of the reference line index is 0, the DC value may be derived based on the number of reference samples equal to the width from a reference sample of (0, −1) coordinates in the top reference line 0 of the current block and the number of reference samples equal to the width from a reference sample of (−1, 0) coordinates in the left reference line 0 of the current block, when the value of the reference line index is 1, the DC value may be derived based on the number of reference samples equal to the width from a reference sample of (−1, −2) coordinates in the top reference line 1 of the current block and the number of reference samples equal to the width from a reference sample of (−2, −1) coordinates in the left reference line 1 of the current block, when the value of the reference line index is 2, the DC value may be derived based on the number of reference samples equal to the width from a reference sample of (−2, −3) coordinates in the top reference line 2 of the current block and the number of reference samples equal to the width from a reference sample of (−3, −2) coordinates in the left reference line 2 of the current block, when the value of the reference line index is 3, the DC value may be derived based on the number of reference samples equal to the width from a reference sample of (−3, −4) coordinates in the top reference line 3 of the current block and the number of reference samples equal to the width from a reference sample of (−4, −3) coordinates in the left reference line 3 of the current block.

Also, (b) of FIG. 19 may represent a reference sample used to derive a DC value when the current block is a non-square block. In the present embodiment, when the current block is a non-square block, the DC value may be derived based on reference samples in a reference line on the longer side among a width and a height of the current block. For example, when the reference line indicated by the reference line index is the reference line 0, the reference line 1, the reference line 2, or the reference line 3, the DC value may be derived based on reference samples in the region (1910) of the reference line on the longer side among the width and the height of the current block. For example, when the width of the current block is greater than the height, the DC value may be derived based on the same number of reference samples as the width from the (−refIdx, −refIdx−1) coordinate reference sample in the top reference line of the current block. For example, when the value of the reference line index is 0, the DC value may be derived based on the number of reference samples equal to the width from a reference sample of (0, −1) coordinates in the top reference line 0 of the current block, when the value of the reference line index is 1, the DC value may be derived based on the number of reference samples equal to the width from a reference sample of (−1, −2) coordinates in the top reference line 1 of the current block, when the value of the reference line index is 2, the DC value may be derived based on the number of reference samples equal to the width from a reference sample of (−2, −3) coordinates in the top reference line 2 of the current block, when the value of the reference line index is 3, the DC value may be derived based on the number of reference samples equal to the width from a reference sample of (−3, −4) coordinates in the top reference line 3 of the current block.

Also, for example, when the width of the current block is smaller than the height, the DC value may be derived based on the same number of reference samples as the height from the (−refIdx−1, −refIdx) coordinate reference sample in the left reference line of the current block. For example, when the value of the reference line index is 0, the DC value may be derived based on the number of reference samples equal to the height from a reference sample of (−1, 0) coordinates in the left reference line 0 of the current block, when the value of the reference line index is 1, the DC value may be derived based on the number of reference samples equal to the height from a reference sample of (−2, −1) coordinates in the left reference line 1 of the current block, when the value of the reference line index is 2, the DC value may be derived based on the number of reference samples equal to the height from a reference sample of (−3, −2) coordinates in the left reference line 2 of the current block, when the value of the reference line index is 3, the DC value may be derived based on the number of reference samples equal to the height from a reference sample of (−4, −3) coordinates in the left reference line 3 of the current block.

Thereafter, the prediction sample of the current block may be derived as the DC value.

An embodiment of the DC intra prediction mode-based intra prediction performed when the MRL is applied in the present disclosure may be shown in the following figure in a standard format.

FIG. 41 schematically shows a DC intra prediction mode-based intra prediction process when the MRL is applied in standard format according to an embodiment of present document.

Meanwhile, the present disclosure proposes another embodiment of more efficiently performing intra prediction performed based on the planar intra prediction mode when the MRL is applied.

Figure 20:
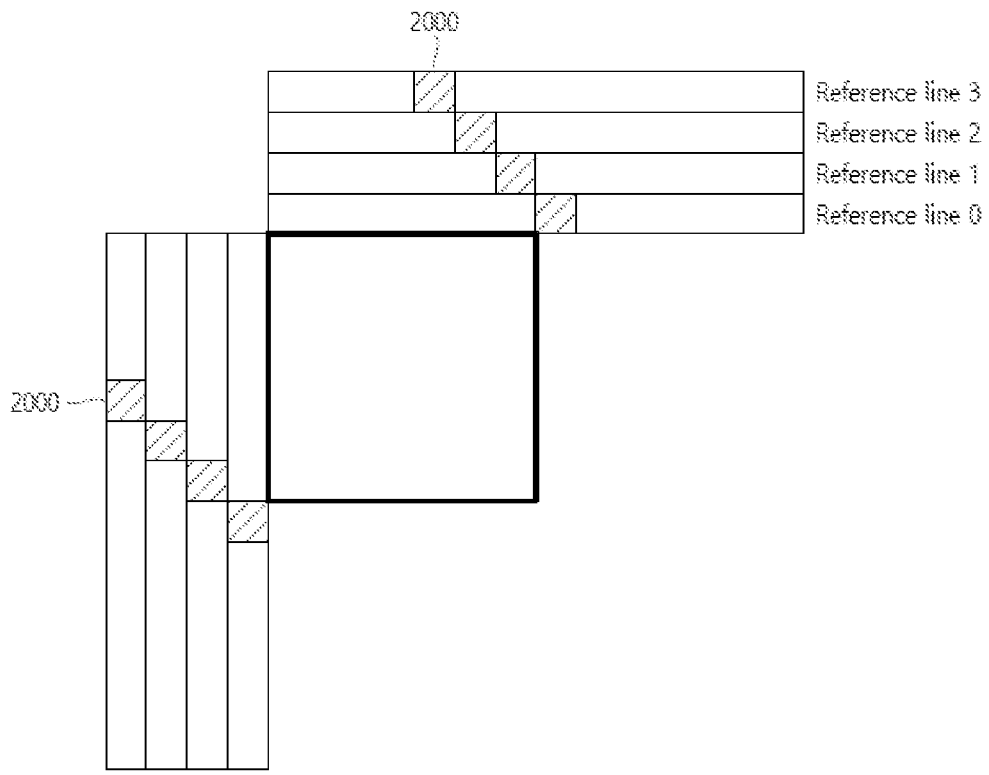
FIG. 20 illustrates a reference sample used when an intra prediction type of the current block is MRL and an intra prediction mode of the current block is the planar intra prediction mode.

FIG. 20 illustrates a reference sample used when an intra prediction type of the current block is MRL and an intra prediction mode of the current block is the planar intra prediction mode.

Referring to FIG. 20, when the reference line indicated by the reference line index is the reference line 0, the reference line 1, the reference line 2, or the reference line 3, planar prediction may be performed based on reference samples in the region (2000) of the reference line shown in FIG. 20. According to the present embodiment, the planar prediction may be performed based on the sample of the end +1−refIdx of the width/height of the current block, regardless of the reference line index. That is, according to the present embodiment, when the x component and y component of the upper left position of the current block are 0, the intra prediction type of the current block is the MRL and the intra prediction mode of the current block is the planar intra prediction mode, the planar prediction for the current block may be performed based on a reference sample of (W−refIdx, −refIdx−1) coordinates in the top reference line and a reference sample of (−refIdx−1, H−refIdx) coordinates in the left reference line.

Referring to the present embodiment, the planar intra prediction may be performed using reference samples of the reference line indicated by the reference line index, and specifically, the planar intra prediction may be performed based on a left reference sample in the same row (i.e., the same y-coordinate) as the current sample position in the current block, and a top reference sample in the same column (i.e., the same x-coordinate) as the current sample position, among the reference samples of the reference line and the reference sample of (W−refIdx, −refIdx−1) coordinates in the top reference line and the reference sample of (−refIdx−1, H−refIdx) coordinates in the left reference line. In this case, a prediction sample value of the current sample may be derived by performing bidirectional linear interpolation based on values of the above-described four reference samples. Here, the bidirectional linear interpolation may be performed assuming that the bottom left reference sample is located at the lower side of the current sample and the right top reference sample is located at the right side of the current sample.

An embodiment of the planar intra prediction mode-based intra prediction performed when the MRL is applied in the present disclosure may be shown in the following figure in a standard format.

FIG. 42 schematically shows a planar intra prediction mode-based intra prediction process when the MRL is applied in standard format according to an embodiment of present document.

Figure 21:
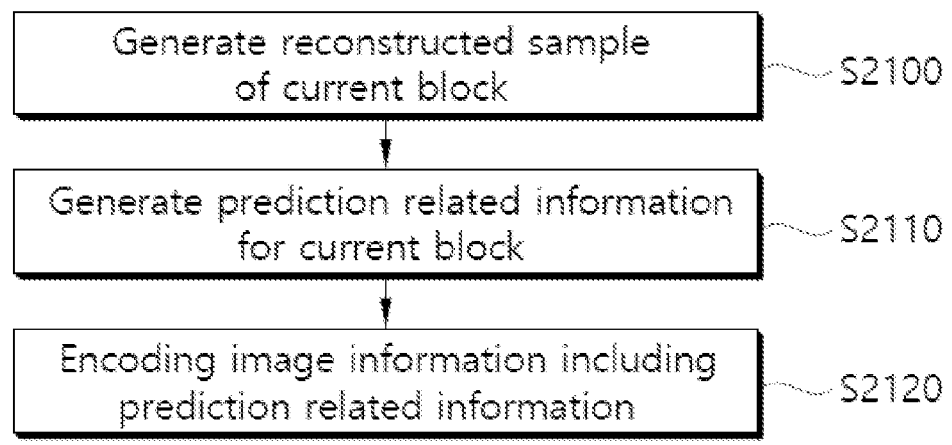
FIG. 21 schematically illustrates an image encoding method performed by an encoding apparatus according to the present disclosure.

FIG. 21 schematically illustrates an image encoding method performed by an encoding apparatus according to the present disclosure. The method disclosed in FIG. 21 may be performed by the encoding apparatus disclosed in FIG. 2. Specifically, S2100 of FIG. 21 may be performed by the predictor of the encoding apparatus and S2110 to S2120 may be performed by the entropy encoder of the encoding apparatus, for example. In addition, although not illustrated, a process of deriving a residual sample with respect to the current block based on an original sample and a prediction sample with respect to the current block may be performed by the subtractor of the encoding apparatus, a process of generating residual information about the current block based on the residual sample may be performed by the residual processor of the encoding apparatus, and a process of encoding image information including the residual information may be performed by the entropy encoder of the encoding apparatus.

The encoding apparatus generates a reconstructed sample of a current block (S2100). The encoding apparatus may derive a prediction sample of the current block by performing prediction for the current block, derive a residual sample of the current block based on the prediction sample, and generate the reconstructed sample of the current block based on the prediction sample and the residual sample.

For example, the encoding apparatus may determine an intra prediction type for the current block from among the above-described intra prediction types. For example, the encoding apparatus may determine the intra prediction type for the current block in consideration of rate distortion (RD) cost. The above-described intra prediction types may include a first intra prediction type using intra-prediction reference lines adjacent to the current block, a second intra prediction type using intra-prediction reference lines that are not adjacent to the current block, and a third intra prediction type to which intra sub-partitions mode (ISP) is applied. The first intra prediction type may indicate the above-described general intra-prediction, the second intra prediction type may indicate the above-described MRL, and the third intra prediction type may indicate the above-described ISP.

For example, the encoding apparatus may generate and encode a reference line index indicating an intra prediction reference line of the current block. It may be determined whether the intra prediction type for the current block is the second intra prediction type based on the reference line index. If the intra prediction type for the current block is not the second intra prediction type, for example, the encoding apparatus may generate and encode an ISP flag representing whether the third intra prediction type is applied to the current block. It may be determined whether the intra prediction type for the current block is the third intra prediction type based on the ISP flag. The intra prediction type for the current block may be derived as the third intra prediction type if the ISP flag indicates that the third intra prediction type is applied to the current block, and the intra prediction type for the current block may be derived as the first intra prediction type if the ISP flag indicates that the third intra prediction type is not applied to the current block. Prediction related information may include the reference line index, the ISP flag, and/or the ISP index. The prediction related information may include the reference line index and may further include the ISP flag when the reference line index is 0. When the ISP flag is 1, the prediction related information may further include the ISP index.

For example, the encoding apparatus may construct an intra prediction mode candidate list of the current block based on intra prediction modes of neighboring blocks of the current block.

For example, the encoding apparatus the intra prediction mode candidate list of the current block by performing the intra prediction mode candidate list construction process shown in FIG. 27. Meanwhile, the intra prediction mode candidate list may mean the above-described most probable mode (MPM) list.

For example, the encoding apparatus may construct the inter-prediction mode candidate list based on a first candidate intra prediction mode and a second candidate intra prediction mode. The encoding apparatus may construct the inter-prediction mode candidate list based on whether the first candidate intra prediction mode is identical to the second candidate intra prediction mode and/or whether a mode number of the first candidate intra prediction mode and/or a mode number of the second candidate intra prediction mode are greater than the mode number of the DC intra prediction mode. Here, the first candidate intra prediction mode may be derived based on the intra prediction mode of the left neighboring block of the current block and the second candidate intra prediction mode may be derived based on the intra prediction mode of the top neighboring block of the current block. For example, the intra prediction mode of the left neighboring block of the current block may be derived as the first candidate intra prediction mode and the intra prediction mode of the top neighboring block of the current block may be derived as the second candidate intra prediction mode.

Specifically, when the first candidate intra prediction mode is identical to the second candidate intra prediction mode, for example, the encoding apparatus may determine whether the mode number of the first candidate intra prediction mode is greater than the mode number of the DC intra prediction mode, and if the mode number of the first candidate intra prediction mode is greater than the mode number of the DC intra prediction mode, derive the intra prediction mode candidate list for the current block which includes intra prediction mode candidates as follows.

$mpm[0] = leftIntraDir$ $mpm[1] = PLANAR\_IDX$ $mpm[2] = DC\_IDX$

-continued $$mpm[3] = ((leftIntraDir + \text{offset}) \% \text{ mod}) + 2$$

$$mpm[4] = ((leftIntraDir + 1) \% \text{ mod}) + 2$$

$$mpm[5] = ((leftIntraDir + \text{offset}-1) \% \text{ mod}) + 2$$

Here, mpm[0], mpm[1], mpm[2], mpm[3], mpm[4], and mpm[5] represent intra prediction mode candidate 0, intra prediction mode candidate 1, intra prediction mode candidate 2, intra prediction mode candidate 3, intra prediction mode candidate 4, and intra prediction mode candidate 5, leftIntraDir represents the first candidate intra prediction mode, PLANAR_IDX represents the planar intra prediction mode, and DC_IDX represents the DC intra prediction mode. That is, intra prediction mode candidate 0 of the intra prediction mode candidate list may be derived as the first candidate intra prediction mode, intra prediction mode candidate 1 of the intra prediction mode candidate list may be derived as the planar intra prediction mode, intra prediction mode candidate 2 of the intra prediction mode candidate list may be derived as the DC intra prediction mode, intra prediction mode candidate 3 of the intra prediction mode candidate list may be derived as an intra prediction mode having a mode number of (leftIntraDir+offset) % mod)+2, that is, an intra prediction mode having a value, obtained by performing a modulo arithmetic operation on the sum of the mode number of the first candidate intra prediction mode and an offset and adding 2 to the modulo arithmetic operation result, as a mode number, intra prediction mode candidate 4 of the intra prediction mode candidate list may be derived as an intra prediction mode having a mode number of ((leftIntraDir−1) % mod)+2, that is, an intra prediction mode having a value, obtained by performing a modulo arithmetic operation on a value obtained by subtracting 1 from the mode number of the first candidate intra prediction mode and adding 2 to the modulo arithmetic operation result, as a mode number, and intra prediction mode candidate 5 of the intra prediction mode candidate list may be derived as an intra prediction mode having a mode number of ((leftIntraDir+offset−1) % mod)+2, that is, an intra prediction mode having a value, obtained by performing a modulo arithmetic operation on the sum of the mode number of the first candidate intra prediction mode and (offset −1) and adding 2 to the modulo arithmetic operation result, as a mode number.

For example, when the first candidate intra prediction mode is not identical to the second candidate intra prediction mode, the encoding apparatus may derive intra prediction mode candidate 0 and intra prediction mode candidate 1 as follows.

$$mpm[0] = leftIntraDir$$

$$mpm[1] = aboveIntraDir$$

That is, intra prediction mode candidate 0 of the intra prediction mode candidate list may be derived as the first candidate intra prediction mode, and intra prediction mode candidate 1 of the intra prediction mode candidate list may be derived as the second candidate intra prediction mode. Further, maxCandModeIdx may be derived as 0 if the mode number of intra prediction mode candidate 0 is greater than the mode number of intra prediction mode candidate 1 and maxCandModeIdx may be derived as 1 if the mode number of intra prediction mode candidate 0 is not greater than the mode number of intra prediction mode candidate 1.

If the mode number of the first candidate intra prediction mode and the mode number of the second candidate intra prediction mode are greater than the mode number of the DC intra prediction mode, the encoding apparatus may derive intra prediction mode candidate 2 and intra prediction mode candidate 3 as follows.

$$mpm[2] = \text{PLANAR\_IDX}$$

$$mpm[3] = \text{DC\_IDX}$$

That is, intra prediction mode candidate 2 of the intra prediction mode candidate list may be derived as the planar intra prediction mode, and intra prediction mode candidate 3 of the intra prediction mode candidate list may be derived as the DC intra prediction mode.

Then, if a value obtained by subtracting a mode number of mpm[!maxCandModeIdx] from a mode number of mpm[maxCandModeIdx] is less than 63 and greater than 1, the encoding apparatus/decoding apparatus may derive intra prediction mode candidate 4 and intra prediction mode candidate 5 as follows.

$$mpm[4] = (mpm[maxCandModeIdx] + \text{offset}) \% \text{ mod}) + 2$$

$$mpm[5] = ((mpm[maxCandModeIdx] - 1) \% \text{ mod}) + 2$$

That is, intra prediction mode candidate 4 of the intra prediction mode candidate list may be derived as an intra prediction mode having a mode number of ((mpm[maxCandModeIdx]+offset) % mod)+2, that is, an intra prediction mode having a value, obtained by performing a modulo arithmetic operation on the sum of mpm[maxCandModeIdx] and an offset and adding 2 to the modulo arithmetic operation result, as a mode number, and intra prediction mode candidate 5 of the intra prediction mode candidate list may be derived as an intra prediction mode having a mode number of ((mpm[maxCandModeIdx]−1) % mod)+2, that is, an intra prediction mode having a value, obtained by performing a modulo arithmetic operation on a value obtained by subtracting 1 from mpm[maxCandModeIdx] and adding 2 to the modulo arithmetic operation result, as a mode number.

If the value obtained by subtracting the mode number of mpm[!maxCandModeIdx] from the mode number of mpm[maxCandModeIdx] is equal to or greater than 63 or equal to or less than 1, the encoding apparatus/decoding apparatus may derive intra prediction mode candidate 4 and intra prediction mode candidate 5 as follows.

$$mpm[4] = ((mpm[maxCandModeIdx] + \text{offset} - 1) \% \text{ mod}) + 2$$

$$mpm[5] = ((mpm[maxCandModeIdx]) \% \text{ mod}) + 2$$

That is, intra prediction mode candidate 4 of the intra prediction mode candidate list may be derived as an intra prediction mode having a mode number of ((mpm[maxCandModeIdx]+offset−1) % mod)+2, that is, an intra prediction mode having a value, obtained by performing a modulo arithmetic operation on the sum of mpm[maxCandModeIdx]

and (offset−1) and adding 2 to the modulo arithmetic operation result, as a mode number, and intra prediction mode candidate 5 of the intra prediction mode candidate list may be derived as an intra prediction mode having a mode number of ((mpm[maxCandModeIdx] % mod)+2, that is, an intra prediction mode having a value, obtained by performing a modulo arithmetic operation on mpm[maxCandModeIdx] and adding 2 to the modulo arithmetic operation result, as a mode number.

If at least one of the mode number of the first candidate intra prediction mode and the mode number of the second candidate intra prediction mode is not greater than the mode number of the DC intra prediction mode, the encoding apparatus may determine whether the sum of the mode number of the first candidate intra prediction mode and the mode number of the second candidate intra prediction mode is equal to or greater than 2. If the sum of the mode number of the first candidate intra prediction mode and the mode number of the second candidate intra prediction mode is equal to or greater than 2, the encoding apparatus may derive intra prediction mode candidate 2 to intra prediction mode candidate 5 as follows.

$$mpm[2] = (mpm[!\ maxCanModeIdx] == \text{PLANAR\_IDX})\ ?\ \text{DC\_IDX}$$
$$:\text{PLANAR\_IDX}$$
$$mpm[3] = ((mpm[maxCandModeIdx] + \text{offset})\ \%\ \text{mod}) + 2$$
$$mpm[3] = ((mpm[maxCandModeIdx] - 1)\ \%\ \text{mod}) + 2$$
$$mpm[3] = ((mpm[maxCandModeIdx] + \text{offset}-1)\ \%\ \text{mod}) + 2$$

That is, intra prediction mode candidate 2 of the intra prediction mode candidate list may be derived as the DC intra prediction mode if mpm[!maxCandModeIdx] is the planar intra prediction mode and may be derived as the planar intra prediction mode if mpm[!maxCandModeIdx] is not the planar intra prediction mode. In addition, intra prediction mode candidate 3 of the intra prediction mode candidate list may be derived as an intra prediction mode having a mode number of ((mpm[maxCandModeIdx]+offset) % mod)+2, that is, an intra prediction mode having a value, obtained by performing a modulo arithmetic operation on the sum of mpm[maxCandModeIdx] and an offset and adding 2 to the modulo arithmetic operation result, as a mode number, intra prediction mode candidate 4 of the intra prediction mode candidate list may be derived as an intra prediction mode having a mode number of ((mpm[maxCandModeIdx]−1) % mod)+2, that is, an intra prediction mode having a value, obtained by performing a modulo arithmetic operation on a value obtained by subtracting 1 from mpm[maxCandModeIdx] and adding 2 to the modulo arithmetic operation result, as a mode number, and intra prediction mode candidate 5 of the intra prediction mode candidate list may be derived as an intra prediction mode having a mode number of ((mpm[maxCandModeIdx]+offset−1) % mod)+2, that is, an intra prediction mode having a value, obtained by performing a modulo arithmetic operation on the sum of mpm[maxCandModeIdx] and (offset −1) and adding 2 to the modulo arithmetic operation result, as a mode number.

If the aforementioned conditions are not satisfied, the encoding apparatus may derive intra prediction mode candidate 0 to intra prediction mode candidate 5 as follows.

$$mpm[0] = \text{leftIntraDir}$$
$$mpm[1] = (mpm[0] == \text{PLANAR\_IDX})\ ?\ \text{DC\_IDX:PLANAR\_IDX}$$
$$mpm[2] = \text{VER\_IDX}$$
$$mpm[3] = \text{HOR\_IDX}$$
$$mpm[4] = \text{VER\_IDX} - 4$$
$$mpm[5] = \text{VER\_IDX} + 4$$

That is, intra prediction mode candidate 0 of the intra prediction mode candidate list may be derived as the first candidate intra prediction mode, intra prediction mode candidate 1 of the intra prediction mode candidate list may be derived as the DC intra prediction mode if intra prediction mode candidate 0 is the planar intra prediction mode and derived as planar intra prediction mode if intra prediction mode candidate 0 is not the planar intra prediction mode, intra prediction mode candidate 2 of the intra prediction mode candidate list may be derived as a vertical intra prediction mode, intra prediction mode candidate 3 of the intra prediction mode candidate list may be derived as a horizontal intra prediction mode, intra prediction mode candidate 4 of the intra prediction mode candidate list may be derived as an intra prediction mode corresponding to a mode number obtained by subtracting 4 from the mode number of the vertical intra prediction mode, that is, intra prediction mode #46, and intra prediction mode candidate 5 of the intra prediction mode candidate list may be derived as an intra prediction mode corresponding to a mode number obtained by adding 4 to the mode number of the vertical intra prediction mode, that is, intra prediction mode #54.

For example, the encoding apparatus may perform the intra prediction mode candidate list construction process shown in FIG. 28 to construct the intra prediction mode candidate list for the current block.

For example, the encoding apparatus may construct the intra prediction mode candidate list based on the first candidate intra prediction mode and the second candidate intra prediction mode. The encoding apparatus may construct the inter-prediction mode candidate list based on whether the first candidate intra prediction mode is identical to the second candidate intra prediction mode and/or whether the mode number of the first candidate intra prediction mode and/or the mode number of the second candidate intra prediction mode are greater than the mode number of the DC intra prediction mode. Here, the first candidate intra prediction mode may be derived based on the intra prediction mode of the left neighboring block of the current block and the second candidate intra prediction mode may be derived based on the intra prediction mode of the top neighboring block of the current block. For example, the intra prediction mode of the left neighboring block of the current block may be derived as the first candidate intra prediction mode and the intra prediction mode of the top neighboring block of the current block may be derived as the second candidate intra prediction mode.

Specifically, when the first candidate intra prediction mode is identical to the second candidate intra prediction mode, for example, the encoding apparatus may determine whether the mode number of the first candidate intra prediction mode is greater than the mode number of the DC intra prediction mode, and if the mode number of the first candidate intra prediction mode is greater than the mode number of the DC intra prediction mode, derive the intra prediction mode candidate list for the current block which includes intra prediction mode candidates as follows.

$$mpm[0] = leftIntraDir$$
$$mpm[1] = PLANAR\_IDX$$
$$mpm[2] = ((leftIntraDir + \text{offset}) \% \text{ mod}) + 2$$
$$mpm[3] = ((leftIntraDir + 1) \% \text{ mod}) + 2$$
$$mpm[4] = DC\_IDX$$
$$mpm[5] = ((leftIntraDir + \text{offset}-1) \% \text{ mod}) + 2$$

Here, mpm[0], mpm[1], mpm[2], mpm[3], mpm[4], and mpm[5] represent intra prediction mode candidate 0, intra prediction mode candidate 1, intra prediction mode candidate 2, intra prediction mode candidate 3, intra prediction mode candidate 4, and intra prediction mode candidate 5, leftIntraDir represents the first candidate intra prediction mode, PLANAR_IDX represents the planar intra prediction mode, and DC_IDX represents the DC intra prediction mode. That is, intra prediction mode candidate 0 of the intra prediction mode candidate list may be derived as the first candidate intra prediction mode, intra prediction mode candidate 1 of the intra prediction mode candidate list may be derived as the planar intra prediction mode, intra prediction mode candidate 2 of the intra prediction mode candidate list may be derived as an intra prediction mode having a mode number of ((leftIntraDir+offset) % mod)+2, that is, an intra prediction mode having a value, obtained by performing a modulo arithmetic operation on the sum of the mode number of the first candidate intra prediction mode and an offset and adding 2 to the modulo arithmetic operation result, as a mode number, intra prediction mode candidate 3 of the intra prediction mode candidate list may be derived as an intra prediction mode having a mode number of ((leftIntraDir−1) % mod)+2, that is, an intra prediction mode having a value, obtained by performing a modulo arithmetic operation on a value obtained by subtracting 1 from the mode number of the first candidate intra prediction mode and adding 2 to the modulo arithmetic operation result, as a mode number, intra prediction mode candidate 4 of the intra prediction mode candidate list may be derived as the DC intra prediction mode, and intra prediction mode candidate 5 of the intra prediction mode candidate list may be derived as an intra prediction mode having a mode number of ((leftIntraDir+offset−1) % mod)+2, that is, an intra prediction mode having a value, obtained by performing a modulo arithmetic operation on the sum of the mode number of the first candidate intra prediction mode and (offset −1) and adding 2 to the modulo arithmetic operation result, as a mode number.

For example, when the first candidate intra prediction mode is not identical to the second candidate intra prediction mode, the encoding apparatus may derive intra prediction mode candidate 0 and intra prediction mode candidate 1 as follows.

$$mpm[0] = leftIntraDir$$
$$mpm[1] = aboveIntraDir$$

That is, intra prediction mode candidate 0 of the intra prediction mode candidate list may be derived as the first candidate intra prediction mode, and intra prediction mode candidate 1 of the intra prediction mode candidate list may be derived as the second candidate intra prediction mode. Further, the encoding apparatus may derive maxCandModeIdx as 0 if the mode number of intra prediction mode candidate 0 is greater than the mode number of intra prediction mode candidate 1 and derive maxCandModeIdx as 1 if the mode number of intra prediction mode candidate 0 is not greater than the mode number of intra prediction mode candidate 1.

If the mode number of the first candidate intra prediction mode and the mode number of the second candidate intra prediction mode are greater than the mode number of the DC intra prediction mode, the encoding apparatus may derive intra prediction mode candidate 1 to intra prediction mode candidate 3 as follows.

$$mpm[1] = PLANAR\_IDX$$
$$mpm[2] = aboveIntraDir$$
$$maxCandModeIdx = mpm[0] > mpm[2]?0:2$$
$$\text{int } minCandModeidx = mpm[0] > mpm[2]?2:0$$
$$mpm[3] = DC\_IDX;$$

That is, intra prediction mode candidate 1 of the intra prediction mode candidate list may be derived as the planar intra prediction mode, intra prediction mode candidate 2 of the intra prediction mode candidate list may be derived as the second candidate intra prediction mode, and intra prediction mode candidate 3 of the intra prediction mode candidate list may be derived as the DC intra prediction mode. Further, the encoding apparatus may derive maxCandModeIdx as 0 if the mode number of intra prediction mode candidate 0 is greater than the mode number of intra prediction mode candidate 2 and derive maxCandModeIdx as 2 if the mode number of intra prediction mode candidate 0 is not greater than the mode number of intra prediction mode candidate 2. Further, the encoding apparatus may derive minCandModeIdx as 2 if the mode number of intra prediction mode candidate 0 is greater than the mode number of intra prediction mode candidate 2 and derive minCandModeIdx as 0 if the mode number of intra prediction mode candidate 0 is not greater than the mode number of intra prediction mode candidate 2.

If a value obtained by subtracting a mode number of mpm[minCandModeIdx] from a mode number of mpm[maxCandModeIdx] is less than 63 and greater than 1, the encoding apparatus/decoding apparatus may derive intra prediction mode candidate 4 and intra prediction mode candidate 5 as follows.

$$mpm[4] = ((mpm[maxCandModeIdx] + \text{offset}) \% \text{ mod}) + 2$$
$$mpm[5] = ((mpm[maxCandModeIdx] - 1) \% \text{ mod}) + 2$$

That is, intra prediction mode candidate 4 of the intra prediction mode candidate list may be derived as an intra prediction mode having a mode number of ((mpm[maxCandModeIdx]+offset) % mod)+2, that is, an intra prediction mode having a value, obtained by performing a modulo arithmetic operation on the sum of mpm[maxCandModeIdx] and an offset and adding 2 to the modulo arithmetic operation result, as a mode number, and intra prediction mode candidate 5 of the intra prediction mode candidate list may be derived as an intra prediction mode having a mode number of ((mpm[maxCandModeIdx]−1)% mod)+2, that is, an intra prediction mode having a value, obtained by performing a modulo arithmetic operation on a value obtained by subtracting 1 from mpm[maxCandModeIdx] and adding 2 to the modulo arithmetic operation result, as a mode number.

If the value obtained by subtracting the mode number of mpm[minCandModeIdx] from the mode number of mpm [maxCandModeIdx] is equal to or greater than 63 or equal to or less than 1, the encoding apparatus/decoding apparatus may derive intra prediction mode candidate 4 and intra prediction mode candidate 5 as follows.

$$mpm[4] = mpm[\text{max}CandModeIdx] + \text{offset} - 1) \% \text{ mod}) + 2$$

$$mpm[5] = ((mpm[\text{max}CandModeIdx]) \% \text{ mod}) + 2$$

That is, intra prediction mode candidate 4 of the intra prediction mode candidate list may be derived as an intra prediction mode having a mode number of ((mpm[maxCandModeIdx]+offset−1) % mod)+2, that is, an intra prediction mode having a value, obtained by performing a modulo arithmetic operation on the sum of mpm[maxCandModeIdx] and (offset−1) and adding 2 to the modulo arithmetic operation result, as a mode number, and intra prediction mode candidate 5 of the intra prediction mode candidate list may be derived as an intra prediction mode having a mode number of ((mpm[maxCandModeIdx]) % mod)+2, that is, an intra prediction mode having a value, obtained by performing a modulo arithmetic operation on mpm[maxCandModeIdx] and adding 2 to the modulo arithmetic operation result, as a mode number.

If at least one of the mode number of the first candidate intra prediction mode and the mode number of the second candidate intra prediction mode is not greater than the mode number of the DC intra prediction mode, the encoding apparatus may determine whether the sum of the mode number of the first candidate intra prediction mode and the mode number of the second candidate intra prediction mode is equal to or greater than 2. If the sum of the mode number of the first candidate intra prediction mode and the mode number of the second candidate intra prediction mode is equal to or greater than 2, the encoding apparatus may determine whether at least one of the first candidate intra prediction mode and the second candidate intra prediction mode is the planar intra prediction mode.

If at least one of the first candidate intra prediction mode and the second candidate intra prediction mode is the planar intra prediction mode, the encoding apparatus may derive intra prediction mode candidate 0 and intra prediction mode candidate 1 as follows.

$$mpm[0] = \text{PLANAR\_IDX}$$

$$mpm[1] = (leftIntraDir < aboveIntraDir)?aboveIntraDir:leftIntraDir$$

$$\text{max}CandModeIdx = 1$$

That is, intra prediction mode candidate 0 of the intra prediction mode candidate list may be derived as the planar intra prediction mode, intra prediction mode candidate 1 of the intra prediction mode candidate list may be derived as the second candidate intra prediction mode if the mode number of the first candidate intra prediction mode is less than the mode number of the second candidate intra prediction mode and derived as the first candidate intra prediction mode if the mode number of the first candidate intra prediction mode is equal to or greater than the mode number of the second candidate intra prediction mode. Further, the encoding apparatus may derive maxCandModeIdx as 1.

If the first candidate intra prediction mode and the second candidate intra prediction mode are not the planar intra prediction mode, the encoding apparatus may derive intra prediction mode candidate 2 to intra prediction mode candidate 5 as follows.

$$mpm[2] =$$

$$(mpm[!\text{max}CandModeIdx] == \text{PLANAR\_IDX})?\text{DC\_IDX}:\text{PLANAR\_IDX}$$

$$mpm[3] = ((mpm[\text{max}CandModeIdx] + \text{offset}) \% \text{ mod}) + 2$$

$$mpm[4] = ((mpm[\text{max}CandModeIdx] - 1) \% \text{ mod}) + 2$$

$$mpm[5] = mpm[\text{max}CandModeIdx] + \text{offset} - 1) \% \text{ mod}) + 2$$

That is, intra prediction mode candidate 2 of the intra prediction mode candidate list may be derived as the DC intra prediction mode if mpm[!maxCandModeIdx] is the planar intra prediction mode and may be derived as the planar intra prediction mode if mpm[!maxCandModeIdx] is not the planar intra prediction mode. In addition, intra prediction mode candidate 3 of the intra prediction mode candidate list may be derived as an intra prediction mode having a mode number of ((mpm[maxCandModeIdx]+offset) % mod)+2, that is, an intra prediction mode having a value, obtained by performing a modulo arithmetic operation on the sum of mpm[maxCandModeIdx] and an offset and adding 2 to the modulo arithmetic operation result, as a mode number, intra prediction mode candidate 4 of the intra prediction mode candidate list may be derived as an intra prediction mode having a mode number of ((mpm[maxCandModeIdx]−1) % mod)+2, that is, an intra prediction mode having a value, obtained by performing a modulo arithmetic operation on a value obtained by subtracting 1 from mpm [maxCandModeIdx] and adding 2 to the modulo arithmetic operation result, as a mode number, and intra prediction mode candidate 5 of the intra prediction mode candidate list may be derived as an intra prediction mode having a mode number of ((mpm[maxCandModeIdx]+offset−1) % mod)+2, that is, an intra prediction mode having a value, obtained by performing a modulo arithmetic operation on the sum of mpm[maxCandModeIdx] and (offset −1) and adding 2 to the modulo arithmetic operation result, as a mode number.

If the aforementioned conditions are not satisfied, the encoding apparatus may derive intra prediction mode candidate 0 to intra prediction mode candidate 5 as follows.

$$mpm[0] = leftIntaDir$$

$$mpm[1] = (mpm[0] == \text{PLANAR\_IDX})?\text{DC\_IDX}:\text{PLANAR\_IDX}$$

$$mpm[2] = \text{VER\_IDX}$$

$$mpm[3] = \text{HOR\_IDX}$$

mpm[4] = VER_IDX − 4 mpm[5] = VER_IDX + 4

That is, intra prediction mode candidate 0 of the intra prediction mode candidate list may be derived as the first candidate intra prediction mode, intra prediction mode candidate 1 of the intra prediction mode candidate list may be derived as the DC intra prediction mode if intra prediction mode candidate 0 is the planar intra prediction mode and derived as planar intra prediction mode if intra prediction mode candidate 0 is not the planar intra prediction mode, intra prediction mode candidate 2 of the intra prediction mode candidate list may be derived as a vertical intra prediction mode, intra prediction mode candidate 3 of the intra prediction mode candidate list may be derived as a horizontal intra prediction mode, intra prediction mode candidate 4 of the intra prediction mode candidate list may be derived as an intra prediction mode corresponding to a mode number obtained by subtracting 4 from the mode number of the vertical intra prediction mode, that is, intra prediction mode #46, and intra prediction mode candidate 5 of the intra prediction mode candidate list may be derived as an intra prediction mode corresponding to a mode number obtained by adding 4 to the mode number of the vertical intra prediction mode, that is, intra prediction mode #54.

For example, the encoding apparatus may perform the intra prediction mode candidate list construction process shown in FIG. 29 to construct the intra prediction mode candidate list for the current block.

For example, the encoding apparatus may construct the intra prediction mode candidate list based on the first candidate intra prediction mode and the second candidate intra prediction mode. The encoding apparatus may construct the inter-prediction mode candidate list based on whether the first candidate intra prediction mode is identical to the second candidate intra prediction mode and/or whether the mode number of the first candidate intra prediction mode and/or the mode number of the second candidate intra prediction mode are greater than the mode number of the DC intra prediction mode. Here, the first candidate intra prediction mode may be derived based on the intra prediction mode of the left neighboring block of the current block and the second candidate intra prediction mode may be derived based on the intra prediction mode of the top neighboring block of the current block. For example, the intra prediction mode of the left neighboring block of the current block may be derived as the first candidate intra prediction mode and the intra prediction mode of the top neighboring block of the current block may be derived as the second candidate intra prediction mode.

Specifically, when the first candidate intra prediction mode is identical to the second candidate intra prediction mode, for example, the encoding apparatus may determine whether the mode number of the first candidate intra prediction mode is greater than the mode number of the DC intra prediction mode, and if the mode number of the first candidate intra prediction mode is greater than the mode number of the DC intra prediction mode, derive the intra prediction mode candidate list for the current block which includes intra prediction mode candidates as follows.

mpm[0] = g_intraMode65to33AngMapping[leftIntraDir]

mpm[1] = ((g_intraMode65to33AngMapping[leftIntraDir] + offset) % mod + 2 mpm[2] = ((g_intraMode65to33AngMapping[leftIntraDir] − 1) % mod) + 2

That is, intra prediction mode candidate 0 of the intra prediction mode candidate list may be derived as the first candidate intra prediction mode. In addition, intra prediction mode candidate 1 of the intra prediction mode candidate list may be derived as an intra prediction mode having a mode number of ((g_intraMode65to33AngMapping[leftIntraDir]+ offset) % mod)+2, that is, an intra prediction mode having a value, obtained by performing a modulo arithmetic operation on the sum of the mode number of the first candidate intra prediction mode and an offset and adding 2 to the modulo arithmetic operation result, as a mode number, and intra prediction mode candidate 2 of the intra prediction mode candidate list may be derived as an intra prediction mode having a mode number of ((g_intraMode65to33AngMapping[leftIntraDir]−1) % mod)+2, that is, an intra prediction mode having a value, obtained by performing a modulo arithmetic operation on a value obtained by subtracting 1 from the mode number of the first candidate intra prediction mode and adding 2 to the modulo arithmetic operation result, as a mode number.

If the mode number of the first candidate intra prediction mode is not greater than the mode number of the DC intra prediction mode, the encoding apparatus may derive the intra prediction mode candidate list for the current block which includes intra prediction mode candidates as follows.

mpm[0] = g_intraMode65to33AngMapping[PLANAR_IDX]

mpm[1] = g_intraMode65to33AngMapping[DC_IDX]

mpm[2] = g_intraMode65to33AngMapping[VER_IDX]

That is, intra prediction mode candidate 0 of the intra prediction mode candidate list may be derived as the planar intra prediction mode, intra prediction mode candidate 1 of the intra prediction mode candidate list may be derived as the DC intra prediction mode, and intra prediction mode candidate 2 of the intra prediction mode candidate list may be derived as a vertical intra prediction mode.

Further, if the first candidate intra prediction mode is not identical to the second candidate intra prediction mode, the encoding apparatus may derive intra prediction mode candidate 0 and intra prediction mode candidate 1.

mpm[0] = g_intraMode65to33AngMapping[leftIntraDir]

mpm[1] = g_intraMode65to33AngMapping[aboveIntraDir]

That is, intra prediction mode candidate 0 of the intra prediction mode candidate list may be derived as the first candidate intra prediction mode, and intra prediction mode candidate 1 of the intra prediction mode candidate list may be derived as the second candidate intra prediction mode.

Then, if both the first candidate intra prediction mode and the second candidate intra prediction mode are the planar intra prediction mode, the encoding apparatus may derive intra prediction mode candidate 2 as follows.

$$mpm[2] = g\_intraMode65to33AngMapping[PLANAR\_IDX]$$

That is, intra prediction mode candidate 2 of the intra prediction mode candidate list may be derived as the planar intra prediction mode.

Otherwise, if at least one of the first candidate intra prediction mode and the second candidate intra prediction mode is the planar intra prediction mode, the encoding apparatus may derive intra prediction mode candidate 2 as follows.

$$mpm[2] = $$
$$g\_intraMode65to33AngMapping[(leftIntraDir + aboveIntraDir) < 2?VER\_IDX:DC\_IDX]$$

That is, intra prediction mode candidate 2 of the intra prediction mode candidate list may be derived as a vertical intra prediction mode if the sum of the mode number of the first candidate intra prediction mode and the mode number of the second candidate intra prediction mode is less than 2 and derived as the DC intra prediction mode if the sum of the mode number of the first candidate intra prediction mode and the mode number of the second candidate intra prediction mode is equal to or greater than 2.

For example, the encoding apparatus may construct the intra prediction mode candidate list of the current block based on intra prediction modes of neighboring blocks of the current block as shown in FIG. 30. Meanwhile, the intra prediction mode candidate list may mean the above-described most probable mode (MPM) list.

For example, the encoding apparatus may construct the intra prediction mode candidate list based on an intra prediction mode of a left neighboring block of the current block and an intra prediction mode of a top neighboring block of the current block. The encoding apparatus may determine whether the intra prediction mode of the left neighboring block and the intra prediction mode of the top neighboring block of the current block are the same and a mode number of the intra prediction mode of the left neighboring block is greater than a mode number of a DC intra prediction mode. The encoding apparatus may construct the intra prediction mode candidate list based on whether the intra prediction mode of the left neighboring block and the intra prediction mode of the top neighboring block of the current block are the same and/or the mode number of the intra prediction mode of the left neighboring block is greater than the mode number of the DC intra prediction mode.

When the intra prediction mode of the left neighboring block and the intra prediction mode of the top neighboring block of the current block are the same and the mode number of the intra prediction mode of the left neighboring block is greater than the mode number of the DC intra prediction mode, the encoding apparatus may derive the intra prediction mode candidate list of the current block including intra prediction mode candidates as described below.

$$mpm[0] = INTRA\_PLANAR$$
$$mpm[1] = candIntraPredModeA$$
$$mpm[2] = 2 + ((candIntraPredModeA + 61) \% 64)$$
$$mpm[3] = 2 + ((candIntraPredModeA - 1) \% 64)$$
$$mpm[4] = INTRA\_DC$$
$$mpm[5] = 2 + ((candIntraPredModeA + 60) \% 64)$$

That is, intra prediction mode candidate 0 of the intra prediction mode candidate list may be derived as the planar intra prediction mode, intra prediction mode candidate 1 of the intra prediction mode candidate list may be derived as the intra prediction mode of the left neighboring block, intra prediction mode candidate 2 of the intra prediction mode candidate list may be derived as an intra prediction mode having a mode number of 2+((candIntraPredModeA+61) % 64), that is, an intra prediction mode having a value, obtained by performing a modulo arithmetic operation with 64 on a value obtained by adding 61 from the mode number of the intra prediction mode of the left neighboring block and adding 2 to the modulo arithmetic operation result, as a mode number, intra prediction mode candidate 3 of the intra prediction mode candidate list may be derived as an intra prediction mode having a mode number of 2+((candIntraPredModeA−1) % 64), that is, an intra prediction mode having a value, obtained by performing a modulo arithmetic operation with 64 on a value obtained by subtracting 1 from the mode number of the intra prediction mode of the left neighboring block and adding 2 to the modulo arithmetic operation result, as a mode number, intra prediction mode candidate 4 of the intra prediction mode candidate list may be derived as the DC intra prediction mode, and intra prediction mode candidate 5 of the intra prediction mode candidate list may be derived as an intra prediction mode having a mode number of 2+((candIntraPredModeA+60) % 64), that is, an intra prediction mode having a value, obtained by performing a modulo arithmetic operation with 64 on a value obtained by adding 60 from the mode number of the intra prediction mode of the left neighboring block and adding 2 to the modulo arithmetic operation result, as a mode number. That is, for example, when the intra prediction mode of the left neighboring block and the intra prediction mode of the top neighboring block are the same and the mode number of the intra prediction mode of the left neighboring block is greater than the mode number of the DC intra prediction mode, the intra prediction mode candidate list may include the intra prediction mode of the left neighboring block, the intra prediction mode of the top neighboring block, an intra prediction mode with mode number 2+((candIntraPredModeA+61)% 64), an intra prediction mode with mode number 2+((candIntraPredModeA−1)% 64), and an intra prediction mode with mode number 2+((candIntraPredModeA+60)% 64) as intra prediction mode candidates. Here, candIntraPredModeA may represent the mode number of the intra prediction mode of the left neighboring block of the current block.

Meanwhile, when the intra prediction mode of the left neighboring block and the intra prediction mode of the top neighboring block of the current block are not the same, for example, the encoding apparatus may determine whether at least one of a mode number of an intra prediction mode of the left neighboring block and a mode number of an intra prediction mode of the top neighboring block is greater than a mode number of the DC intra prediction mode. When at least one of the mode number of the intra prediction mode of the left neighboring block and the mode number of the intra prediction mode of the top neighboring block is greater than the mode number of the DC intra prediction mode, a variable minAB and a variable maxAB may be derived as follows.

$$minAB = \text{Min}(candIntraPredModeA, candIntraPredModeB)$$

$$maxAB = \text{Max}(candIntraPredModeA, candIntraPredModeB)$$

Here, candIntraPredModeA may represent the mode number of the intra prediction mode of the left neighboring block of the current block, and candIntraPredModeB may represent the mode number of the intra prediction mode of the top neighboring block of the current block. That is, minAB may represent a smaller value among the mode number of the intra prediction mode of the left neighboring block and the mode number of the intra prediction mode of the top neighboring block, maxAB may represent a larger value among the mode number of the intra prediction mode of the left neighboring block and the mode number of the intra prediction mode of the top neighboring block.

Also, when the intra prediction mode of the left neighboring block and the intra prediction mode of the top neighboring block of the current block are not the same, the encoding apparatus may determine whether the mode number of an intra prediction mode of the left neighboring block is greater than the mode number of the DC intra prediction mode and the mode number of the intra prediction mode of the top neighboring block is greater than the mode number of the DC intra prediction mode.

For example, when the mode number of an intra prediction mode of the left neighboring block is greater than the mode number of the DC intra prediction mode and the mode number of the intra prediction mode of the top neighboring block is greater than the mode number of the DC intra prediction mode, the encoding apparatus may derive intra prediction mode candidate 0 to intra prediction mode candidate 3 as described below.

$$mpm[0] = \text{INTRA\_PLANAR}$$

$$mpm[1] = candIntraPredModeA$$

$$mpm[2] = candIntraPredModeB$$

$$mpm[3] = \text{INTRA\_DC}$$

That is, intra prediction mode candidate 0 of the intra prediction mode candidate list may be derived as the planar intra prediction mode, intra prediction mode candidate 1 of the intra prediction mode candidate list may be derived as the intra prediction mode of the left neighboring block, intra prediction mode candidate 2 of the intra prediction mode candidate list may be derived as the intra prediction mode of the top neighboring block, and intra prediction mode candidate 3 of the intra prediction mode candidate list may be derived as the DC intra prediction mode. Here, candIntraPredModeB may represent the mode number of the intra prediction mode of the top neighboring block of the current block. That is, for example, when the intra prediction mode of the left neighboring block and the intra prediction mode of the top neighboring block are not the same, and the mode number of the intra prediction mode of the left neighboring block and the mode number of the intra prediction mode of the top neighboring block are greater than the mode number of the DC intra prediction mode, the intra prediction mode candidate list may include the intra prediction mode of the left neighboring block and the intra prediction mode of the top neighboring block as intra prediction mode candidates.

Thereafter, remaining intra prediction mode candidates (intra prediction mode candidate 4 and intra prediction mode candidate 5) may be derived based on the maxAB and the minAB. Specifically, the remaining intra prediction mode candidates are derived based on a difference between a larger value and a smaller value among the mode number of the intra prediction mode of the left neighboring block and the mode number of the intra prediction mode of the top neighboring block.

For example, when a value obtained by subtracting the minAB from the maxAB is less than 63 and greater than 1 (that is, when the value obtained by subtracting the minAB from the maxAB is one of 2 to 62), the encoding apparatus may derive intra prediction mode candidate 4 and intra prediction mode candidate 5 as described below.

$$mpm[4] = 2 + ((maxAB + 61) \% 64)$$

$$mpm[5] = 2 + ((maxAB - 1) \% 64)$$

That is, intra prediction mode candidate 4 of the intra prediction mode candidate list may be derived as an intra prediction mode with mode number 2+((maxAB+61) % 64), that is, an intra prediction mode having a value, obtained by performing a modulo arithmetic operation with 64 on a value obtained by adding 61 from the maxAB and adding 2 to the modulo arithmetic operation result, as a mode number, and intra prediction mode candidate 5 of the intra prediction mode candidate list may be derived as an intra prediction mode with mode number 2+((maxAB−1) % 64), that is, an intra prediction mode having a value, obtained by performing a modulo arithmetic operation with 64 on a value obtained by subtracting 1 from the maxAB and adding 2 to the modulo arithmetic operation result, as a mode number. Here, maxAB may represent a larger value among the mode number of the intra prediction mode of the left neighboring block and the mode number of the intra prediction mode of the top neighboring block.

Alternatively, when a value obtained by subtracting the minAB from the maxAB is equal to or greater than 63 or equal to or less than 1, the encoding apparatus may derive intra prediction mode candidate 4 and intra prediction mode candidate 5 as described below.

$$mpm[4] = 2 + (maxAB + 60) \% 64)$$

$$mpm[5] = 2 + (maxAB \% 64)$$

That is, intra prediction mode candidate 4 of the intra prediction mode candidate list may be derived as an intra prediction mode with mode number 2+((maxAB+60) % 64), that is, an intra prediction mode having a value, obtained by performing a modulo arithmetic operation with 64 on a value obtained by adding 60 from the maxAB and adding 2 to the modulo arithmetic operation result, as a mode number, and intra prediction mode candidate 5 of the intra prediction mode candidate list may be derived as an intra prediction mode with mode number 2+(maxAB % 64), that is, an intra prediction mode having a value, obtained by performing a modulo arithmetic operation with 64 on the maxAB and adding 2 to the modulo arithmetic operation result, as a mode number. Here, maxAB may represent a larger value among the mode number of the intra prediction mode of the left neighboring block and the mode number of the intra prediction mode of the top neighboring block.

Meanwhile, when the intra prediction mode of the left neighboring block and the intra prediction mode of the top neighboring block of the current block are not the same, or at least one of mode numbers of the intra prediction mode of the left neighboring block and the intra prediction mode of the top neighboring block is smaller than the mode number of the DC intra prediction mode, the encoding apparatus may determine whether the sum of the mode number of the intra prediction mode of the left neighboring block and the mode number of the intra prediction mode of the top neighboring block is equal to or greater than the mode number of the DC intra prediction mode.

For example, when the sum of the mode number of the intra prediction mode of the left neighboring block and the mode number of the intra prediction mode of the top neighboring block is equal to or greater than the mode number of the DC intra prediction mode, the encoding apparatus may derive the intra prediction mode candidate list of the current block including intra prediction mode candidates as described below.

$$mpm[0] = INTRA\_PLANAR$$

$$mpm[1] = maxAB$$

$$mpm[2] = INTRA\_DC$$

$$mpm[3] = 2 + (maxAB + 61) \% 64$$

$$mpm[4] = 2 + ((maxAB - 1) \% 64)$$

$$mpm[5] = 2 + ((maxAB + 60) \% 64)$$

That is, intra prediction mode candidate 0 of the intra prediction mode candidate list may be derived as the planar intra prediction mode, intra prediction mode candidate 1 may be derived as maxAB, that is, intra prediction mode candidate 1 may be derived as the intra prediction mode of the top neighboring block when the mode number of the intra prediction mode of the left neighboring block is smaller than the mode number of the intra prediction mode of the top neighboring block, and intra prediction mode candidate 1 may be derived as the intra prediction mode of the left neighboring block when the mode number of the intra prediction mode of the left neighboring block is greater than or equal to the mode number of the intra prediction mode of the top neighboring block, intra prediction mode candidate 2 of the intra prediction mode candidate list may be derived as the DC intra prediction mode, intra prediction mode candidate 3 of the intra prediction mode candidate list may be derived as an intra prediction mode having a mode number of 2+((maxAB+61) % 64), that is, an intra prediction mode having a value, obtained by performing a modulo arithmetic operation with 64 on a value obtained by adding 61 from the maxAB and adding 2 to the modulo arithmetic operation result, as a mode number, intra prediction mode candidate 4 of the intra prediction mode candidate list may be derived as an intra prediction mode having a mode number of 2+((maxAB−1) % 64), that is, an intra prediction mode having a value, obtained by performing a modulo arithmetic operation with 64 on a value obtained by subtracting 1 from the maxAB and adding 2 to the modulo arithmetic operation result, as a mode number, and intra prediction mode candidate 5 of the intra prediction mode candidate list may be derived as an intra prediction mode having a mode number of 2+((maxAB+60) % 64), that is, an intra prediction mode having a value, obtained by performing a modulo arithmetic operation with 64 on a value obtained by adding 60 from the maxAB and adding 2 to the modulo arithmetic operation result, as a mode number.

Or, for example, when the above conditions are not met, the encoding apparatus may derive the intra prediction mode candidate list of the current block including intra prediction mode candidates as described below.

$$mpm[0] = INTRA\_PLANAR$$

$$mpm[1] = INTRA\_DC$$

$$mpm[2] = INTRA\_ANGULAR50$$

$$mpm[3] = INTRA\_ANGULAR18$$

$$mpm[4] = INTRA\_ANGULAR46$$

$$mpm[5] = INTRA\_ANGULAR54$$

That is, intra prediction mode candidate 0 of the intra prediction mode candidate list may be derived as the planar intra prediction mode, intra prediction mode candidate 1 of the intra prediction mode candidate list may be derived as the DC intra prediction mode, intra prediction mode candidate 2 of the intra prediction mode candidate list may be derived as the vertical intra prediction mode (i.e., intra prediction mode #50), intra prediction mode candidate 3 of the intra prediction mode candidate list may be derived as the horizontal intra prediction mode (i.e., intra prediction mode #18), intra prediction mode candidate 4 of the intra prediction mode candidate list may be derived as an intra prediction mode of the mode number obtained by subtracting 4 from the mode number of the vertical intra prediction mode, that is, the intra prediction mode #46, intra prediction mode candidate 5 of the intra prediction mode candidate list may be derived as an intra prediction mode of the mode number obtained by adding 4 from the mode number of the vertical intra prediction mode, that is, the intra prediction mode #54. That is, for example, when the above conditions are not met, the intra prediction mode candidate list may include the DC intra prediction mode, the intra prediction mode #50, the intra prediction mode #18, the intra prediction mode #46, and the intra prediction mode #54 as intra prediction mode candidates.

Meanwhile, for example, when the left neighboring block is not available, intra prediction is not applied to the left neighboring block, and the intra prediction mode of the left neighboring block corresponding to at least one of a case in which a value of a CIIP flag of the top neighboring block is not 1 and a case in which the value of a pcm flag of the left neighboring block is 1 may be derived as the planar intra prediction mode. Also, when the top neighboring block is not available, intra prediction is not applied to the top neighboring block, and the intra prediction mode of the left neighboring block corresponding to at least one of a case in which a value of a CIIP flag of the top neighboring block is not 1, a case in which a value of a pcm flag of the top neighboring block is 1 and a case in which the top neighboring block is not included in the current CTU may be derived as the planar intra prediction mode.

Meanwhile, the intra prediction mode candidate list generated when the intra prediction type is the first intra prediction type, the intra prediction mode candidate list generated when the intra prediction type is the second intra prediction type, and the intra prediction mode candidate list generated when the intra prediction type is the third intra prediction type may be identical. That is, the same intra prediction mode candidate list may be constructed irrespective of the intra prediction type for the current block. An intra prediction mode candidate list may be constructed through the same intra prediction mode construction process irrespective of the intra prediction type for the current block. The intra prediction mode construction process may be the same as one of the above-described embodiments.

For example, the encoding apparatus may derive an intra prediction mode of the current block based on the intra prediction mode candidate list. The encoding apparatus may derive an intra prediction mode having optimal RD cost as the intra prediction mode for the current block by executing various intra prediction modes. For example, the encoding apparatus may derive an intra prediction mode having optimal RD cost from among intra prediction mode candidates in the intra prediction mode candidate list as the intra prediction mode for the current block. The intra prediction mode may be one of two non-directional intra prediction modes and 65 directional intra prediction modes. The two non-directional intra prediction modes may include the DC intra prediction mode and the planar intra prediction mode, as described above.

For example, the intra prediction mode of the current block may be selected as one of the intra prediction modes other than the planar intra prediction mode and the DC intra prediction mode when the intra prediction type for the current block is derived as the second intra prediction type and selected as one of the intra prediction modes other than the DC intra prediction mode when the intra prediction type for the current block is derived as the third intra prediction type.

For example, the intra prediction mode of the current block may be selected as one of the intra prediction modes other than the planar intra prediction mode when the intra prediction type for the current block is derived as the second intra prediction type and selected as one of the intra prediction modes other than the DC intra prediction mode when the intra prediction type for the current block is derived as the third intra prediction type.

For example, the intra prediction mode of the current block may be selected as one of the intra prediction modes other than the planar intra prediction mode when the intra prediction type for the current block is derived as the second intra prediction type.

The encoding apparatus may generate an MPM flag indicating whether the determined intra prediction mode is included in the intra prediction mode candidates of the intra prediction mode candidate list. The MPM flag may also be referred to as an intra prediction mode candidate flag. If the determined intra prediction mode is included in the intra prediction mode candidates of the intra prediction mode candidate list, the encoding apparatus may generate an MPM index indicating the determined intra prediction mode from among the intra prediction mode candidates. The MPM index may also be referred to as an intra prediction mode candidate index. If the determined intra prediction mode is not included in the intra prediction mode candidates of the intra prediction mode candidate list, the encoding apparatus may generate remaining intra prediction mode information indicating the determined intra prediction mode from among the remaining intra prediction modes that are not included in the intra prediction mode candidates. Further, if the determined intra prediction mode is included in the intra prediction mode candidates of the intra prediction mode candidate list, the encoding apparatus may not signal the MPM flag and the value of the MPM flag may be derived as 1. Prediction related information for the current block may include the MPM flag, the MPM index, and/or the remaining intra prediction mode information.

For example, the encoding apparatus may derive a prediction sample of the current block based on the intra prediction type and the intra prediction mode.

For example, when the intra prediction type is derived as the first intra prediction type, the encoding apparatus may derive at least one reference sample from among reference samples in intra-prediction reference lines adjacent to the current block based on the intra prediction mode and generate prediction samples of the current block based on the reference sample. The reference samples may include a top-left reference sample, upper reference samples, and left reference samples of the current block. For example, when the size of the current block is W×H, x component of the top-left sample position of the current block is xN, and y component thereof is yN, the left reference samples may be p[xN−1][yN] to p[xN−1] [2H+yN−1], the top-left reference sample may be p[xN−1] [yN−1], and the upper reference samples may be p[xN][yN−1] to p[2W+xN−1][yN−1].

For example, when the intra prediction type is derived as the second intra prediction type, the encoding apparatus may derive at least one reference sample from among reference samples in intra-prediction reference lines that are not adjacent to the current block based on the intra prediction mode and generate prediction samples of the current block based on the reference sample. Here, the intra-prediction reference lines may be reference lines separated from the upper boundary and/or the left boundary of the current block by 1, 2 or 3 sample distances.

For example, when the intra prediction type is derived as the third intra prediction type, the encoding apparatus may determine an ISP split type of the current block and partition the current block according to the ISP split type to derive sub-blocks. The split type may be a horizontal split type or a vertical split type. For example, when the size of the current block is 4×4, the current block may not be partitioned. For example, when the size of the current block is 4×8 and the split type is the horizontal split type, the current block may be partitioned into two 4×4 sub-blocks. For example, when the size of the current block is 4×8 and the split type is the vertical split type, the current block may be partitioned into two 2×8 sub-blocks. For example, when the size of the current block is 8×4 and the split type is the horizontal split type, the current block may be partitioned into two 8×2 sub-blocks. For example, when the size of the current block is 8×4 and the split type is the vertical split type, the current block may be partitioned into two 4×4 sub-blocks. For example, when the size of the current block is W×H (sizes other than 4×8, 8×4, and 4×4) and the split type is the horizontal split type, the current block may be partitioned into four W×H/4 sub-blocks. For example, when the size of the current block is W×H and the split type is the vertical split type, the current block may be partitioned into four W/4×H sub-blocks. Thereafter, the encoding apparatus may perform intra-prediction on the sub-blocks to generate prediction samples. That is, the encoding apparatus may derive at least one of reference samples in intra-prediction reference lines of each sub-block of the current block based on the intra prediction mode and generate the prediction samples based on the reference sample. The intra-prediction reference lines of each sub-block may be reference lines adjacent to each sub-block. Meanwhile, the encoding apparatus may generate and encode an ISP split flag indicating the ISP split type. The aforementioned prediction related information may include the ISP split flag.

For example, when the intra prediction mode of the current block is derived as the DC intra prediction mode, the current block is a square block, a size of the current block is W×H, an x component and y component of a top left position of the current block are 0, the DC value may be derived based on a reference sample of (0, −refIdx−1) coordinates to a reference sample of (W−1, −refIdx−1) coordinates in a top intra prediction reference line indicated by a reference line index of the current block and a reference sample of (−refIdx−1, 0) coordinates to a reference sample of (−refIdx−1, H−1) coordinates in a left intra prediction reference line indicated by the reference line index. A prediction sample of the current block may be derived as the DC value.

For example, when the intra prediction mode of the current block is derived as the DC intra prediction mode, the current block is a non-square block whose width is greater than its height, a size of the current block is W×H, an x component and y component of a top left position of the current block are 0, the DC value may be derived based on a reference sample of (0, −refIdx−1) coordinates to a reference sample of (W−1, −refIdx−1) coordinates in a top intra prediction reference line indicated by a reference line index of the current block. A prediction sample of the current block may be derived as the DC value.

For example, when the intra prediction mode of the current block is derived as the DC intra prediction mode, the current block is a non-square block whose height is greater than its width, a size of the current block is W×H, an x component and y component of a top left position of the current block are 0, the DC value may be derived based a reference sample of (−refIdx−1, 0) coordinates to a reference sample of (−refIdx−1, H−1) coordinates in a left intra prediction reference line indicated by a reference line index of the current block. A prediction sample of the current block may be derived as the DC value.

For example, when the intra prediction mode of the current block is derived as the planar intra prediction mode, a size of the current block is W×H, an x component and y component of a top left position of the current block are 0, the prediction sample may be derived based on a reference sample of (W−1, −refIdx−1) coordinates and a reference sample of (−refIdx−1, H−1) coordinates in an intra prediction reference line indicated by a reference line index of the current block.

Also, for example, the encoding apparatus may derive a residual sample of the current block based on the prediction sample. The encoding apparatus may derive the residual sample from a difference between an original sample and the prediction sample. Then, for example, the encoding apparatus may generate a reconstructed sample of the current block based on the prediction sample and the residual sample. Thereafter, the encoding apparatus may apply an in-loop filtering procedure such as deblocking filtering and/or SAO procedure to the reconstructed sample (i.e., reconstructed picture) to improve subjective/objective picture quality as necessary, as described above.

The encoding apparatus generates prediction related information for the current block (S2110). The encoding apparatus may generate the prediction related information for the current block.

For example, the prediction related information may include a reference line index of the current block. The reference line index may indicate an intra prediction reference line of the current block. For example, when a value of the reference line index is 0, the reference line index may indicate a reference line adjacent to an upper boundary and/or a left boundary of the current block, when the value of the reference line index is 1, the reference line index may indicate a reference line separated by one sample distance from the upper boundary and/or the left boundary of the current block, when the value of the reference line index is 2, the reference line index may indicate a reference line separated by 2 sample distances from the upper boundary and/or the left boundary of the current block, when the value of the reference line index is 3, the reference line index may indicate a reference line separated by 3 sample distances from the upper boundary and/or the left boundary of the current block.

Also, for example, when the reference line index indicates a reference line adjacent to the current block, that is, when the value of the reference line index is 0, the prediction related information may include an Intra Sub-Partitions mode (ISP) flag. The ISP flag may represent whether a third intra prediction type to which the ISP is applied is applied to the current block. That is, the ISP flag may represent whether the ISP is applied to the current block. For example, when a value of the IPS flag is 1, the ISP flag may represent that the third intra prediction type is applied to the current block, when the value of the IPS flag is 0, the ISP flag may represent that the third intra prediction type is not applied to the current block. Also, for example, when the value of the ISP flag is 1, the prediction related information may include an ISP split flag representing an ISP split type.

Also, for example, the prediction related information may include a most probable mode (MPM) flag. Alternatively, for example, the prediction related information may not include the MPM flag, and in this case, the encoding apparatus may derive a value of the MPM flag as 1. The MPM flag may represent whether the intra prediction mode of the current block is one of intra prediction mode candidates of the intra prediction mode candidate list. The MPM flag may be referred to as an intra prediction mode candidate flag.

Also, for example, when the value of the MPM flag is 1, the prediction related information may include an MPM index. The MPM index may indicate one of intra prediction mode candidates in the intra prediction mode candidate list. The MPM index may be signaled in the form of an mpm_idx or intra_luma_mpm_idx syntax element. The MPM index may be referred to as an intra prediction mode candidate index.

Also, for example, when the value of the MPM flag is 0, the prediction related information may include remaining intra prediction mode information. The remaining intra prediction mode information may indicate one of remaining intra prediction modes other than intra prediction mode candidates in the intra prediction mode candidate list. The remaining intra prediction mode information may be signaled in the form of a rem_intra_luma_pred_mode or intra_luma_mpm_remainder syntax element.

The encoding apparatus encodes image information including the prediction related information (S2120). The encoding apparatus may encode the image information including the prediction related information, and may output the image information in the form of a bitstream. The prediction related information may include the reference line index, the ISP flag and/or the ISP index. Also, the prediction related information may include the MPM flag, the MPM index and/or the remaining intra prediction mode information. In addition, although not illustrated, the encoding apparatus may generate residual information for the current block based on the residual sample, and may encode image information including the residual information, and may output the image information in the form of a bitstream. Meanwhile, the bitstream may be transmitted to the decoding apparatus through a network or a (digital) storage medium. Here, the network may include a broadcast network and/or a communication network, and the digital storage medium may include various storage media such as a USB, an SD, a CD, a DVD, Blue-ray, an HDD, and an SSD.

Figure 22:
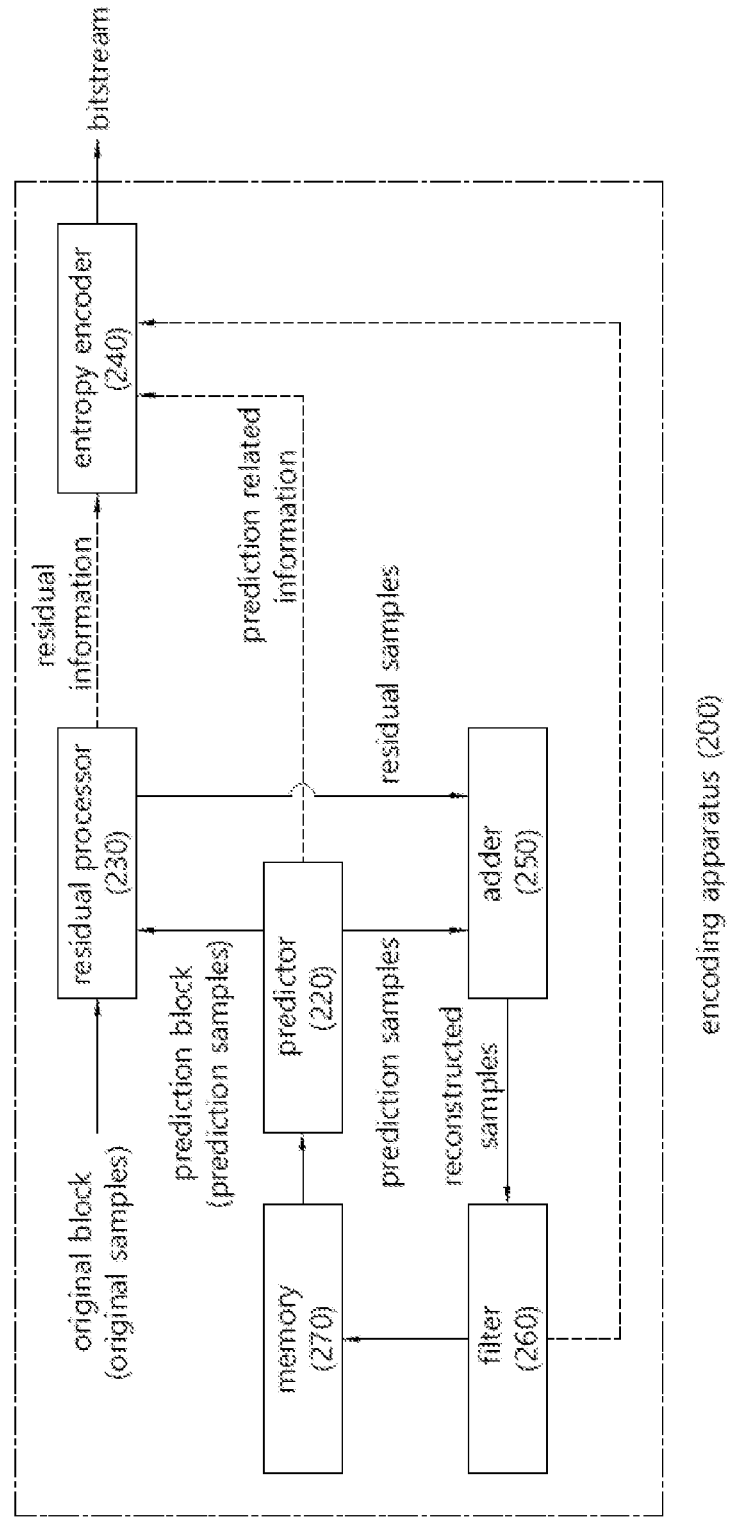
FIG. 22 schematically illustrates an encoding apparatus that performs the image encoding method according to the present disclosure.

FIG. 22 schematically illustrates an encoding apparatus performing the image encoding method according to the present disclosure. The method disclosed in FIG. 21 may be performed by the encoding apparatus disclosed in FIG. 22. Specifically, a predictor of the encoding apparatus of FIG. 22 may perform S2100 of FIG. 21 and an entropy encoder of the encoding apparatus of FIG. 22 may perform S2110 to S2120 of FIG. 21. Although not illustrated, a process of deriving a residual sample for the current block based on the original sample and prediction samples for the current block may be performed by a subtractor of the encoding apparatus of FIG. 20, a process of generating residual information about the current block based on the residual sample may be performed by a residual processor of the encoding apparatus of FIG. 20, and a process of encoding image information including the residual information may be performed by an entropy encoder of the encoding apparatus of FIG. 20.

Figure 23:
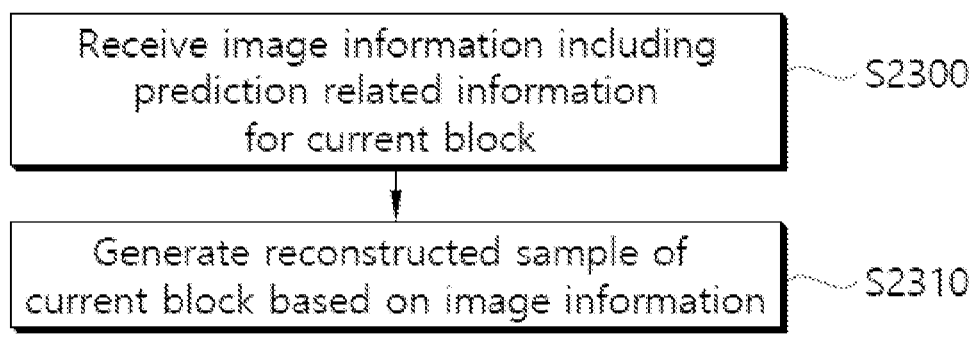
FIG. 23 schematically illustrates an image decoding method performed by a decoding apparatus according to the present disclosure.

FIG. 23 schematically illustrates an image decoding method performed by a decoding apparatus according to the present disclosure. The method disclosed in FIG. 23 may be performed by the decoding apparatus disclosed in FIG. 3. Specifically, S2300 of FIG. 23 may be performed by the entropy decoder of the decoding apparatus, and S2310 of FIG. 23 may be performed by the predictor of the decoding apparatus. In addition, although not illustrated, a process of obtaining image information including residual information for the current block through a bitstream may be performed by the entropy decoder of the decoding apparatus, and a process of deriving a residual sample for the current block based on the residual information may be performed by the inverse transformer of the decoding apparatus.

The decoding apparatus receives image information including prediction related information for a current block (S2300). For example, the decoding apparatus may receive and parce the image information including prediction related information and/or residual information for the current block through a bitstream. For example, the prediction related information may be as shown in FIG. 26 above.

For example, the prediction related information may include a reference line index of the current block. The reference line index may indicate an intra prediction reference line of the current block. For example, when a value of the reference line index is 0, the reference line index may indicate a reference line adjacent to an upper boundary and/or a left boundary of the current block, when the value of the reference line index is 1, the reference line index may indicate a reference line separated by one sample distance from the upper boundary and/or the left boundary of the current block, when the value of the reference line index is 2, the reference line index may indicate a reference line separated by 2 sample distances from the upper boundary and/or the left boundary of the current block, when the value of the reference line index is 3, the reference line index may indicate a reference line separated by 3 sample distances from the upper boundary and/or the left boundary of the current block.

Also, for example, when the reference line index indicates a reference line adjacent to the current block, that is, when the value of the reference line index is 0, the prediction related information may include an Intra Sub-Partitions mode (ISP) flag. The ISP flag may represent whether a third intra prediction type to which the ISP is applied is applied to the current block. That is, the ISP flag may represent whether the ISP is applied to the current block. For example, when a value of the IPS flag is 1, the ISP flag may represent that the third intra prediction type is applied to the current block, when the value of the IPS flag is 0, the ISP flag may represent that the third intra prediction type is not applied to the current block. Also, for example, when the value of the ISP flag is 1, the prediction related information may include an ISP split flag representing an ISP split type.

Also, for example, the prediction related information may include a most probable mode (MPM) flag. Alternatively, for example, the prediction related information may not include the MPM flag, and in this case, the decoding apparatus may derive a value of the MPM flag as 1. The MPM flag may represent whether the intra prediction mode of the current block is one of intra prediction mode candidates of the intra prediction mode candidate list. The MPM flag may be referred to as an intra prediction mode candidate flag.

Also, for example, when the value of the MPM flag is 1, the prediction related information may include an MPM index. The MPM index may indicate one of intra prediction mode candidates in the intra prediction mode candidate list. The MPM index may be signaled in the form of an mpm_idx or intra_luma_mpm_idx syntax element. The MPM index may be referred to as an intra prediction mode candidate index.

Also, for example, when the value of the MPM flag is 0, the prediction related information may include remaining intra prediction mode information. The remaining intra prediction mode information may indicate one of remaining intra prediction modes other than intra prediction mode candidates in the intra prediction mode candidate list. The remaining intra prediction mode information may be signaled in the form of a rem_intra_luma_pred_mode or intra_luma_mpm_remainder syntax element.

The decoding apparatus generates a reconstructed sample of the current block based on the image information (S2310). The decoding apparatus may derive a prediction sample by performing prediction for the current block, derive a residual sample of the current block based on residual information for the current block, and generate the reconstructed sample of the current block based on the prediction sample and the residual sample.

For example, the decoding apparatus may derive an intra prediction type for a current block among intra prediction types based on the prediction related information. The decoding apparatus may derive the intra prediction type for the current block based on the prediction related information. Here, the intra prediction types may include a first intra prediction type using intra-prediction reference lines adjacent to the current block, a second intra prediction type using intra-prediction reference lines that are not adjacent to the current block, and a third intra prediction type to which intra sub-partitions mode (ISP) is applied. The first intra prediction type may indicate the above-described general intra-prediction, the second intra prediction type may indicate the above-described MRL, and the third intra prediction type may indicate the above-described ISP.

For example, the decoding apparatus may derive the intra prediction type for the current block based on the prediction related information shown in FIG. 26. For example, the decoding apparatus may determine whether the intra prediction type for the current block is the second intra prediction type based on the reference line index of the current block. The prediction related information may include the reference line index. The reference line index may indicate an intra-prediction reference line of the current block. For example, the reference line index may indicate a reference line adjacent to the upper boundary and/or the left boundary of the current block when the reference line index is 0, the reference line index may indicate a reference line separated from the upper boundary and/or the left boundary of the current block by one sample distance when the reference line index is 1, the reference line index may indicate a reference line separated from the upper boundary and/or the left boundary of the current block by 2 sample distances when the reference line index is 2, and the reference line index may indicate a reference line separated from the upper boundary and/or the left boundary of the current block by 3 sample distances when the reference line index is 3. When the reference line index indicates a reference line adjacent to the current block, the decoding apparatus may derive the reference line adjacent to the current block as the intra-prediction reference line of the current block and determine that the intra prediction type for the current block is not the second intra prediction type. Further, when the reference line index indicates a reference line that is not adjacent to the current block, the decoding apparatus may derive the reference line that is not adjacent to the current block as the intra-prediction reference line of the current block and derive the second intra prediction type as the intra prediction type for the current block. Here, the reference line that is not adjacent to the current block may be a reference line separated from the upper boundary and/or the left boundary of the current block by 1, 2 or 3 sample distances.

In addition, when the reference line index indicates a reference line adjacent to the current block, that is, when the intra prediction type for the current block is not the second intra prediction type, the decoding apparatus may determine whether the intra prediction type for the current block is the third intra prediction type based on an intra sub-partitions mode (ISP) flag. The prediction related information may include the ISP flag. The ISP flag may indicate whether the third intra prediction type to which ISP is applied is applied to the current block. That is, the ISP flag may indicate whether the ISP is applied to the current block. For example, the ISP flag may indicate that the third intra prediction type is applied to the current block when set to 1 and may indicate that the third intra prediction type is not applied to the current block when set to 0. The decoding apparatus may derive the third intra prediction type as the intra prediction type for the current block when the ISP flag indicates that the third intra prediction type is applied and derive the first intra prediction type as the intra prediction type for the current block when the ISP flag indicates that the third intra prediction type is not applied.

For example, the decoding apparatus may construct an intra prediction mode candidate list of the current block based on intra prediction modes of neighboring blocks of the current block.

For example, the decoding apparatus the intra prediction mode candidate list of the current block by performing the intra prediction mode candidate list construction process shown in FIG. 27. Meanwhile, the intra prediction mode candidate list may mean the above-described most probable mode (MPM) list.

For example, the decoding apparatus may construct the inter-prediction mode candidate list based on a first candidate intra prediction mode and a second candidate intra prediction mode. The decoding apparatus may construct the inter-prediction mode candidate list based on whether the first candidate intra prediction mode is identical to the second candidate intra prediction mode and/or whether a mode number of the first candidate intra prediction mode and/or a mode number of the second candidate intra prediction mode are greater than the mode number of the DC intra prediction mode. Here, the first candidate intra prediction mode may be derived based on the intra prediction mode of the left neighboring block of the current block and the second candidate intra prediction mode may be derived based on the intra prediction mode of the top neighboring block of the current block. For example, the intra prediction mode of the left neighboring block of the current block may be derived as the first candidate intra prediction mode and the intra prediction mode of the top neighboring block of the current block may be derived as the second candidate intra prediction mode.

Specifically, when the first candidate intra prediction mode is identical to the second candidate intra prediction mode, for example, the decoding apparatus may determine whether the mode number of the first candidate intra prediction mode is greater than the mode number of the DC intra prediction mode, and if the mode number of the first candidate intra prediction mode is greater than the mode number of the DC intra prediction mode, derive the intra prediction mode candidate list for the current block which includes intra prediction mode candidates as follows.

$$mpm[0] = leftIntraDir$$

$$mpm[1] = \text{PLANAR\_IDX}$$

$$mpm[2] = \text{DC\_IDX}$$

$$mpm[3] = ((leftIntraDir + \text{offset}) \% \text{ mod}) + 2$$

$$mpm[4] = ((leftIntraDir - 1) \% \text{ mod}) + 2$$

$$mpm[5] = ((leftIntraDir + \text{offset} - 1) \% \text{ mod}) + 2$$

Here, mpm[0], mpm[1], mpm[2], mpm[3], mpm[4], and mpm[5] represent intra prediction mode candidate 0, intra prediction mode candidate 1, intra prediction mode candidate 2, intra prediction mode candidate 3, intra prediction mode candidate 4, and intra prediction mode candidate 5, leftIntraDir represents the first candidate intra prediction mode, PLANAR_IDX represents the planar intra prediction mode, and DC_IDX represents the DC intra prediction mode. That is, intra prediction mode candidate 0 of the intra prediction mode candidate list may be derived as the first candidate intra prediction mode, intra prediction mode candidate 1 of the intra prediction mode candidate list may be derived as the planar intra prediction mode, intra prediction mode candidate 2 of the intra prediction mode candidate list may be derived as the DC intra prediction mode, intra prediction mode candidate 3 of the intra prediction mode candidate list may be derived as an intra prediction mode having a mode number of (leftIntraDir+offset) % mod)+2, that is, an intra prediction mode having a value, obtained by performing a modulo arithmetic operation on the sum of the mode number of the first candidate intra prediction mode and an offset and adding 2 to the modulo arithmetic operation result, as a mode number, intra prediction mode candidate 4 of the intra prediction mode candidate list may be derived as an intra prediction mode having a mode number of ((leftIntraDir−1) % mod)+2, that is, an intra prediction mode having a value, obtained by performing a modulo arithmetic operation on a value obtained by subtracting 1 from the mode number of the first candidate intra prediction mode and adding 2 to the modulo arithmetic operation result, as a mode number, and intra prediction mode candidate 5 of the intra prediction mode candidate list may be derived as an intra prediction mode having a mode number of ((leftIntraDir+offset−1) % mod)+2, that is, an intra prediction mode having a value, obtained by performing a modulo arithmetic operation on the sum of the mode number of the first candidate intra prediction mode and (offset −1) and adding 2 to the modulo arithmetic operation result, as a mode number.

For example, when the first candidate intra prediction mode is not identical to the second candidate intra prediction mode, the decoding apparatus may derive intra prediction mode candidate 0 and intra prediction mode candidate 1 as follows.

$$mpm[0] = leftIntraDir$$

$$mpm[1] = aboveIntraDir$$

That is, intra prediction mode candidate 0 of the intra prediction mode candidate list may be derived as the first candidate intra prediction mode, and intra prediction mode candidate 1 of the intra prediction mode candidate list may be derived as the second candidate intra prediction mode. Further, the decoding apparatus may derive maxCandModeIdx as 0 if the mode number of intra prediction mode candidate 0 is greater than the mode number of intra prediction mode candidate 1 and derive maxCandModeIdx as 1 if the mode number of intra prediction mode candidate 0 is not greater than the mode number of intra prediction mode candidate 1.

If the mode number of the first candidate intra prediction mode and the mode number of the second candidate intra prediction mode are greater than the mode number of the DC intra prediction mode, the decoding apparatus may derive intra prediction mode candidate 2 and intra prediction mode candidate 3 as follows.

$$mpm[2] = PLANAR\_IDX$$

$$mpm[3] = DC\_IDX$$

That is, intra prediction mode candidate 2 of the intra prediction mode candidate list may be derived as the planar intra prediction mode, and intra prediction mode candidate 3 of the intra prediction mode candidate list may be derived as the DC intra prediction mode.

Then, if a value obtained by subtracting a mode number of mpm[!maxCandModeIdx] from a mode number of mpm[maxCandModeIdx] is less than 63 and greater than 1, the decoding apparatus may derive intra prediction mode candidate 4 and intra prediction mode candidate 5 as follows.

$$mpm[4] = ((mpm[maxCandModeIdx] + offset) \% mod) + 2$$

$$mpm[5] = ((mpm[maxCandModeIdx] - 1) \% mod) + 2$$

That is, intra prediction mode candidate 4 of the intra prediction mode candidate list may be derived as an intra prediction mode having a mode number of ((mpm[maxCandModeIdx]+offset) % mod)+2, that is, an intra prediction mode having a value, obtained by performing a modulo arithmetic operation on the sum of mpm[maxCandModeIdx] and an offset and adding 2 to the modulo arithmetic operation result, as a mode number, and intra prediction mode candidate 5 of the intra prediction mode candidate list may be derived as an intra prediction mode having a mode number of ((mpm[maxCandModeIdx]−1) % mod)+2, that is, an intra prediction mode having a value, obtained by performing a modulo arithmetic operation on a value obtained by subtracting 1 from mpm[maxCandModeIdx] and adding 2 to the modulo arithmetic operation result, as a mode number.

If the value obtained by subtracting the mode number of mpm[!maxCandModeIdx] from the mode number of mpm[maxCandModeIdx] is equal to or greater than 63 or equal to or less than 1, the decoding apparatus/decoding apparatus may derive intra prediction mode candidate 4 and intra prediction mode candidate 5 as follows.

$$mpm[4] = ((mpm[maxCandModeIdx] + offset-1) \% mod) + 2$$

$$mpm[5] = ((mpm[maxCandModeIdx]) \% mod) + 2$$

That is, intra prediction mode candidate 4 of the intra prediction mode candidate list may be derived as an intra prediction mode having a mode number of ((mpm[maxCandModeIdx]+offset−1) % mod)+2, that is, an intra prediction mode having a value, obtained by performing a modulo arithmetic operation on the sum of mpm[maxCandModeIdx] and (offset−1) and adding 2 to the modulo arithmetic operation result, as a mode number, and intra prediction mode candidate 5 of the intra prediction mode candidate list may be derived as an intra prediction mode having a mode number of ((mpm[maxCandModeIdx] % mod)+2, that is, an intra prediction mode having a value, obtained by performing a modulo arithmetic operation on mpm[maxCandModeIdx] and adding 2 to the modulo arithmetic operation result, as a mode number.

If at least one of the mode number of the first candidate intra prediction mode and the mode number of the second candidate intra prediction mode is not greater than the mode number of the DC intra prediction mode, the decoding apparatus may determine whether the sum of the mode number of the first candidate intra prediction mode and the mode number of the second candidate intra prediction mode is equal to or greater than 2. If the sum of the mode number of the first candidate intra prediction mode and the mode number of the second candidate intra prediction mode is equal to or greater than 2, the decoding apparatus may derive intra prediction mode candidate 2 to intra prediction mode candidate 5 as follows.

$$mpm[2] = (mpm[!\,maxCandModeIdx] == \text{PLANAR\_IDX})\ ?\ \text{DC\_IDX}$$
$$:\text{PLANAR\_IDX}$$
$$mpm[3] = ((mpm[maxCandModeIdx] + \text{offset})\ \%\ \text{mod}) + 2$$
$$mpm[4] = ((mpm[maxCandModeIdx] - 1)\ \%\ \text{mod}) + 2$$
$$mpm[5] = ((mpm[maxCandModeIdx] + \text{offset} - 1)\ \%\ \text{mod}) + 2$$

That is, intra prediction mode candidate 2 of the intra prediction mode candidate list may be derived as the DC intra prediction mode if mpm[!maxCandModeIdx] is the planar intra prediction mode and may be derived as the planar intra prediction mode if mpm[!maxCandModeIdx] is not the planar intra prediction mode. In addition, intra prediction mode candidate 3 of the intra prediction mode candidate list may be derived as an intra prediction mode having a mode number of ((mpm[maxCandModeIdx]+offset) % mod)+2, that is, an intra prediction mode having a value, obtained by performing a modulo arithmetic operation on the sum of mpm[maxCandModeIdx] and an offset and adding 2 to the modulo arithmetic operation result, as a mode number, intra prediction mode candidate 4 of the intra prediction mode candidate list may be derived as an intra prediction mode having a mode number of ((mpm[maxCandModeIdx]−1) % mod)+2, that is, an intra prediction mode having a value, obtained by performing a modulo arithmetic operation on a value obtained by subtracting 1 from mpm[maxCandModeIdx] and adding 2 to the modulo arithmetic operation result, as a mode number, and intra prediction mode candidate 5 of the intra prediction mode candidate list may be derived as an intra prediction mode having a mode number of ((mpm[maxCandModeIdx]+offset−1) % mod)+2, that is, an intra prediction mode having a value, obtained by performing a modulo arithmetic operation on the sum of mpm[maxCandModeIdx] and (offset −1) and adding 2 to the modulo arithmetic operation result, as a mode number.

If the aforementioned conditions are not satisfied, the decoding apparatus may derive intra prediction mode candidate 0 to intra prediction mode candidate 5 as follows.

$$mpm[0] = \textit{leftIntraDir}$$
$$mpm[1] = (mpm[0] == \text{PLANAR\_IDX})\ ?\ \text{DC\_IDX:PLANAR\_IDX}$$
$$mpm[2] = \text{VER\_IDX}$$
$$mpm[3] = \text{HOR\_IDX}$$
$$mpm[4] = \text{VER\_IDX} - 4$$
$$mpm[5] = \text{VER\_IDX} + 4$$

That is, intra prediction mode candidate 0 of the intra prediction mode candidate list may be derived as the first candidate intra prediction mode, intra prediction mode candidate 1 of the intra prediction mode candidate list may be derived as the DC intra prediction mode if intra prediction mode candidate 0 is the planar intra prediction mode and derived as planar intra prediction mode if intra prediction mode candidate 0 is not the planar intra prediction mode, intra prediction mode candidate 2 of the intra prediction mode candidate list may be derived as a vertical intra prediction mode, intra prediction mode candidate 3 of the intra prediction mode candidate list may be derived as a horizontal intra prediction mode, intra prediction mode candidate 4 of the intra prediction mode candidate list may be derived as an intra prediction mode corresponding to a mode number obtained by subtracting 4 from the mode number of the vertical intra prediction mode, that is, intra prediction mode #46, and intra prediction mode candidate 5 of the intra prediction mode candidate list may be derived as an intra prediction mode corresponding to a mode number obtained by adding 4 to the mode number of the vertical intra prediction mode, that is, intra prediction mode #54.

For example, the decoding apparatus may perform the intra prediction mode candidate list construction process shown in FIG. 28 to construct the intra prediction mode candidate list for the current block.

For example, the decoding apparatus may construct the intra prediction mode candidate list based on the first candidate intra prediction mode and the second candidate intra prediction mode. The decoding apparatus may construct the inter-prediction mode candidate list based on whether the first candidate intra prediction mode is identical to the second candidate intra prediction mode and/or whether the mode number of the first candidate intra prediction mode and/or the mode number of the second candidate intra prediction mode are greater than the mode number of the DC intra prediction mode. Here, the first candidate intra prediction mode may be derived based on the intra prediction mode of the left neighboring block of the current block and the second candidate intra prediction mode may be derived based on the intra prediction mode of the top neighboring block of the current block. For example, the intra prediction mode of the left neighboring block of the current block may be derived as the first candidate intra prediction mode and the intra prediction mode of the top neighboring block of the current block may be derived as the second candidate intra prediction mode.

Specifically, when the first candidate intra prediction mode is identical to the second candidate intra prediction mode, for example, the decoding apparatus may determine whether the mode number of the first candidate intra prediction mode is greater than the mode number of the DC intra prediction mode, and if the mode number of the first candidate intra prediction mode is greater than the mode number of the DC intra prediction mode, derive the intra prediction mode candidate list for the current block which includes intra prediction mode candidates as follows.

$$mpm[0] = \textit{leftIntraDir}$$
$$mpm[1] = \text{PLANAR\_IDX}$$
$$mpm[2] = ((\textit{leftIntraDir} + \text{offset})\ \%\ \text{mod}) + 2$$
$$mpm[3] = ((\textit{leftIntraDir} - 1)\ \%\ \text{mod}) + 2$$
$$mpm[4] = \text{DC\_IDX}$$
$$mpm[5] = ((\textit{leftIntraDir} + \text{offset} - 1)\ \%\ \text{mod}) + 2$$

Here, mpm[0], mpm[1], mpm[2], mpm[3], mpm[4], and mpm[5] represent intra prediction mode candidate 0, intra prediction mode candidate 1, intra prediction mode candidate 2, intra prediction mode candidate 3, intra prediction mode candidate 4, and intra prediction mode candidate 5, leftIntraDir represents the first candidate intra prediction mode, PLANAR_IDX represents the planar intra prediction mode, and DC_IDX represents the DC intra prediction mode. That is, intra prediction mode candidate 0 of the intra prediction mode candidate list may be derived as the first candidate intra prediction mode, intra prediction mode candidate 1 of the intra prediction mode candidate list may be derived as the planar intra prediction mode, intra prediction mode candidate 2 of the intra prediction mode candidate list may be derived as an intra prediction mode having a mode number of ((leftIntraDir+offset) % mod)+2, that is, an intra prediction mode having a value, obtained by performing a modulo arithmetic operation on the sum of the mode number of the first candidate intra prediction mode and an offset and adding 2 to the modulo arithmetic operation result, as a mode number, intra prediction mode candidate 3 of the intra prediction mode candidate list may be derived as an intra prediction mode having a mode number of ((leftIntraDir−1) % mod)+2, that is, an intra prediction mode having a value, obtained by performing a modulo arithmetic operation on a value obtained by subtracting 1 from the mode number of the first candidate intra-prediction mode and adding 2 to the modulo arithmetic operation result, as a mode number, intra prediction mode candidate 4 of the intra prediction mode candidate list may be derived as the DC intra prediction mode, and intra prediction mode candidate 5 of the intra prediction mode candidate list may be derived as an intra prediction mode having a mode number of ((leftIntraDir+offset−1) % mod)+2, that is, an intra prediction mode having a value, obtained by performing a modulo arithmetic operation on the sum of the mode number of the first candidate intra prediction mode and (offset −1) and adding 2 to the modulo arithmetic operation result, as a mode number.

For example, when the first candidate intra prediction mode is not identical to the second candidate intra prediction mode, the decoding apparatus may derive intra prediction mode candidate 0 and intra prediction mode candidate 1 as follows.

$$mpm[0] = leftIntraDir$$

$$mpm[1] = aboveIntraDir$$

That is, intra prediction mode candidate 0 of the intra prediction mode candidate list may be derived as the first candidate intra prediction mode, and intra prediction mode candidate 1 of the intra prediction mode candidate list may be derived as the second candidate intra prediction mode. Further, the decoding apparatus may derive maxCandModeIdx as 0 if the mode number of intra prediction mode candidate 0 is greater than the mode number of intra prediction mode candidate 1 and derive maxCandModeIdx as 1 if the mode number of intra prediction mode candidate 0 is not greater than the mode number of intra prediction mode candidate 1.

If the mode number of the first candidate intra prediction mode and the mode number of the second candidate intra prediction mode are greater than the mode number of the DC intra prediction mode, the decoding apparatus may derive intra prediction mode candidate 1 to intra prediction mode candidate 3 as follows.

$$mpm[1] = PLANAR\_IDX$$

$$mpm[2] = aboveIntraDir$$

$$maxCandModeIdx = mpm[0] > mpm[2]\ ?\ 0{:}2$$

$$int\ minCandModeIdx = mpm[0] > mpm[2]\ ?\ 2{:}0$$

$$mpm[3] = DX\_IDX;$$

That is, intra prediction mode candidate 1 of the intra prediction mode candidate list may be derived as the planar intra prediction mode, intra prediction mode candidate 2 of the intra prediction mode candidate list may be derived as the second candidate intra prediction mode, and intra prediction mode candidate 3 of the intra prediction mode candidate list may be derived as the DC intra prediction mode. Further, the decoding apparatus may derive maxCandModeIdx as 0 if the mode number of intra prediction mode candidate 0 is greater than the mode number of intra prediction mode candidate 2 and derive maxCandModeIdx as 2 if the mode number of intra prediction mode candidate 0 is not greater than the mode number of intra prediction mode candidate 2. Further, the decoding apparatus may derive minCandModeIdx as 2 if the mode number of intra prediction mode candidate 0 is greater than the mode number of intra prediction mode candidate 2 and derive minCandModeIdx as 0 if the mode number of intra prediction mode candidate 0 is not greater than the mode number of intra prediction mode candidate 2.

If a value obtained by subtracting a mode number of mpm[minCandModeIdx] from a mode number of mpm[maxCandModeIdx] is less than 63 and greater than 1, the decoding apparatus/decoding apparatus may derive intra prediction mode candidate 4 and intra prediction mode candidate 5 as follows.

$$mpm[4] = ((mpm[maxCandModeIdx] + \text{offset})\ \%\ \text{mod}) + 2$$

$$mpm[5] = ((mpm[maxCandModeIdx] - 1)\ \%\ \text{mod}) + 2$$

That is, intra prediction mode candidate 4 of the intra prediction mode candidate list may be derived as an intra prediction mode having a mode number of ((mpm[maxCandModeIdx]+offset) % mod)+2, that is, an intra prediction mode having a value, obtained by performing a modulo arithmetic operation on the sum of mpm[maxCandModeIdx] and an offset and adding 2 to the modulo arithmetic operation result, as a mode number, and intra prediction mode candidate 5 of the intra prediction mode candidate list may be derived as an intra prediction mode having a mode number of ((mpm[maxCandModeIdx]−1) % mod)+2, that is, an intra prediction mode having a value, obtained by performing a modulo arithmetic operation on a value obtained by subtracting 1 from mpm[maxCandModeIdx] and adding 2 to the modulo arithmetic operation result, as a mode number.

If the value obtained by subtracting the mode number of mpm[minCandModeIdx] from the mode number of mpm[maxCandModeIdx] is equal to or greater than 63 or equal to or less than 1, the decoding apparatus/decoding apparatus may derive intra prediction mode candidate 4 and intra prediction mode candidate 5 as follows.

$$mpm[4] = ((mpm[maxCandModeIdx] + \text{offset}-1)\ \%\ \text{mod}) + 2$$

$$mpm[5] = ((mpm[maxCandModeIdx])\ \%\ \text{mod}) + 2$$

That is, intra prediction mode candidate 4 of the intra prediction mode candidate list may be derived as an intra prediction mode having a mode number of ((mpm[maxCandModeIdx]+offset−1) % mod)+2, that is, an intra prediction mode having a value, obtained by performing a modulo arithmetic operation on the sum of mpm[maxCandModeIdx] and (offset−1) and adding 2 to the modulo arithmetic operation result, as a mode number, and intra prediction mode candidate 5 of the intra prediction mode candidate list may be derived as an intra prediction mode having a mode number of ((mpm[maxCandModeIdx]) % mod)+2, that is, an intra prediction mode having a value, obtained by performing a modulo arithmetic operation on mpm[maxCandModeIdx] and adding 2 to the modulo arithmetic operation result, as a mode number.

If at least one of the mode number of the first candidate intra prediction mode and the mode number of the second candidate intra prediction mode is not greater than the mode number of the DC intra prediction mode, the decoding apparatus may determine whether the sum of the mode number of the first candidate intra prediction mode and the mode number of the second candidate intra prediction mode is equal to or greater than 2. If the sum of the mode number of the first candidate intra prediction mode and the mode number of the second candidate intra prediction mode is equal to or greater than 2, the decoding apparatus may determine whether at least one of the first candidate intra prediction mode and the second candidate intra prediction mode is the planar intra prediction mode.

If at least one of the first candidate intra prediction mode and the second candidate intra prediction mode is the planar intra prediction mode, the decoding apparatus may derive intra prediction mode candidate 0 and intra prediction mode candidate 1 as follows.

$$mpm[0] = \text{PLANAR\_IDX}$$

$$mpm[1] = (leftIntraDir < aboveIntraDir)?\, aboveIntraDir : leftIntraDir$$

$$maxCandModeIdx = 1$$

That is, intra prediction mode candidate 0 of the intra prediction mode candidate list may be derived as the planar intra prediction mode, intra prediction mode candidate 1 of the intra prediction mode candidate list may be derived as the second candidate intra prediction mode if the mode number of the first candidate intra prediction mode is less than the mode number of the second candidate intra prediction mode and derived as the first candidate intra prediction mode if the mode number of the first candidate intra prediction mode is equal to or greater than the mode number of the second candidate intra prediction mode. Further, the decoding apparatus may derive maxCandModeIdx as 1.

If the first candidate intra prediction mode and the second candidate intra prediction mode are not the planar intra prediction mode, the decoding apparatus may derive intra prediction mode candidate 2 to intra prediction mode candidate 5 as follows.

$$mpm[2] = (mpm[!maxCandModeIdx] == \text{PLANAR\_IDX})?\, \text{DC\_IDX} : \text{PLANAR\_IDX}$$

$$mpm[3] = ((mpm[maxCandModeIdx] + offset)\ \%\ mod) + 2$$

$$mpm[4] = ((mpm[maxCandModeIdx] - 1)\ \%\ mod) + 2$$

$$mpm[5] = ((mpm[maxCandModeIdx] + offset - 1)\ \%\ mod) + 2$$

That is, intra prediction mode candidate 2 of the intra prediction mode candidate list may be derived as the DC intra prediction mode if mpm[!maxCandModeIdx] is the planar intra prediction mode and may be derived as the planar intra prediction mode if mpm[!maxCandModeIdx] is not the planar intra prediction mode. In addition, intra prediction mode candidate 3 of the intra prediction mode candidate list may be derived as an intra prediction mode having a mode number of ((mpm[maxCandModeIdx]+offset) % mod)+2, that is, an intra prediction mode having a value, obtained by performing a modulo arithmetic operation on the sum of mpm[maxCandModeIdx] and an offset and adding 2 to the modulo arithmetic operation result, as a mode number, intra prediction mode candidate 4 of the intra prediction mode candidate list may be derived as an intra prediction mode having a mode number of ((mpm[maxCandModeIdx]−1) % mod)+2, that is, an intra prediction mode having a value, obtained by performing a modulo arithmetic operation on a value obtained by subtracting 1 from mpm[maxCandModeIdx] and adding 2 to the modulo arithmetic operation result, as a mode number, and intra prediction mode candidate 5 of the intra prediction mode candidate list may be derived as an intra prediction mode having a mode number of ((mpm[maxCandModeIdx]+offset−1) % mod)+2, that is, an intra prediction mode having a value, obtained by performing a modulo arithmetic operation on the sum of mpm[maxCandModeIdx] and (offset −1) and adding 2 to the modulo arithmetic operation result, as a mode number.

If the aforementioned conditions are not satisfied, the decoding apparatus may derive intra prediction mode candidate 0 to intra prediction mode candidate 5 as follows.

$$mpm[0] = leftIntraDir$$

$$mpm[1] = (mpm[0] == \text{PLANAR\_IDX})?\, \text{DC\_IDX} : \text{PLANAR\_IDX}$$

$$mpm[2] = \text{VER\_IDX}$$

$$mpm[3] = \text{HOR\_IDX}$$

$$mpm[4] = \text{VER\_IDX} - 4$$

$$mpm[5] = \text{VER\_IDX} + 4$$

That is, intra prediction mode candidate 0 of the intra prediction mode candidate list may be derived as the first candidate intra prediction mode, intra prediction mode candidate 1 of the intra prediction mode candidate list may be derived as the DC intra prediction mode if intra prediction mode candidate 0 is the planar intra prediction mode and derived as planar intra prediction mode if intra prediction mode candidate 0 is not the planar intra prediction mode, intra prediction mode candidate 2 of the intra prediction mode candidate list may be derived as a vertical intra prediction mode, intra prediction mode candidate 3 of the intra prediction mode candidate list may be derived as a horizontal intra prediction mode, intra prediction mode candidate 4 of the intra prediction mode candidate list may be derived as an intra prediction mode corresponding to a mode number obtained by subtracting 4 from the mode number of the vertical intra prediction mode, that is, intra prediction mode #46, and intra prediction mode candidate 5 of the intra prediction mode candidate list may be derived as an intra prediction mode corresponding to a mode number obtained by adding 4 to the mode number of the vertical intra prediction mode, that is, intra prediction mode #54.

For example, the decoding apparatus may perform the intra prediction mode candidate list construction process shown in FIG. 29 to construct the intra prediction mode candidate list for the current block.

For example, the decoding apparatus may construct the intra prediction mode candidate list based on the first candidate intra prediction mode and the second candidate intra prediction mode. The decoding apparatus may construct the inter-prediction mode candidate list based on whether the first candidate intra prediction mode is identical to the second candidate intra prediction mode and/or whether the mode number of the first candidate intra prediction mode and/or the mode number of the second candidate intra prediction mode are greater than the mode number of the DC intra prediction mode. Here, the first candidate intra prediction mode may be derived based on the intra prediction mode of the left neighboring block of the current block and the second candidate intra prediction mode may be derived based on the intra prediction mode of the top neighboring block of the current block. For example, the intra prediction mode of the left neighboring block of the current block may be derived as the first candidate intra prediction mode and the intra prediction mode of the top neighboring block of the current block may be derived as the second candidate intra prediction mode.

Specifically, when the first candidate intra prediction mode is identical to the second candidate intra prediction mode, for example, the decoding apparatus may determine whether the mode number of the first candidate intra prediction mode is greater than the mode number of the DC intra prediction mode, and if the mode number of the first candidate intra prediction mode is greater than the mode number of the DC intra prediction mode, derive the intra prediction mode candidate list for the current block which includes intra prediction mode candidates as follows.

$mpm[0] = g\_intraMode65to33AngMapping[leftIntraDir]$ $mpm[1] = ((g\_intraMode65to33AngMapping[leftIntraDir] + \text{offset}) \% \bmod + 2$ $mpm[2] = (g\_intraMode65to33AngMapping[leftIntraDir] - 1) \% \bmod + 2$ That is, intra prediction mode candidate 0 of the intra prediction mode candidate list may be derived as the first candidate intra prediction mode. In addition, intra prediction mode candidate 1 of the intra prediction mode candidate list may be derived as an intra prediction mode having a mode number of ((g_intraMode65to33AngMapping[leftIntraDir]+offset) % mod)+2, that is, an intra prediction mode having a value, obtained by performing a modulo arithmetic operation on the sum of the mode number of the first candidate intra prediction mode and an offset and adding 2 to the modulo arithmetic operation result, as a mode number, and intra prediction mode candidate 2 of the intra prediction mode candidate list may be derived as an intra prediction mode having a mode number of ((g_intraMode65to33AngMapping[leftIntraDir]−1) % mod)+2, that is, an intra prediction mode having a value, obtained by performing a modulo arithmetic operation on a value obtained by subtracting 1 from the mode number of the first candidate intra prediction mode and adding 2 to the modulo arithmetic operation result, as a mode number.

If the mode number of the first candidate intra prediction mode is not greater than the mode number of the DC intra prediction mode, the decoding apparatus may derive the intra prediction mode candidate list for the current block which includes intra prediction mode candidates as follows.

$mpm[0] = g\_intraMode65to33AngMapping[PLANAR\_IDX]$ $mpm[1] = g\_intraMode65to33AngMapping[DC\_IDX]$ $mpm[1] = g\_intraMode65to33AngMapping[VER\_IDX]$ That is, intra prediction mode candidate 0 of the intra prediction mode candidate list may be derived as the planar intra prediction mode, intra prediction mode candidate 1 of the intra prediction mode candidate list may be derived as the DC intra prediction mode, and intra prediction mode candidate 2 of the intra prediction mode candidate list may be derived as a vertical intra prediction mode.

Further, if the first candidate intra prediction mode is not identical to the second candidate intra prediction mode, the decoding apparatus may derive intra prediction mode candidate 0 and intra prediction mode candidate 1.

$mpm[0] = g\_intraMode65to33AngMapping[leftIntraDir]$ $mpm[1] = g\_intraMode65to33AngMapping[aboveIntraDir]$ That is, intra prediction mode candidate 0 of the intra prediction mode candidate list may be derived as the first candidate intra prediction mode, and intra prediction mode candidate 1 of the intra prediction mode candidate list may be derived as the second candidate intra prediction mode.

Then, if both the first candidate intra prediction mode and the second candidate intra prediction mode are the planar intra prediction mode, the decoding apparatus may derive intra prediction mode candidate 2 as follows.

$mpm[2] = g\_intraMode65to33AngMapping[PLANAR\_IDX]$

That is, intra prediction mode candidate 2 of the intra prediction mode candidate list may be derived as the planar intra prediction mode.

Otherwise, if at least one of the first candidate intra prediction mode and the second candidate intra prediction mode is the planar intra prediction mode, the decoding apparatus may derive intra prediction mode candidate 2 as follows.

$mpm[2] = g\_intraMode65to33AngMapping[(leftIntraDir + aboveIntraDir) < 2\,?\,VER\_IDX:DC\_IDX]$ That is, intra prediction mode candidate 2 of the intra prediction mode candidate list may be derived as a vertical intra prediction mode if the sum of the mode number of the first candidate intra prediction mode and the mode number of the second candidate intra prediction mode is less than 2 and derived as the DC intra prediction mode if the sum of the mode number of the first candidate intra prediction mode and the mode number of the second candidate intra prediction mode is equal to or greater than 2.

For example, the decoding apparatus may construct the intra prediction mode candidate list of the current block based on intra prediction modes of neighboring blocks of the current block as shown in FIG. 30. Meanwhile, the intra prediction mode candidate list may mean the above-described most probable mode (MPM) list.

For example, the decoding apparatus may construct the intra prediction mode candidate list based on an intra prediction mode of a left neighboring block of the current block and an intra prediction mode of a top neighboring block of the current block. The decoding apparatus may determine whether the intra prediction mode of the left neighboring block and the intra prediction mode of the top neighboring block of the current block are the same and a mode number of the intra prediction mode of the left neighboring block is greater than a mode number of a DC intra prediction mode. The decoding apparatus may construct the intra prediction mode candidate list based on whether the intra prediction mode of the left neighboring block and the intra prediction mode of the top neighboring block of the current block are the same and/or the mode number of the intra prediction mode of the left neighboring block is greater than the mode number of the DC intra prediction mode.

When the intra prediction mode of the left neighboring block and the intra prediction mode of the top neighboring block of the current block are the same and the mode number of the intra prediction mode of the left neighboring block is greater than the mode number of the DC intra prediction mode, the decoding apparatus may derive the intra prediction mode candidate list of the current block including intra prediction mode candidates as described below.

$$mpm[0] = INTRA\_PLANAR$$

$$mpm[1] = candIntraPredModeA$$

$$mpm[2] = 2 + ((candIntraPredModeA + 61) \% 64)$$

$$mpm[3] = 2 + ((candIntraPredModeA - 1) \% 64)$$

$$mpm[4] = INTRA\_DC$$

$$mpm[5] = 2 + ((candIntraPredModeA + 60) \% 64)$$

That is, intra prediction mode candidate 0 of the intra prediction mode candidate list may be derived as the planar intra prediction mode, intra prediction mode candidate 1 of the intra prediction mode candidate list may be derived as the intra prediction mode of the left neighboring block, intra prediction mode candidate 2 of the intra prediction mode candidate list may be derived as an intra prediction mode having a mode number of 2+((candIntraPredModeA+61) % 64), that is, an intra prediction mode having a value, obtained by performing a modulo arithmetic operation with 64 on a value obtained by adding 61 from the mode number of the intra prediction mode of the left neighboring block and adding 2 to the modulo arithmetic operation result, as a mode number, intra prediction mode candidate 3 of the intra prediction mode candidate list may be derived as an intra prediction mode having a mode number of 2+((candIntraPredModeA−1) % 64), that is, an intra prediction mode having a value, obtained by performing a modulo arithmetic operation with 64 on a value obtained by subtracting 1 from the mode number of the intra prediction mode of the left neighboring block and adding 2 to the modulo arithmetic operation result, as a mode number, intra prediction mode candidate 4 of the intra prediction mode candidate list may be derived as the DC intra prediction mode, and intra prediction mode candidate 5 of the intra prediction mode candidate list may be derived as an intra prediction mode having a mode number of 2+((candIntraPredModeA+60) % 64), that is, an intra prediction mode having a value, obtained by performing a modulo arithmetic operation with 64 on a value obtained by adding 60 from the mode number of the intra prediction mode of the left neighboring block and adding 2 to the modulo arithmetic operation result, as a mode number. That is, for example, when the intra prediction mode of the left neighboring block and the intra prediction mode of the top neighboring block are the same and the mode number of the intra prediction mode of the left neighboring block is greater than the mode number of the DC intra prediction mode, the intra prediction mode candidate list may include the intra prediction mode of the left neighboring block, the intra prediction mode of the top neighboring block, an intra prediction mode with mode number 2+((candIntraPredModeA+61)% 64), an intra prediction mode with mode number 2+((candIntraPredModeA−1)% 64), and an intra prediction mode with mode number 2+((candIntraPredModeA+60)% 64) as intra prediction mode candidates. Here, candIntraPredModeA may represent the mode number of the intra prediction mode of the left neighboring block of the current block.

Meanwhile, when the intra prediction mode of the left neighboring block and the intra prediction mode of the top neighboring block of the current block are not the same, for example, the decoding apparatus may determine whether at least one of a mode number of an intra prediction mode of the left neighboring block and a mode number of an intra prediction mode of the top neighboring block is greater than a mode number of the DC intra prediction mode. When at least one of the mode number of the intra prediction mode of the left neighboring block and the mode number of the intra prediction mode of the top neighboring block is greater than the mode number of the DC intra prediction mode, a variable minAB and a variable maxAB may be derived as follows.

$$minAB = Min(candIntraPredModeA, candIntraPredModeB)$$

$$maxAB = Max(candIntraPredModeA, candIntraPredModeB)$$

Here, candIntraPredModeA may represent the mode number of the intra prediction mode of the left neighboring block of the current block, and candIntraPredModeB may represent the mode number of the intra prediction mode of the top neighboring block of the current block. That is, minAB may represent a smaller value among the mode number of the intra prediction mode of the left neighboring block and the mode number of the intra prediction mode of the top neighboring block, maxAB may represent a larger value among the mode number of the intra prediction mode of the left neighboring block and the mode number of the intra prediction mode of the top neighboring block.

Also, when the intra prediction mode of the left neighboring block and the intra prediction mode of the top neighboring block of the current block are not the same, the decoding apparatus may determine whether the mode number of an intra prediction mode of the left neighboring block is greater than the mode number of the DC intra prediction mode and the mode number of the intra prediction mode of the top neighboring block is greater than the mode number of the DC intra prediction mode.

For example, when the mode number of an intra prediction mode of the left neighboring block is greater than the mode number of the DC intra prediction mode and the mode number of the intra prediction mode of the top neighboring block is greater than the mode number of the DC intra prediction mode, the decoding apparatus may derive intra prediction mode candidate 0 to intra prediction mode candidate 3 as described below.

$$mpm[0] = INTRA\_PLANAR$$
$$mpm[1] = candIntraPredModeA$$
$$mpm[2] = candIntraPredModeB$$
$$mpm[3] = INTRA\_DC$$

That is, intra prediction mode candidate 0 of the intra prediction mode candidate list may be derived as the planar intra prediction mode, intra prediction mode candidate 1 of the intra prediction mode candidate list may be derived as the intra prediction mode of the left neighboring block, intra prediction mode candidate 2 of the intra prediction mode candidate list may be derived as the intra prediction mode of the top neighboring block, and intra prediction mode candidate 3 of the intra prediction mode candidate list may be derived as the DC intra prediction mode. Here, candIntraPredModeB may represent the mode number of the intra prediction mode of the top neighboring block of the current block. That is, for example, when the intra prediction mode of the left neighboring block and the intra prediction mode of the top neighboring block are not the same, and the mode number of the intra prediction mode of the left neighboring block and the mode number of the intra prediction mode of the top neighboring block are greater than the mode number of the DC intra prediction mode, the intra prediction mode candidate list may include the intra prediction mode of the left neighboring block and the intra prediction mode of the top neighboring block as intra prediction mode candidates.

Thereafter, remaining intra prediction mode candidates (intra prediction mode candidate 4 and intra prediction mode candidate 5) may be derived based on the maxAB and the minAB. Specifically, the remaining intra prediction mode candidates are derived based on a difference between a larger value and a smaller value among the mode number of the intra prediction mode of the left neighboring block and the mode number of the intra prediction mode of the top neighboring block.

For example, when a value obtained by subtracting the minAB from the maxAB is less than 63 and greater than 1 (that is, when the value obtained by subtracting the minAB from the maxAB is one of 2 to 62), the decoding apparatus may derive intra prediction mode candidate 4 and intra prediction mode candidate 5 as described below.

$$mpm[4] = 2 + ((maxAB + 61)\ \%64)$$
$$mpm[5] = 2 + ((maxAB - 1)\ \%64)$$

That is, intra prediction mode candidate 4 of the intra prediction mode candidate list may be derived as an intra prediction mode with mode number 2+((maxAB+61) % 64), that is, an intra prediction mode having a value, obtained by performing a modulo arithmetic operation with 64 on a value obtained by adding 61 from the maxAB and adding 2 to the modulo arithmetic operation result, as a mode number, and intra prediction mode candidate 5 of the intra prediction mode candidate list may be derived as an intra prediction mode with mode number 2+((maxAB−1) % 64), that is, an intra prediction mode having a value, obtained by performing a modulo arithmetic operation with 64 on a value obtained by subtracting 1 from the maxAB and adding 2 to the modulo arithmetic operation result, as a mode number. Here, maxAB may represent a larger value among the mode number of the intra prediction mode of the left neighboring block and the mode number of the intra prediction mode of the top neighboring block.

Alternatively, when a value obtained by subtracting the minAB from the maxAB is equal to or greater than 63 or equal to or less than 1, the decoding apparatus may derive intra prediction mode candidate 4 and intra prediction mode candidate 5 as described below.

$$mpm[4] = 2 + ((maxAB + 60)\ \%64)$$
$$mpm[5] = 2 + (maxAB\ \%64)$$

That is, intra prediction mode candidate 4 of the intra prediction mode candidate list may be derived as an intra prediction mode with mode number 2+((maxAB+60) % 64), that is, an intra prediction mode having a value, obtained by performing a modulo arithmetic operation with 64 on a value obtained by adding 60 from the maxAB and adding 2 to the modulo arithmetic operation result, as a mode number, and intra prediction mode candidate 5 of the intra prediction mode candidate list may be derived as an intra prediction mode with mode number 2+(maxAB % 64), that is, an intra prediction mode having a value, obtained by performing a modulo arithmetic operation with 64 on the maxAB and adding 2 to the modulo arithmetic operation result, as a mode number. Here, maxAB may represent a larger value among the mode number of the intra prediction mode of the left neighboring block and the mode number of the intra prediction mode of the top neighboring block.

Meanwhile, when the intra prediction mode of the left neighboring block and the intra prediction mode of the top neighboring block of the current block are not the same, or at least one of mode numbers of the intra prediction mode of the left neighboring block and the intra prediction mode of the top neighboring block is smaller than the mode number of the DC intra prediction mode, the decoding apparatus may determine whether the sum of the mode number of the intra prediction mode of the left neighboring block and the mode number of the intra prediction mode of the top neighboring block is equal to or greater than the mode number of the DC intra prediction mode.

For example, when the sum of the mode number of the intra prediction mode of the left neighboring block and the mode number of the intra prediction mode of the top neighboring block is equal to or greater than the mode number of the DC intra prediction mode, the decoding apparatus may derive the intra prediction mode candidate list of the current block including intra prediction mode candidates as described below.

$$mpm[0] = INTRA\_PLANAR$$
$$mpm[1] = maxAB$$
$$mpm[2] = INTRA\_DC$$
$$mpm[3] = 2 + ((maxAB + 61)\ \%64)$$

-continued $$mpm[4] = 2 + ((\text{max}AB - 1) \%64)$$

$$mpm[5] = 2 + ((\text{max}AB + 60) \%64)$$

That is, intra prediction mode candidate 0 of the intra prediction mode candidate list may be derived as the planar intra prediction mode, intra prediction mode candidate 1 may be derived as maxAB, that is, intra prediction mode candidate 1 may be derived as the intra prediction mode of the top neighboring block when the mode number of the intra prediction mode of the left neighboring block is smaller than the mode number of the intra prediction mode of the top neighboring block, and intra prediction mode candidate 1 may be derived as the intra prediction mode of the left neighboring block when the mode number of the intra prediction mode of the left neighboring block is greater than or equal to the mode number of the intra prediction mode of the top neighboring block, intra prediction mode candidate 2 of the intra prediction mode candidate list may be derived as the DC intra prediction mode, intra prediction mode candidate 3 of the intra prediction mode candidate list may be derived as an intra prediction mode having a mode number of 2+((maxAB+61) % 64), that is, an intra prediction mode having a value, obtained by performing a modulo arithmetic operation with 64 on a value obtained by adding 61 from the maxAB and adding 2 to the modulo arithmetic operation result, as a mode number, intra prediction mode candidate 4 of the intra prediction mode candidate list may be derived as an intra prediction mode having a mode number of 2+((maxAB−1) % 64), that is, an intra prediction mode having a value, obtained by performing a modulo arithmetic operation with 64 on a value obtained by subtracting 1 from the maxAB and adding 2 to the modulo arithmetic operation result, as a mode number, and intra prediction mode candidate 5 of the intra prediction mode candidate list may be derived as an intra prediction mode having a mode number of 2+((maxAB+60) % 64), that is, an intra prediction mode having a value, obtained by performing a modulo arithmetic operation with 64 on a value obtained by adding 60 from the maxAB and adding 2 to the modulo arithmetic operation result, as a mode number.

Or, for example, when the above conditions are not met, the decoding apparatus may derive the intra prediction mode candidate list of the current block including intra prediction mode candidates as described below.

$$mpm[0] = \text{INTRA\_PLANAR}$$

$$mpm[1] = \text{INTRA\_DC}$$

$$mpm[2] = \text{INTRA\_ANGULAR50}$$

$$mpm[3] = \text{INTRA\_ANGULAR18}$$

$$mpm[4] = \text{INTRA\_ANGULAR46}$$

$$mpm[5] = \text{INTRA\_ANGULAR54}$$

That is, intra prediction mode candidate 0 of the intra prediction mode candidate list may be derived as the planar intra prediction mode, intra prediction mode candidate 1 of the intra prediction mode candidate list may be derived as the DC intra prediction mode, intra prediction mode candidate 2 of the intra prediction mode candidate list may be derived as the vertical intra prediction mode (i.e., intra prediction mode #50), intra prediction mode candidate 3 of the intra prediction mode candidate list may be derived as the horizontal intra prediction mode (i.e., intra prediction mode #18), intra prediction mode candidate 4 of the intra prediction mode candidate list may be derived as an intra prediction mode of the mode number obtained by subtracting 4 from the mode number of the vertical intra prediction mode, that is, the intra prediction mode #46, intra prediction mode candidate 5 of the intra prediction mode candidate list may be derived as an intra prediction mode of the mode number obtained by adding 4 from the mode number of the vertical intra prediction mode, that is, the intra prediction mode #54. That is, for example, when the above conditions are not met, the intra prediction mode candidate list may include the DC intra prediction mode, the intra prediction mode #50, the intra prediction mode #18, the intra prediction mode #46, and the intra prediction mode #54 as intra prediction mode candidates.

Meanwhile, for example, when the left neighboring block is not available, intra prediction is not applied to the left neighboring block, and the intra prediction mode of the left neighboring block corresponding to at least one of a case in which a value of a CIIP flag of the top neighboring block is not 1 and a case in which the value of a pcm flag of the left neighboring block is 1 may be derived as the planar intra prediction mode. Also, when the top neighboring block is not available, intra prediction is not applied to the top neighboring block, and the intra prediction mode of the left neighboring block corresponding to at least one of a case in which a value of a CIIP flag of the top neighboring block is not 1, a case in which a value of a pcm flag of the top neighboring block is 1 and a case in which the top neighboring block is not included in the current CTU may be derived as the planar intra prediction mode.

Meanwhile, the intra prediction mode candidate list generated when the intra prediction type is the first intra prediction type, the intra prediction mode candidate list generated when the intra prediction type is the second intra prediction type, and the intra prediction mode candidate list generated when the intra prediction type is the third intra prediction type may be identical. That is, the same intra prediction mode candidate list may be constructed irrespective of the intra prediction type for the current block. An intra prediction mode candidate list may be constructed through the same intra prediction mode construction process irrespective of the intra prediction type for the current block. The intra prediction mode construction process may be the same as one of the above-described embodiments.

For example, the decoding apparatus may derive an intra prediction mode of the current block based on the intra prediction mode candidate list.

For example, the decoding apparatus may derive an MPM flag with respect to the current block. The prediction related information may include the MPM flag. For example, the decoding apparatus may receive the prediction related information for the current block, and the prediction related information may include the MPM flag with respect to the current block. The prediction related information may not include the MPM flag. In this case, the decoding apparatus may derive the value of the MPM flag 1. The MPM flag may indicate whether the intra prediction mode of the current block is one of the intra prediction mode candidates of the intra prediction mode candidate list. The MPM flag may also be referred to as an intra prediction mode candidate flag.

When the MPM flag is 1, the decoding apparatus may derive an intra prediction mode candidate indicated by an MPM index from among the intra prediction mode candidates of the intra prediction mode candidate list as the intra prediction mode for the current block. The MPM index may be signaled in the form of mpm_idx or intra_luma_mpm_idx syntax element. The MPM index may also be referred to as an intra prediction mode candidate index.

When the MPM flag is 0, the decoding apparatus may derive an intra prediction mode indicated by remaining intra prediction mode information from among the remaining intra prediction modes as the intra prediction mode for the current block. The remaining intra prediction modes may represent intra prediction modes that are not included in the intra prediction mode candidates of the intra prediction mode candidate list. The aforementioned prediction related information may include the remaining intra prediction mode information. The remaining intra prediction mode information may be signaled in the form of rem_intra_luma_pred_mode or intra_luma_mpm_remainder syntax element.

For example, the intra prediction mode of the current block may be derived as one of the intra prediction modes other than the planar intra prediction mode and the DC intra prediction mode when the intra prediction type for the current block is derived as the second intra prediction type and derived as one of the intra prediction modes other than the DC intra prediction mode when the intra prediction type for the current block is derived as the third intra prediction type.

For example, the intra prediction mode of the current block may be derived as one of the intra prediction modes other than the planar intra prediction mode when the intra prediction type for the current block is derived as the second intra prediction type and derived as one of the intra prediction modes other than the DC intra prediction mode when the intra prediction type for the current block is derived as the third intra prediction type.

For example, the intra prediction mode of the current block may be derived as one of the intra prediction modes other than the planar intra prediction mode when the intra prediction type for the current block is derived as the second intra prediction type.

For example, the decoding apparatus may derive prediction samples of the current block based on the intra prediction type and the intra prediction mode.

For example, when the intra prediction type is derived as the first intra prediction type, the decoding apparatus may derive at least one reference sample from among reference samples in intra-prediction reference lines adjacent to the current block based on the intra prediction mode and generate prediction samples of the current block based on the reference sample. The reference samples may include a top-left reference sample, upper reference samples, and left reference samples of the current block. For example, when the size of the current block is W×H, x component of the top-left sample position of the current block is xN, and y component thereof is yN, the left reference samples may be p[xN−1][yN] to p[xN−1] [2H+yN−1], the top-left reference sample may be p[xN−1] [yN−1], and the upper reference samples may be p[xN][yN−1] to p[2W+xN−1][yN−1].

For example, when the intra prediction type is derived as the second intra prediction type, the decoding apparatus may derive at least one reference sample from among reference samples in intra-prediction reference lines that are not adjacent to the current block based on the intra prediction mode and generate prediction samples of the current block based on the reference sample. Here, the intra-prediction reference lines may be reference lines separated from the upper boundary and/or the left boundary of the current block by 1, 2 or 3 sample distances.

For example, when the intra prediction type is derived as the third intra prediction type, the decoding apparatus may derive an ISP split type of the current block based on an ISP split flag indicating the ISP split type and partition the current block according to the ISP split type to derive sub-blocks. The split type may be a horizontal split type or a vertical split type. For example, when the size of the current block is 4×4, the current block may not be partitioned. For example, when the size of the current block is 4×8 and the split type is the horizontal split type, the current block may be partitioned into two 4×4 sub-blocks. For example, when the size of the current block is 4×8 and the split type is the vertical split type, the current block may be partitioned into two 2×8 sub-blocks. For example, when the size of the current block is 8×4 and the split type is the horizontal split type, the current block may be partitioned into two 8×2 sub-blocks. For example, when the size of the current block is 8×4 and the split type is the vertical split type, the current block may be partitioned into two 4×4 sub-blocks. For example, when the size of the current block is W×H (sizes other than 4×8, 8×4, and 4×4) and the split type is the horizontal split type, the current block may be partitioned into four W×H/4 sub-blocks. For example, when the size of the current block is W×H and the split type is the vertical split type, the current block may be partitioned into four W/4×H sub-blocks. Thereafter, the decoding apparatus may perform intra-prediction on the sub-blocks to generate a prediction sample. That is, the decoding apparatus may derive at least one of reference samples in intra-prediction reference lines of each sub-block of the current block based on the intra prediction mode and generate the prediction sample based on the reference sample. The intra-prediction reference lines of each sub-block may be reference lines adjacent to each sub-block.

For example, when the intra prediction mode of the current block is derived as the DC intra prediction mode, the current block is a square block, a size of the current block is W×H, an x component and y component of a top left position of the current block are 0, the DC value may be derived based on a reference sample of (0, −refIdx−1) coordinates to a reference sample of (W−1, −refIdx−1) coordinates in a top intra prediction reference line indicated by a reference line index of the current block and a reference sample of (−refIdx−1, 0) coordinates to a reference sample of (−refIdx−1, H−1) coordinates in a left intra prediction reference line indicated by the reference line index. A prediction sample of the current block may be derived as the DC value.

For example, when the intra prediction mode of the current block is derived as the DC intra prediction mode, the current block is a non-square block whose width is greater than its height, a size of the current block is W×H, an x component and y component of a top left position of the current block are 0, the DC value may be derived based on a reference sample of (0, −refIdx−1) coordinates to a reference sample of (W−1, −refIdx−1) coordinates in a top intra prediction reference line indicated by a reference line index of the current block. A prediction sample of the current block may be derived as the DC value.

For example, when the intra prediction mode of the current block is derived as the DC intra prediction mode, the current block is a non-square block whose height is greater than its width, a size of the current block is W×H, an x component and y component of a top left position of the current block are 0, the DC value may be derived based a reference sample of (−refIdx−1, 0) coordinates to a reference sample of (−refIdx−1, H−1) coordinates in a left intra prediction reference line indicated by a reference line index of the current block. A prediction sample of the current block may be derived as the DC value.

For example, when the intra prediction mode of the current block is derived as the planar intra prediction mode, a size of the current block is W×H, an x component and y component of a top left position of the current block are 0, the prediction sample may be derived based on a reference sample of (W−1, −refIdx−1) coordinates and a reference sample of (−refIdx-1, H−1) coordinates in an intra prediction reference line indicated by a reference line index of the current block.

Also, for example, the decoding apparatus may derive a residual sample of the current block based on residual information for the current block. The image information may include the residual information. The residual information may include a transform coefficient for the residual sample. The decoding apparatus may derive the residual sample (or residual sample array) for the current block based on the residual information.

Then, for example, the decoding apparatus may generate a reconstructed sample of the current block based on the prediction sample and the residual sample. For example, the decoding apparatus may generate the reconstructed sample by adding the residual sample to the prediction sample.

Thereafter, the decoding apparatus may apply an in-loop filtering procedure such as deblocking filtering and/or SAO procedure to the reconstructed sample (i.e., reconstructed picture) to improve subjective/objective picture quality as necessary, as described above.

Figure 24:
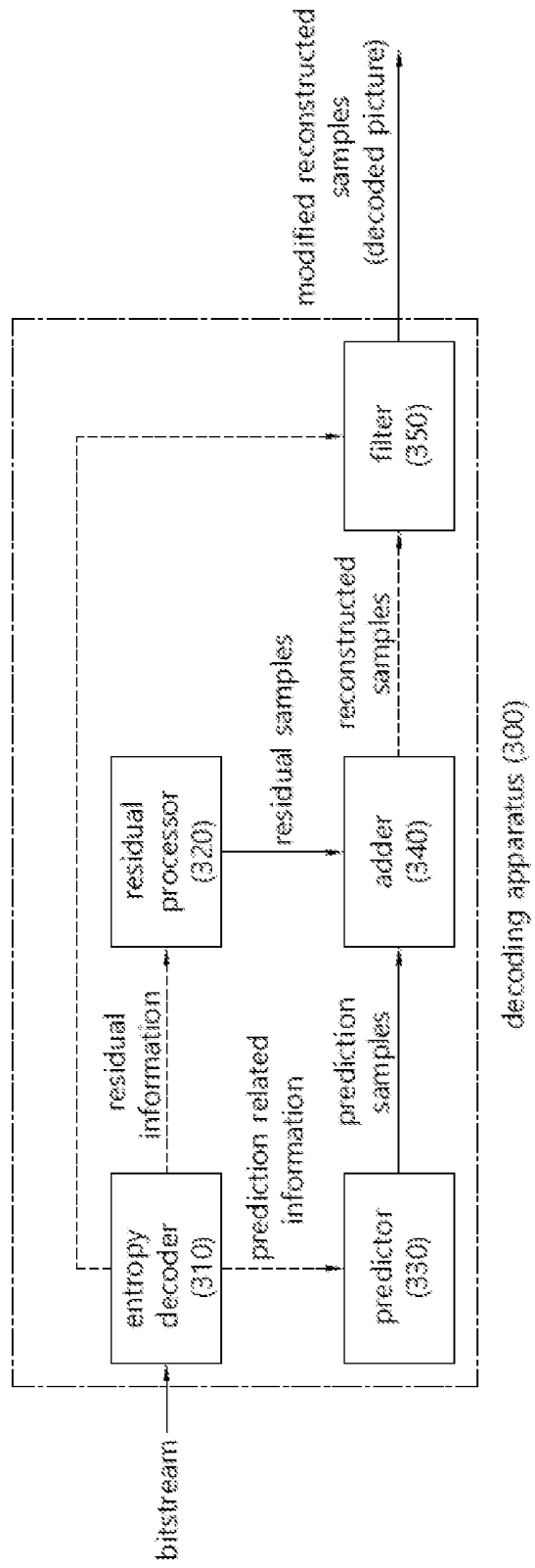
FIG. 24 schematically illustrates a decoding apparatus that performs the image decoding method according to the present disclosure.

FIG. 24 schematically illustrates a decoding apparatus that performs the image decoding method according to the present disclosure. The method disclosed in FIG. 23 may be performed by the decoding apparatus illustrated in FIG. 24. Specifically, for example, an entropy decoder of the decoding apparatus of FIG. 24 may perform S2300 of FIG. 23, and a predictor of the decoding apparatus of FIG. 24 may perform S2310 of FIG. 23. In addition, although not illustrated, a process of obtaining image information including residual information with respect to the current block through a bitstream may be performed by an entropy decoder of the decoding apparatus of FIG. 24, and a process of deriving a residual sample with respect to the current block based on the residual information may be performed by a residual processor of the decoding apparatus of FIG. 24.

According to the above-described present disclosure, it is possible to reduce hardware and software implementation complexity using a unified intra prediction mode list construction process for intra prediction types.

Furthermore, according to the present disclosure, it is possible to reduce dependency on intra prediction type using a unified intra prediction mode list construction process for intra prediction types to improve coding efficiency of intra-prediction.

Also, according to the present disclosure, it is possible to improve the coding efficiency of intra prediction by deriving a reference sample used when MRL is applied and the intra prediction mode is derived as the DC intra prediction mode based on the reference picture index.

Also, according to the present disclosure, it is possible to improve the coding efficiency of intra prediction by deriving a reference sample used when MRL is applied and the intra prediction mode is derived as the DC intra prediction mode based on the reference picture index and a shape of the current block.

Also, according to the present disclosure, it is possible to improve the coding efficiency of intra prediction by deriving a reference sample used when MRL is applied and the intra prediction mode is derived as the planar intra prediction mode based on the reference picture index.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 25:
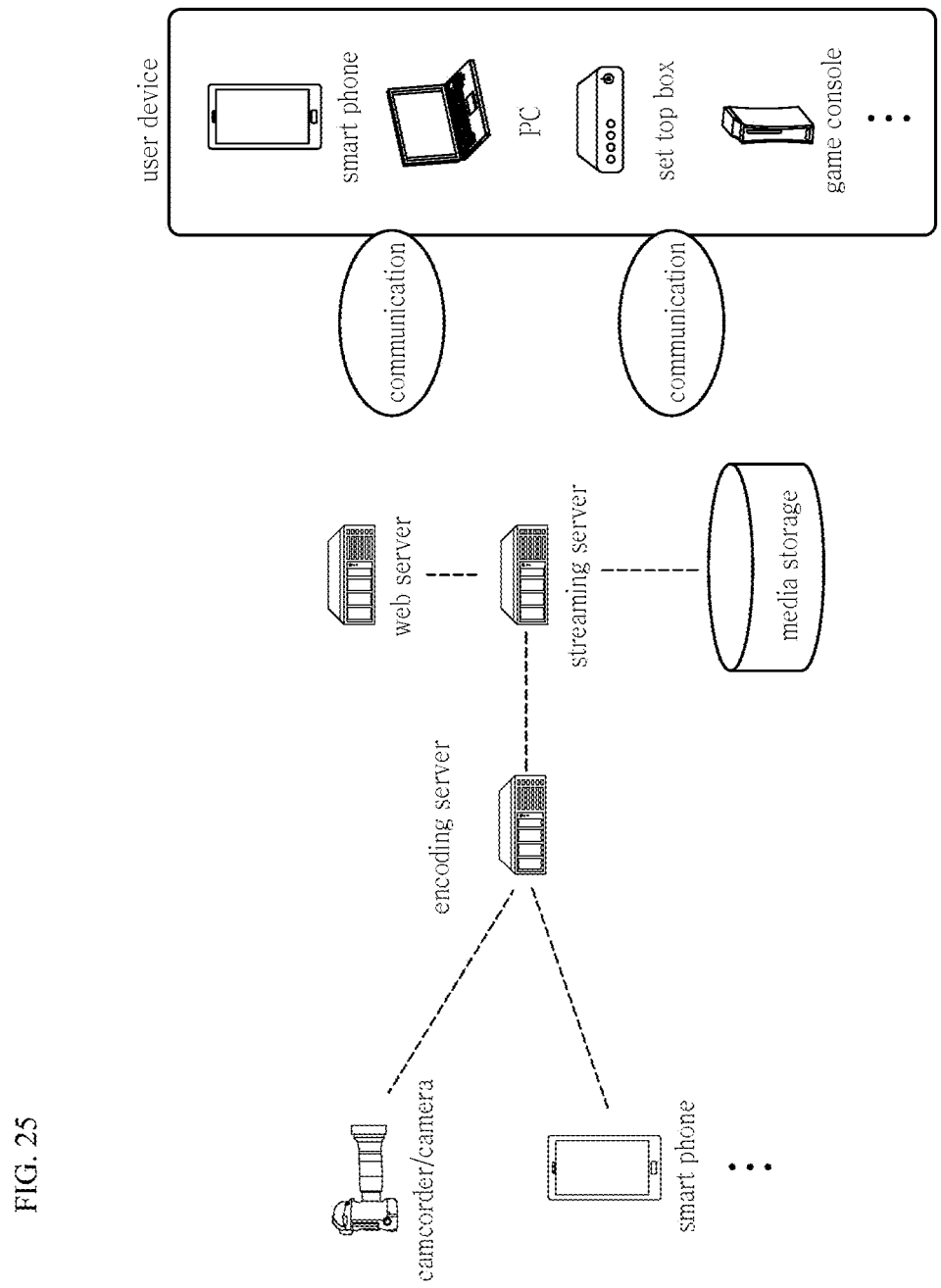
FIG. 25 illustrates a structural diagram of a contents streaming system to which the present disclosure is applied.

FIG. 25 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays (HMDs)), digital TVs, desktops computer, digital signage, and the like. Each server in the content streaming system may be operated as a distributed server, in which case data received from each server may be distributed.

Claims of the present disclosure may be combined in various manners. For example, technical features of a process claim of the present disclosure may be combined and implemented as an apparatus, and technical features of an apparatus claim of the present disclosure may be combined and implemented as a method. In addition, technical features of a process claim and technical features of an apparatus claim of the present disclosure may be combined and implemented as an apparatus, and technical features of a process claim and technical features of an apparatus claim of the present disclosure may be combined and implemented as a method.

What is claimed is:

1. An image decoding method performed by a decoding apparatus, comprising:
receiving image information including prediction related information for a current block; and
generating a reconstructed sample of the current block based on the image information,
wherein the generating of the reconstructed sample comprises:
deriving an intra prediction type for the current block among intra prediction types based on the prediction related information;
constructing an intra prediction mode candidate list of the current block including a DC intra prediction mode based on intra prediction modes of neighboring blocks of the current block;
deriving an intra prediction mode of the current block based on the intra prediction mode candidate list; and
deriving a prediction sample of the current block based the intra prediction mode,
wherein the intra prediction types include a first intra prediction type based on an intra prediction reference line adjacent to the current block, a second intra prediction type based on an intra prediction reference line not adjacent to the current block, and a third intra prediction type to which an Intra Sub-Partitions mode (ISP) is applied,
wherein the intra prediction type for the current block is derived as the second intra prediction type based on the prediction related information,
wherein the intra prediction mode candidate list constructed for a case that the intra prediction type is the first intra prediction type, the intra prediction mode candidate list constructed for a case that the intra prediction type is the second intra prediction type and the intra prediction mode candidate list constructed for a case that the intra prediction type is the third intra prediction type are the same,
wherein based on the intra prediction mode of the current block being derived as the DC intra prediction mode, and a width of the current block being equal to a height of the current block, a DC value is derived based on reference samples located at coordinates from (0, −refIdx−1) to (W−1, −refIdx−1) in the intra prediction reference line indicated by a reference line index of the current block and reference samples located at coordinates from (−refIdx−1, 0) to (−refIdx−1, H−1) in the intra prediction reference line, and the prediction sample is derived as the DC value,
wherein based on the intra prediction mode of the current block being derived as the DC intra prediction mode, and the width of the current block being greater than the height of the current block, the DC value is derived based on reference samples located at coordinates from (0, −refIdx−1) to (W−1, −refIdx−1) in the intra prediction reference line indicated by the reference line index of the current block, and the prediction sample is derived as the DC value,
wherein based on the intra prediction mode of the current block being derived as the DC intra prediction mode, and the height of the current block being greater than the width of the current block, the DC value is derived based on reference samples located at coordinates from (−refIdx−1, 0) to (−refIdx−1, H−1) in the intra prediction reference line indicated by the reference line index of the current block, and the prediction sample is derived as the DC value, and
wherein the refIdx is a value of the reference line index, W represents a width of the current block, H represents a height of the current block, and the prediction related information includes the reference line index.

2. An image encoding method performed by an encoding apparatus, comprising:
generating a reconstructed sample of a current block;
generating prediction related information for the current block; and
encoding image information including the prediction related information, wherein the generating of the reconstructed sample of the current block comprises:
  determining an intra prediction type for the current block among intra prediction types;
  constructing an intra prediction mode candidate list of the current block including a DC intra prediction mode based on intra prediction modes of neighboring blocks of the current block;
  deriving an intra prediction mode of the current block based on the intra prediction mode candidate list; and
  deriving a prediction sample of the current block based the intra prediction mode,
wherein the intra prediction types include a first intra prediction type using an intra-prediction reference line adjacent to the current block, a second intra prediction type using an intra-prediction reference line not adjacent to the current block, and a third intra prediction type to which an Intra Sub-Partitions mode (ISP) is applied,
wherein the intra prediction type for the current block is determined as the second intra prediction type,
wherein the intra prediction mode candidate list constructed for a case that the intra prediction type is the first intra prediction type, the intra prediction mode candidate list constructed for a case that the intra prediction type is the second intra prediction type and the intra prediction mode candidate list constructed for a case that the intra prediction type is the third intra prediction type are the same,
wherein based on the intra prediction mode of the current block being derived as the DC intra prediction mode, and a width of the current block being equal to a height of the current block, a DC value is derived based on reference samples located at coordinates from (0, −refIdx−1) to (W−1, −refIdx−1) in the intra prediction reference line indicated by a reference line index of the current block and reference samples located at coordinates from (−refIdx−1, 0) to (−refIdx−1, H−1) in the intra prediction reference line, and the prediction sample is derived as the DC value,
wherein based on the intra prediction mode of the current block being derived as the DC intra prediction mode, and the width of the current block being greater than the height of the current block, the DC value is derived based on reference samples located at coordinates from (0, −refIdx−1) to (W−1, −refIdx−1) in the intra prediction reference line indicated by the reference line index of the current block, and the prediction sample is derived as the DC value,
wherein based on the intra prediction mode of the current block being derived as the DC intra prediction mode, and the height of the current block being greater than the width of the current block, the DC value is derived based on reference samples located at coordinates from (−refIdx−1, 0) to (−refIdx−1, H−1) in the intra prediction reference line indicated by the reference line index of the current block, and the prediction sample is derived as the DC value, and
wherein the refIdx is a value of the reference line index, W represents a width of the current block, H represents a height of the current block, and the prediction related information includes the reference line index.

3. A transmission method of data for an image, the transmission method comprising:
  obtaining a bitstream generated based on generating a reconstructed sample of a current block, generating prediction related information for the current block, and generating the bitstream by encoding image information including the prediction related information; and
  transmitting the data comprising the bitstream,
wherein the generating of the reconstructed sample of the current block comprises:
  determining an intra prediction type for the current block among intra prediction types;
  constructing an intra prediction mode candidate list of the current block including a DC intra prediction mode based on intra prediction modes of neighboring blocks of the current block;
  deriving an intra prediction mode of the current block based on the intra prediction mode candidate list; and
  deriving a prediction sample of the current block based the intra prediction mode,
wherein the intra prediction types include a first intra prediction type using an intra-prediction reference line adjacent to the current block, a second intra prediction type using an intra-prediction reference line not adjacent to the current block, and a third intra prediction type to which an Intra Sub-Partitions mode (ISP) is applied,
wherein the intra prediction type for the current block is determined as the second intra prediction type,
wherein the intra prediction mode candidate list constructed for a case that the intra prediction type is the first intra prediction type, the intra prediction mode candidate list constructed for a case that the intra prediction type is the second intra prediction type and the intra prediction mode candidate list constructed for a case that the intra prediction type is the third intra prediction type are the same,
wherein based on the intra prediction mode of the current block being derived as the DC intra prediction mode, and a width of the current block being equal to a height of the current block, a DC value is derived based on (i) reference samples located at coordinates from (0, −refIdx−1) to (W−1, −refIdx−1) in the intra prediction reference line indicated by a reference line index of the current block and (ii) reference samples located at coordinates from (−refIdx−1, 0) to (−refIdx−1, H−1) in the intra prediction reference line, and the prediction sample is derived as the DC value,
wherein based on the intra prediction mode of the current block being derived as the DC intra prediction mode, and the width of the current block being greater than the height of the current block, the DC value is derived based on reference samples located at coordinates from (0, −refIdx−1) to (W−1, −refIdx−1) in the intra prediction reference line indicated by the reference line index of the current block, and the prediction sample is derived as the DC value,
wherein based on the intra prediction mode of the current block being derived as the DC intra prediction mode, and the height of the current block being greater than the width of the current block, the DC value is derived based on reference samples located at coordinates from (−refIdx−1, 0) to (−refIdx−1, H−1) in the intra prediction reference line indicated by the reference line index of the current block, and the prediction sample is derived as the DC value, and
wherein the refIdx is a value of the reference line index, W represents a width of the current block, H represents a height of the current block, and the prediction related information includes the reference line index.

* * * * *